United States Patent
Stokes et al.

(10) Patent No.: US 10,852,428 B2
(45) Date of Patent: Dec. 1, 2020

(54) 3D SCENE ANNOTATION AND ENHANCEMENT SYSTEMS AND METHODS

(71) Applicant: FLIR Belgium BVBA, Meer (BE)

(72) Inventors: Paul Stokes, Fleet (GB); Adam Murphy, Manchester, NH (US); Christopher Daniel Gatland, Fareham (GB); Michael Robb, Fareham (GB)

(73) Assignee: FLIR Belgium BVBA, Meer (BE)

( * ) Notice: Subject to any disclaimer, the term of this patent is extended or adjusted under 35 U.S.C. 154(b) by 303 days.

(21) Appl. No.: 15/893,465

(22) Filed: Feb. 9, 2018

(65) Prior Publication Data

US 2018/0164434 A1 Jun. 14, 2018

Related U.S. Application Data

(63) Continuation-in-part of application No. PCT/US2018/015315, filed on Jan. 25, 2018, and a
(Continued)

(51) Int. Cl.
| | | |
|---|---|---|
| *G01S 15/89* | (2006.01) | |
| *G06T 15/08* | (2011.01) | |
| *G01S 15/96* | (2006.01) | |
| *G01S 7/62* | (2006.01) | |
| *G01S 15/86* | (2020.01) | |

(52) U.S. Cl.
CPC .......... *G01S 15/89* (2013.01); *G01S 7/6218* (2013.01); *G01S 7/6263* (2013.01); *G01S 7/6272* (2013.01); *G01S 15/86* (2020.01); *G01S 15/96* (2013.01); *G06T 15/08* (2013.01); *G06T 2215/12* (2013.01)

(58) Field of Classification Search
CPC ........ G01S 15/89; G01S 15/86; G01S 7/6218; G01S 7/6272; G01S 7/6263; G01S 15/96; G06T 15/08; G06T 2215/12
See application file for complete search history.

(56) References Cited

U.S. PATENT DOCUMENTS

| | | | |
|---|---|---|---|
| 2,671,206 A | 3/1954 | Krause | |
| 3,989,216 A | 11/1976 | Veatch | |
| (Continued) | | | |

FOREIGN PATENT DOCUMENTS

| | | |
|---|---|---|
| EP | 1148347 | 10/2001 |
| EP | 1804183 | 7/2007 |
| (Continued) | | |

*Primary Examiner* — Daniel Pihulic
(74) *Attorney, Agent, or Firm* — Haynes and Boone, LLP

(57) ABSTRACT

Techniques are disclosed for systems and methods to provide three dimensional volume rendering of volume data for use when operating mobile structures. A three dimensional volume rendering system includes a logic device configured to communicate with a user interface and receive volume data from a volume data source. The logic device is configured to render a three dimensional) representation of the volume data on a display of the user interface according to a view perspective, render an indicator key on a first two dimensional plane overlaid in the 3D representation, detect a change condition, and rotate the indicator key about a rotational axis in response to the detected change condition.

20 Claims, 28 Drawing Sheets

Related U.S. Application Data continuation-in-part of application No. 15/443,836, filed on Feb. 27, 2017, now Pat. No. 10,191,153, which is a continuation of application No. PCT/US2015/045962, filed on Aug. 19, 2015, application No. 15/893,465, which is a continuation-in-part of application No. 15/353,579, filed on Nov. 16, 2016, now Pat. No. 10,416,307, which is a continuation of application No. PCT/US2015/032304, filed on May 22, 2015, application No. 15/893,465, which is a continuation-in-part of application No. 15/239,770, filed on Aug. 17, 2016, now Pat. No. 10,241,200, which is a continuation of application No. PCT/US2015/015279, filed on Feb. 10, 2015.

(60) Provisional application No. 62/458,533, filed on Feb. 13, 2017, provisional application No. 62/458,529, filed on Feb. 13, 2017, provisional application No. 62/451,427, filed on Jan. 27, 2017, provisional application No. 62/044,906, filed on Sep. 2, 2014, provisional application No. 62/005,838, filed on May 30, 2014, provisional application No. 61/943,170, filed on Feb. 21, 2014.

(56) References Cited

U.S. PATENT DOCUMENTS

| | | |
|---|---|---|
| 4,982,924 A | 1/1991 | Havins |
| 5,142,649 A | 8/1992 | O'Donnell |
| 5,530,680 A | 6/1996 | Whitehurst |
| 5,561,641 A | 10/1996 | Nishimori et al. |
| 5,633,710 A | 5/1997 | Kumra et al. |
| 5,675,552 A | 10/1997 | Hicks et al. |
| 5,771,205 A | 6/1998 | Currier et al. |
| 5,887,376 A | 3/1999 | Currier et al. |
| 6,050,945 A | 4/2000 | Peterson et al. |
| 6,806,622 B1 | 10/2004 | Schmidt et al. |
| 7,098,458 B2 | 8/2006 | Kuerbitz et al. |
| 7,542,376 B1 | 6/2009 | Thompson et al. |
| 7,652,952 B2 | 1/2010 | Betts et al. |
| 2002/0159336 A1 | 10/2002 | Brown et al. |
| 2003/0142144 A1 | 7/2003 | Balakrishnan et al. |
| 2004/0032493 A1 | 2/2004 | Franke et al. |
| 2004/0158147 A1 | 8/2004 | Shifrin |
| 2011/0141242 A1 | 6/2011 | Fernandez Alvarez et al. |
| 2012/0014220 A1 | 1/2012 | DePasqua |
| 2013/0192451 A1 | 8/2013 | Scott et al. |
| 2014/0010049 A1 | 1/2014 | Proctor |
| 2017/0090021 A1 | 3/2017 | Sayer et al. |
| 2017/0168159 A1* | 6/2017 | Gatland ............ G01S 7/6263 |
| 2018/0164434 A1* | 6/2018 | Stokes ............ G01S 15/86 |
| 2018/0259339 A1* | 9/2018 | Johnson ............ G01S 15/87 |
| 2019/0012827 A1* | 1/2019 | Akimoto ............ H04N 7/18 |
| 2019/0034056 A1* | 1/2019 | Eisenmann ............ G06T 19/003 |
| 2019/0360810 A1* | 11/2019 | Johnson ............ G06T 3/60 |

FOREIGN PATENT DOCUMENTS

| | | |
|---|---|---|
| EP | 2626721 | 8/2013 |
| JP | 2012/154791 | 8/2012 |
| WO | WO 2010/141011 | 12/2010 |
| WO | WO 2013/063515 | 5/2013 |
| WO | WO 2013/108088 | 7/2013 |
| WO | WO 2015/126678 | 8/2015 |
| WO | WO 2016/073060 | 5/2016 |

* cited by examiner

View Looking Down the Surface

3D SCENE ANNOTATION AND ENHANCEMENT SYSTEMS AND METHODS

CROSS-REFERENCE TO RELATED APPLICATIONS

This application claims the benefit of U.S. Provisional Patent Application No. 62/458,533 filed Feb. 13, 2017 and entitled "3D SCENE ANNOTATION AND ENHANCEMENT SYSTEMS AND METHODS," which is incorporated herein by reference in its entirety.

This application claims the benefit of U.S. Provisional Patent Application No. 62/458,529 filed Feb. 13, 2017 and entitled "3D BOTTOM SURFACE RENDERING SYSTEMS AND METHODS," which is incorporated herein by reference This application is also a continuation-in-part of International Patent Application No. PCT/US2018/015315 filed Jan. 25, 2018 and entitled "THREE DIMENSIONAL TARGET SELECTION SYSTEMS AND METHODS," which claims the benefit of U.S. Provisional Patent Application No. 62/451,427 filed Jan. 27, 2017 and entitled "THREE DIMENSIONAL TARGET SELECTION SYSTEMS AND METHODS," all of which are incorporated herein by reference in their entirety.

This application is also a continuation-in-part of U.S. patent application Ser. No. 15/443,836 filed Feb. 27, 2017 and entitled "AUGMENTED REALITY SONAR IMAGERY SYSTEMS AND METHODS," which is a continuation of International Patent Application No. PCT/US2015/045962 filed Aug. 19, 2015 and entitled "AUGMENTED REALITY SONAR IMAGERY SYSTEMS AND METHODS," which claims the benefit of U.S. Provisional Patent Application No. 62/044,906 filed Sep. 2, 2014 and entitled "AUGMENTED REALITY SONAR IMAGERY SYSTEMS AND METHODS," all of which are incorporated herein by reference in their entirety.

This application is also a continuation-in-part of U.S. patent application Ser. No. 15/353,579 filed Nov. 16, 2016 and entitled "MULTICHANNEL SONAR SYSTEMS AND METHODS," which is a continuation of International Patent Application No. PCT/US2015/032304 filed May 22, 2015 and entitled "MULTICHANNEL SONAR SYSTEMS AND METHODS," which claims the benefit of U.S. Provisional Patent Application No. 62/005,838 filed May 30, 2014 and entitled "MULTICHANNEL SONAR SYSTEMS AND METHODS," all of which are incorporated herein by reference in their entirety.

This application is also a continuation-in-part of U.S. patent application Ser. No. 15/239,770 filed Aug. 17, 2016 and entitled "MODULAR SONAR TRANSDUCER ASSEMBLY SYSTEMS AND METHODS," which is a continuation of International Patent Application No. PCT/US2015/015279 filed Feb. 10, 2015 and entitled "MODULAR SONAR TRANSDUCER ASSEMBLY SYSTEMS AND METHODS," which claims the benefit of U.S. Provisional Patent Application No. 61/943,170 filed Feb. 21, 2014 and entitled "MODULAR SONAR TRANSDUCER ASSEMBLY SYSTEMS AND METHODS," all of which are incorporated herein by reference in their entirety.

TECHNICAL FIELD

One or more embodiments of the invention relate generally to graphical rendering of three dimensional scenes and more particularly, for example, to systems and methods for providing tools to enhance viewing experience of a digital three dimensional representation of a scene.

BACKGROUND

Sonar may be used to perform bathymetry, detect underwater hazards, find fish, and/or otherwise assist in navigation by producing data and/or imagery of a water column and/or a floor of a body of water beneath a watercraft. Other ranging sensor systems, including radar, LIDAR, and image/video imaging systems can also provide sensor data of an environment about a vehicle to likewise assist in navigation. Conventional systems often include a display configured to provide traditionally recognizable ranging imagery based on the sensor data to a user.

User viewing and interaction with provided ranging imagery is often unintuitive or difficult to provide reliably, particularly when an imaged volume includes a variety of multiple disconnected features that are occluded or sized differently based on the perspective used to view the imaged volume. Contemporary ranging systems have increased sensitivity and object detection capabilities and can produce a relatively large number of reliably detected targets within a typical environment or set of volume data. At the same time, consumer market pressures and convenience dictate easier to use systems that include a variety of user-defined features and that provide for highly reliable an intuitive three dimensional rendering of volume data. Thus, there is a need for an improved methodology to provide three dimensional volume rendering, particularly in the context of providing easily intuited ranging data and/or imagery important to general operation of a vehicle, such as a watercraft.

SUMMARY

Techniques are disclosed for systems and methods to provide three dimensional volume rendering for use when operating mobile structures. A three dimensional volume rendering system may include portable imaging devices, sonar transducer assemblies, other ranging systems and/or volume data sources, and logic devices in communication with the sonar transducer assemblies, imaging devices, ranging sensor systems, and/or other volume data sources. Each sonar transducer assembly may be adapted to be mounted to a mobile structure and placed in a body of water, and each portable imaging system may include an imager position and/or orientation sensor (IPOS). The logic devices may be configured to render volume data on a display of a user interface and allow a user to view and interact with features of or within the volume data. User selections of features, subsequent user input, and/or the volume data may be used to adjust a steering actuator, a propulsion system thrust, and/or other operational systems of the mobile structure.

In various embodiments, a three dimensional volume rendering system may include one or more orientation sensors, position sensors, gyroscopes, accelerometers, and/or additional sensors, actuators, controllers, user interfaces, mapping systems, and/or other modules mounted to or in proximity to a vehicle, which may collectively or individually form a volume data source. Each component of the system may be implemented with a logic device adapted to form one or more wired and/or wireless communication links for transmitting and/or receiving sensor signals, control signals, or other signals and/or data between the various components.

In one embodiment, a system may include a logic device configured to communicate with a user interface and receive volume data from a volume data source. The logic device may be configured to render a three dimensional (3D) representation of the volume data on a display of the user interface according to a view perspective, render an indicator key on a first two dimensional (2D) plane overlaid in the 3D representation, detect a change condition, and rotate the indicator key about a rotational axis in response to the detected change condition.

In another embodiment, a method may include receiving, from a volume data source, volume data representing a scene, separating the volume data into floor volume data corresponding to a floor within the scene and in-water object volume data corresponding to objects located above the floor within the scene, rendering a first set of 3D representations of the floor volume in a first manner, and rendering a second set of 3D representations of the in-water object volume data in a second manner different from the first manner.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, three dimensional (3D) volume rendering may be provided by a user interface and a logic device configured to communicate with a volume data source, such as an imaging device and/or a sonar system (e.g., various types of ranging sensor systems) including one or more sonar transducer assemblies, orientation sensors, gyroscopes, accelerometers, position sensors, and/or speed sensors providing measurements of an orientation, a position, an acceleration, and/or a speed of the imaging device, the sonar transducer assemblies, other ranging sensor systems, and/or a coupled mobile structure. For example, the sensors may be mounted to or within the mobile structure (e.g., a watercraft, aircraft, motor vehicle, and/or other mobile structure), or may be integrated with the imaging device, the sonar transducer assemblies, and/or the other ranging sensor systems used to generate volume data of an environment of the mobile structure.

One embodiment of the present disclosure provides techniques for 3D target selection that can be implemented with minimal user input and with intuitive user feedback, thereby providing 3D target selection that is more accurate and easier to use than conventional systems and/or methods, particularly while operating a mobile structure. Such techniques can in turn enable a number of additional valuable user and/or safety features, such as safe and reliable navigation around a detected navigational hazard, for example, or reliable navigation to a selected group of fish. Moreover, such techniques may be used advantageously in conjunction with providing enhanced, 3D, and/or augmented reality sonar imagery for display to a user, as described herein.

In accordance with additional and/or supplemental embodiments of the present disclosure, augmented reality sonar imagery may be provided by a portable imaging device and a sonar system including one or more sonar transducer assemblies, orientation sensors, gyroscopes, accelerometers, position sensors, and/or speed sensors providing measurements of an orientation, a position, an acceleration, and/or a speed of the portable imaging device, the sonar transducer assemblies, and/or a coupled mobile structure. For example, the sensors may be mounted to or within the mobile structure (e.g., a watercraft, aircraft, motor vehicle, and/or other mobile structure), or may be integrated with the portable imaging device and/or the sonar transducer assemblies. Embodiments of the present disclosure produce augmented reality sonar imagery that can be referenced to visible objects in the same field of view (FOV), thereby providing sonar imagery that is more intuitive and easier to interpret than sonar data provided by conventional systems and/or methods.

Figure 1A:
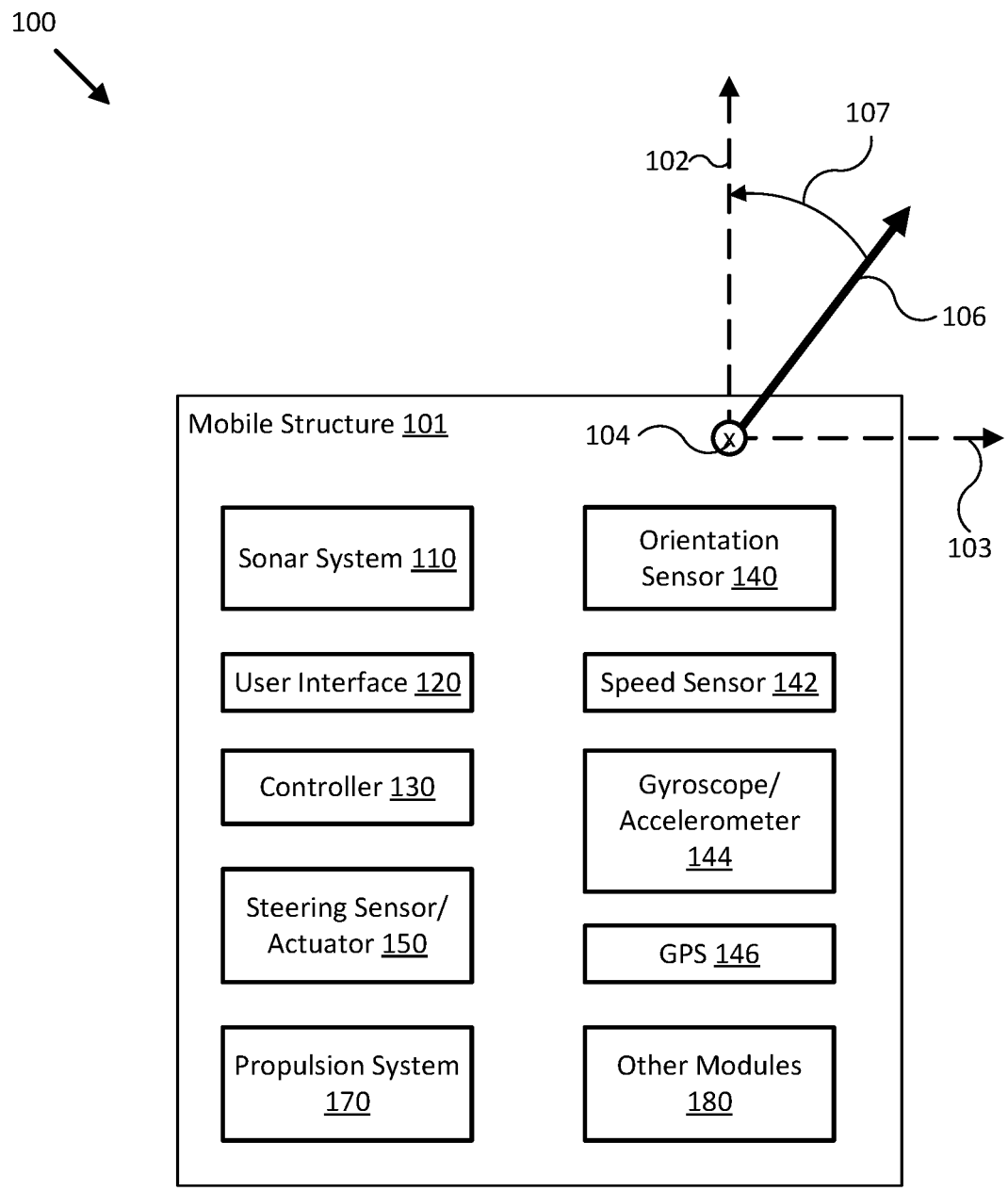
FIG. 1A illustrates a block diagram of an augmented reality sonar imagery system in accordance with an embodiment of the disclosure.

FIG. 1A illustrates a block diagram of system 100 in accordance with an embodiment of the disclosure. In various embodiments, system 100 may be adapted to measure an orientation, a position, an acceleration, and/or a speed of mobile structure 101, sonar system 110, and/or user interface 120.

System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced, three dimensional/perspective, and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global navigation satellite system (GNSS) or global positioning satellite receiver and/or other device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
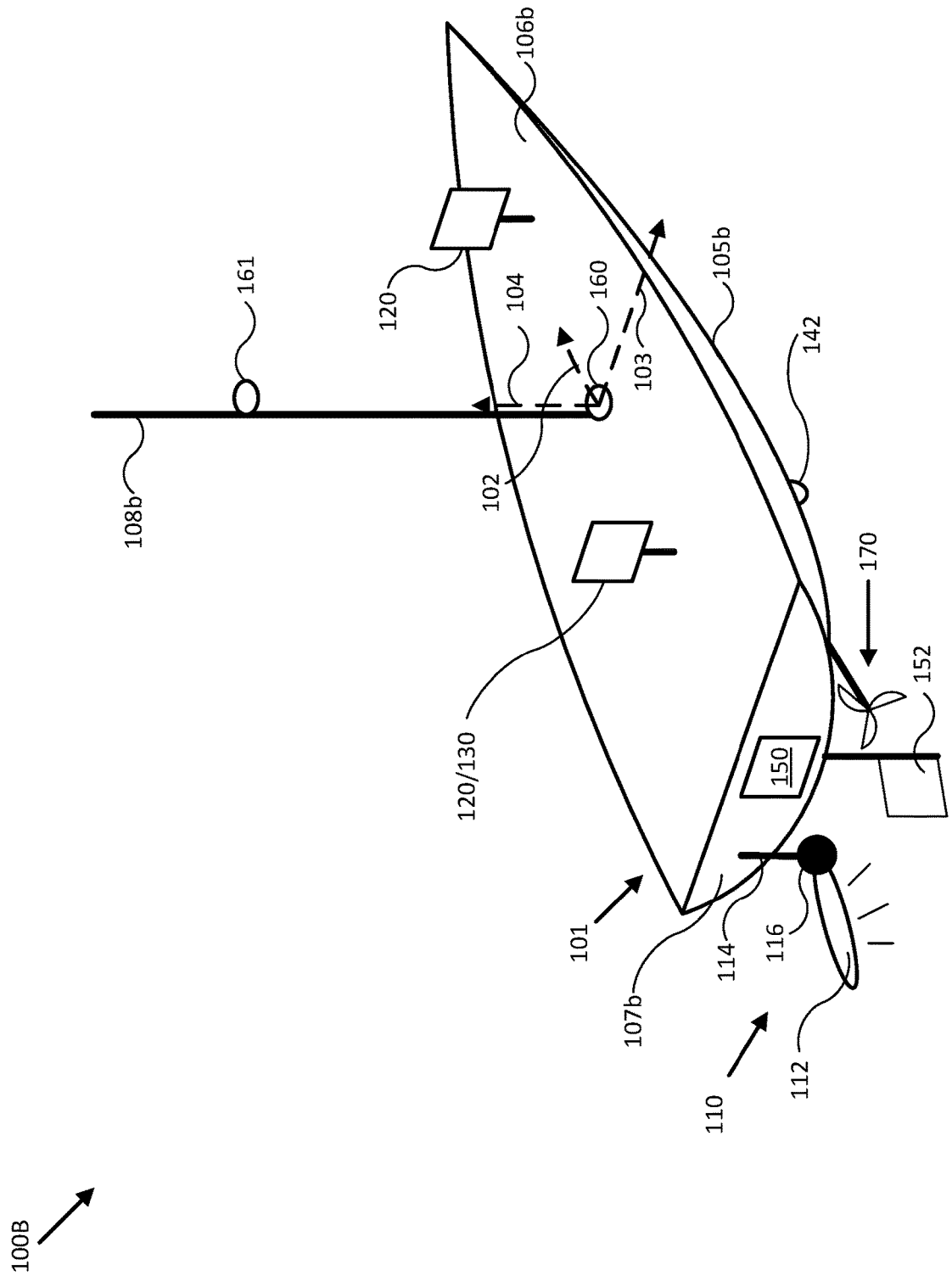
FIG. 1B illustrates a diagram of an augmented reality sonar imagery system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
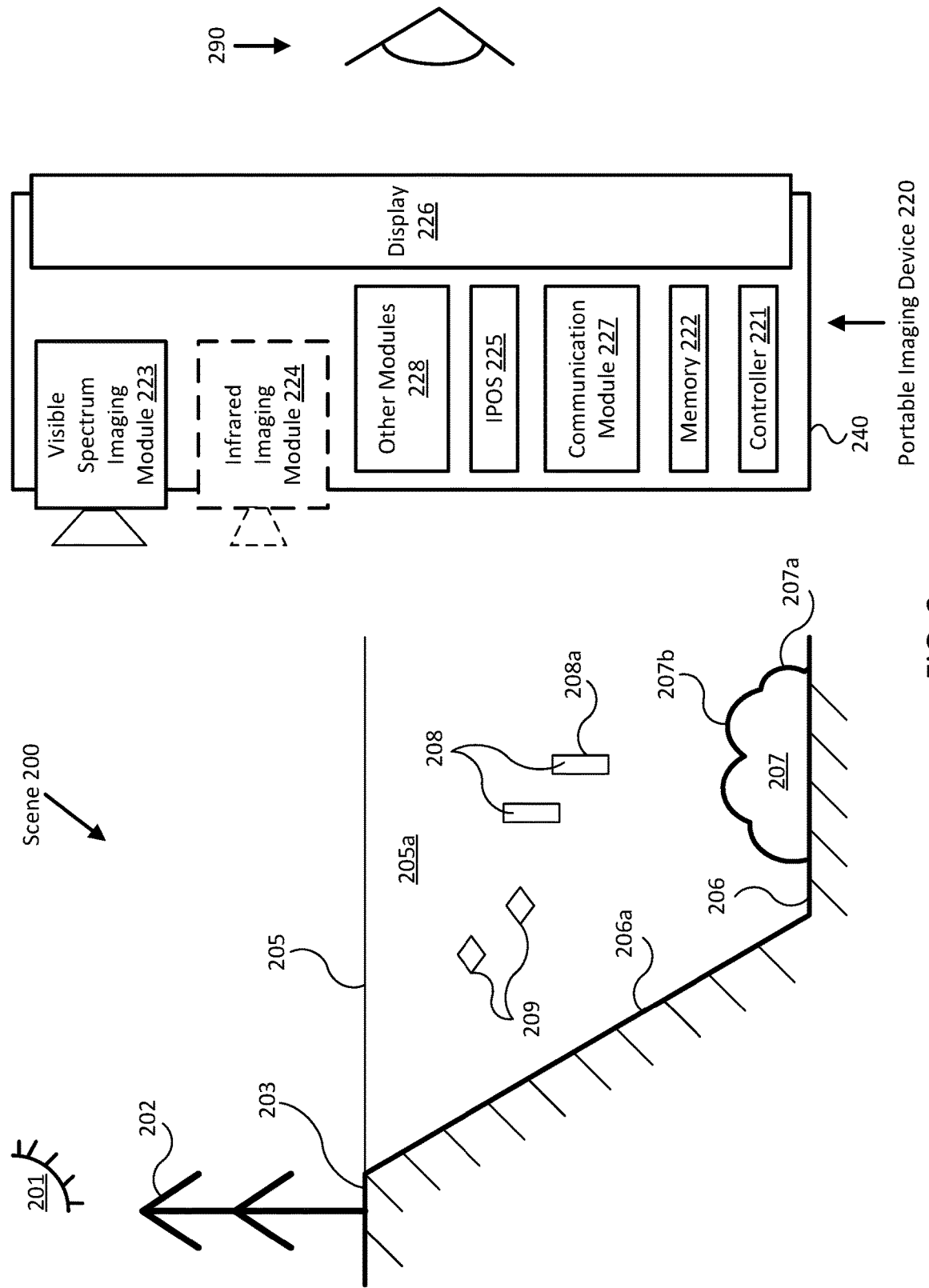
FIG. 2 illustrates a diagram of an augmented reality sonar imagery system in accordance with an embodiment of the disclosure.

FIG. 2 illustrates a diagram of an augmented reality sonar imagery system including a portable imaging device 220 in accordance with an embodiment of the disclosure. In various embodiments, portable imaging device 220 may be implemented with similar functionality as that described with reference to user interface 120 and/or controller 130 in FIGS. 1A and 1B. In the embodiment shown in FIG. 2, portable imaging device 220 may be configured to provide visible spectrum imagery (e.g., using a visible spectrum imaging module 223), infrared spectrum imagery (using optional infrared imaging module 224), and/or sonar imagery (using sonar system 110 of FIGS. 1A and 1B) of scene 200 to a user 290 using a display 226. For example, portable imaging device 220 may be configured to display rendered image data (e.g., provided by imaging modules 223 and/or 224) in a portion of a field of view (FOV) of display 226 that is above waterline 205 and to display rendered sonar data in a portion of the FOV that is below waterline 205.

Image data provided by imaging modules 223 and/or 224 may include an image of a surface of a body of water 205a and various objects or structures above waterline 205, such as the sun 201, a tree 202, and/or a beach 203. Such image data may be processed using feature/pattern recognition techniques to determine a location of waterline 205 within the image data (e.g., if imaging modules 223 and/or 224 are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205a, a bank 206a of floor 206, a bottom feature 207 (e.g., a rock or sunken ship), fish 208, other submerged objects 209 (e.g., trash, seaweed), and/or other underwater features within or surrounding body of water 205a. Such underwater features may be indicated and/or differentiated through use of any combination of contour lines, color and/or greyscale mapping and/or shading, three dimensional rendering, and/or other volumetric rendering techniques. In some embodiments, surface orientations of various underwater features (e.g., of side 207a or top 207b of bottom feature 207, or of side 208a of fish 208) may be detected and/or differentiated using similar sonar data and/or image processing techniques. The portions of either or both the image data and the sonar data that are rendered and displayed by display 226, and the techniques used to render the imagery, may be selected based on the location of waterline 205 relative to an FOV of display 226 to provide augmented reality sonar imagery, as described herein.

As shown, portable imaging device 220 may include one or more controllers 221 (e.g., including memory 222), imaging modules (e.g., visible spectrum imaging module 223 and/or infrared imaging module 224), other sensors (e.g., imager position and/or orientation sensor 225), display 226, communication module 227, and/or other modules 228 facilitating operation of portable imaging device 220, which may or may not all be disposed within a common housing 240. In other embodiments, one or more of the modules shown in FIG. 2 may be integrated with a stationary user interface and/or mount (e.g., coupled to deck 106b or mast/sensor mount 108b of mobile structure 101 in FIG. 1B) and be configured to communicate with devices within housing 240 through a distributed embodiment of communication module 227.

Visible spectrum imaging module 223 and infrared imaging module 224 may be electronic devices configured to capture imagery/image data of scene 200 according to their respective spectrums and provide images to controller 221. In some embodiments, visible spectrum imaging module 223 and infrared imaging module 224 may be implemented according to any similar devices described in U.S. patent application Ser. No. 14/138,058, filed Dec. 21, 2013, and entitled "COMPACT MULTI-SPECTRUM IMAGING WITH FUSION", which is hereby incorporated by reference in its entirety. Moreover, imagery provided by imaging modules 223 and 224 may be combined (e.g., blended, overlaid, fused, or otherwise combined) to provide combined (e.g., from multiple source spectrums) imagery/image data that may be rendered by portable imaging device 220 and/or displayed using display 226 using any of the methods described in U.S. patent application Ser. No. 14/138,058 (incorporated by reference above) and/or as further described herein.

More generally, portable imaging device 220 may include a variety of imaging modules adapted to capture imagery (e.g., image and/or video data) according to visible spectrum, infrared, and other spectrums, for example, and provide corresponding image data to controller 221 or other controllers or devices for rendering and/or display. In some embodiments, imaging modules 223 and/or 224 may be mounted to a mobile structure separate from portable imaging device 220 (e.g., to deck 106b or mast/sensor mount 108b of mobile structure 101 in FIG. 1B, using a fixed or actuated mounts such as imager cluster 161) and be configured to provide imagery to controller 221 using wired and/or wireless communications through communication, module 227. In such embodiments, multiple portable imaging devices may be configured to share image data provided by imaging modules mounted to the mobile structure.

Controller 221 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In some embodiments, controller 221 may be in communication with various modules of portable imaging device 220 and be configured to receive imagery/image data of scene 200 from imaging modules 223 and/or 224, determine waterline 205 of a body of water 205a in scene 200 (e.g., from image data, position data, and/or orientation data provided by the portable imaging device), render or display image data in any portion of an FOV of display 226 that extends above waterline 205, and/or render and/or display sonar data in any portion of the FOV of display 226 that extends below waterline 205.

In some embodiments, controller 221 may be configured to receive the sonar data and/or imagery from controller 130 and/or sonar system 110 of FIG. 1A or 1B, for example, based on a measured position and/or orientation of portable imaging device 220, either of imaging modules 223 and 224, and/or display 226, provided by imager position and/or orientation sensor (IPOS) 225. Such sonar data and/or imagery may include data from charts, prior ensonifications, and/or current sonar data or imagery provided by, for example, sonar system 110. In further embodiments, controller 221 may be tasked with generating sonar imagery from sonar data, correlating sensor data with sonar data/imagery, communicating operational parameters and/or sensor information with other devices, and/or other operations of systems 100 and/or 100B of FIGS. 1A and 1B. In various embodiments, controller 221 and memory 222 may be integrated together, for example, or may be implemented in a distributed manner across a number of individual controllers and/or memories.

In the embodiment shown in FIG. 2, portable imaging device 220 includes IPOS 225. IPOS 225 may be implemented as one or more orientation sensors, GPS sensors, differential GPS sensors, orientation/position reference transducers and/or optical sensors (e.g., for actuators), visible spectrum and/or infrared imaging modules, and/or other sensors configured to measure a relative and/or absolute orientation and/or position of portable imaging device 220 and/or each of imaging modules 223 and 224 and display 226 and provide such measurements to controller 221. For example, in one embodiment, IPOS 225 may include one or more remote infrared imaging modules (e.g., implemented similar to infrared imaging module 224) fixed to a mobile structure and a number of infrared registration marks disposed on housing 240, and controller 221 may be configured to determine a relative position and/or orientation of portable imaging device 220 from the size and/or position of the infrared registration marks and/or other related characteristics of portable imaging device 220 in image data captured by the one or more remote infrared imaging modules. Such relative position and/or orientation may be relative to a position and/or orientation of the remote infrared imaging modules and/or the mobile structure.

In some embodiments, IPOS 225 may be distributed amongst the various modules of portable imaging device 220 and include one or more individual module IPOSs configured to measure positions and/or orientations of image modules 223 and/or 224 and a separate display IPOS configured to measure a position and/or orientation of display 226. In various embodiments, controller 221 may be configured to combine image data and sonar data according to IPOS measurements and/or measurements of an orientation and/or position of a coupled sonar system (e.g., from a corresponding SPOS) and/or mobile structure to produce combined imagery, such as visible spectrum images of scene 200 above waterline 205 and/or three dimensional sonar images of scene 200 below waterline 205. In other embodiments, controller 221 may be configured to use orientation and/or position measurements of portable imaging device 220, imaging modules 223 and 224, display 226, and/or a mobile structure to control one or more actuators to adjust a position and/or orientation of imaging modules 223 and 224 and/or portions of an associated sonar system (e.g., transducer assembly 112) to image or ensonify a particular position and/or orientation of scene 200 relative to an FOV of display 226.

Display 226 may be implemented as one or more LCDs, OLEDs, touch screen displays, projection devices, and/or other digital displays that may be configured to display image data from imaging modules 223 and 224 and/or sonar data (e.g., from sonar system 110 of FIGS. 1A and 1B) rendered by controller 221 to user 290. In various embodiments, display 226 may be characterized by an FOV that is a function of the available pixel dimensions of display 226, the position and/or orientation of display 226, the FOVs of imaging modules 223 and/or 224, and an effective optical zoom level applied to the image data provided by imaging modules 223 and/or 224. For example, where imaging modules 223 and 224 are within the same housing 240 as display 226, the position and orientation of display 226 may be substantially the same as that of imaging modules 223 and/or 224, and the FOV of display 226 may be the same as that for imaging modules 223 and/or 224 as modified by the effective zoom level and the pixel dimensions of display 226. In other embodiments, where imaging modules 223 and/or 224 are mounted outside of housing 240, the FOV of display 226 may be dependent on the absolute or relative position and/or orientation of display 226 as compared to that of imaging modules 223 and/or 224.

In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of portable imaging device 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communication module 227 may be implemented as any wired and/or wireless interface configured to communication sensor data, configuration data, parameters, and/or other data and/or signals between portable imaging device 220 and other elements of mobile structure 101 (e.g., as shown in FIGS. 1A and 1B) and/or amongst modules of portable imaging device 220. As described herein, in some embodiments, communication module 227 may be implemented in a distributed manner such that portions of communication module 227 are implemented within one or more modules of portable imaging device 220 that may or may not be disposed within housing 240.

Other modules 228 may include other and/or additional sensors, sensor arrays, actuators, logic devices, communications modules/nodes, power and/or power distribution components, and/or user interface devices used to provide additional environmental information and/or configuration parameters, for example, and/or to adjust a position and/or orientation of portable imaging device 220. In some embodiments, other modules 228 may include various environmental sensors providing measurements and/or other sensor signals that can be displayed to a user and/or used by other devices of portable imaging device 220 (e.g., controller 221) to facilitate operation of portable imaging device 220. In some embodiments, other modules 228 may include one or more buttons and/or other user input devices configured to accept manual user input. In other embodiments, other modules may include one or more distance detectors configured to detect user 290 and/or measure or estimate a distance between display 226 and user 290.

In various embodiments, portable imaging device 220 may be implemented in a single housing 240 with a single display (e.g., display 225) adapted to be held by user 290 while user 290 views the display. In other embodiments, housing 240 may be mounted to a mobile structure using a fixed or actuated mount to provide a fixed or actuated view relative to an orientation of the mobile structure. In some embodiments, portable imaging device 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223 and/or 224, for example, or by applying various image processing techniques to image and/or sonar data to provide a simulation of depth.

Figure 3:
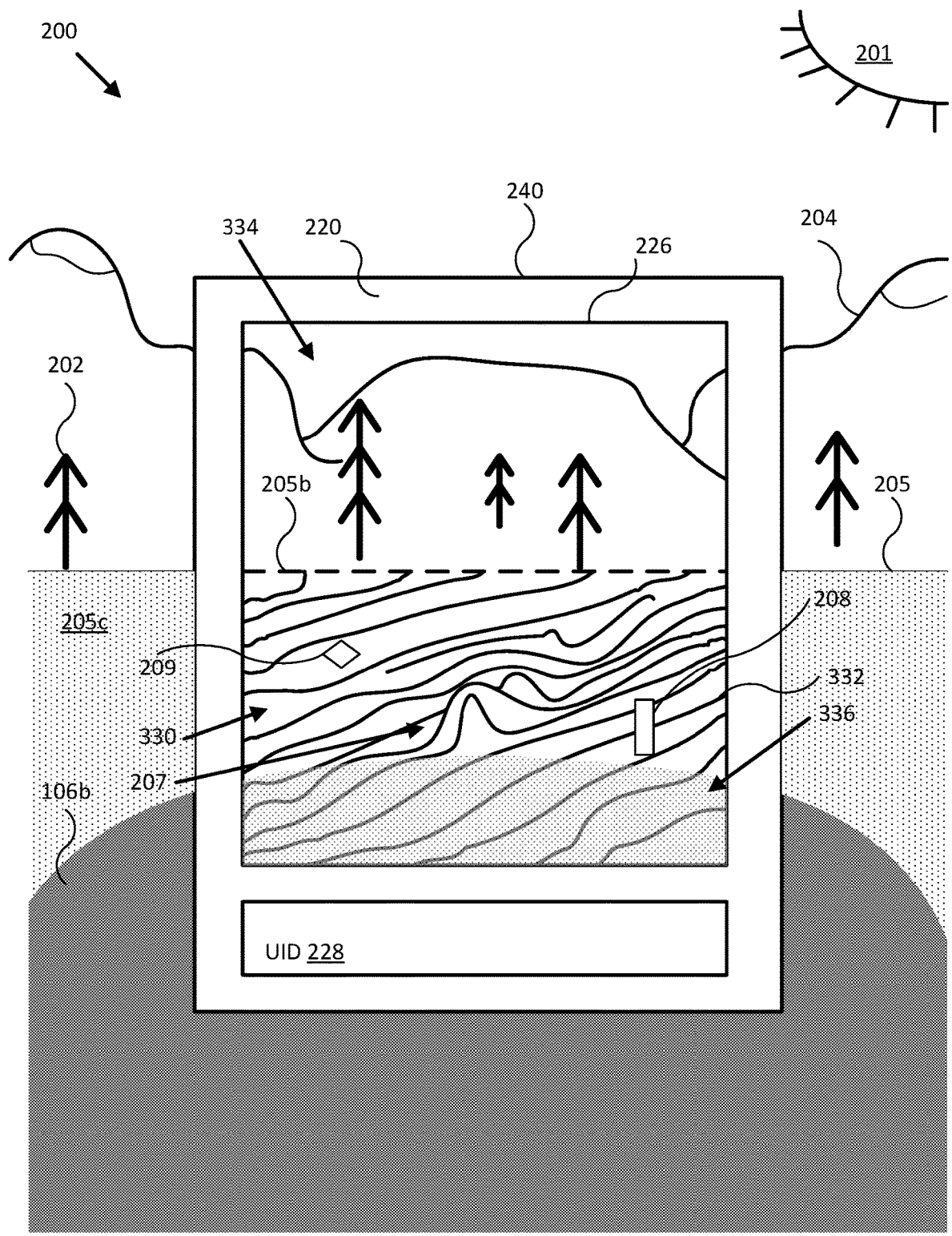
FIG. 3 illustrates a diagram of an augmented reality sonar imagery system in accordance with an embodiment of the disclosure.

FIG. 3 illustrates a diagram of an augmented reality sonar imagery system including an embodiment of portable imaging device 220 of FIG. 2, in accordance with an embodiment of the disclosure. In the embodiment shown in FIG. 3, portable imaging device 220 is oriented to illustrate imagery displayed by display 226 as viewed by user 290 of FIG. 2, where the effective optical zoom level is adjusted to reproduce a direct view of scene 200 (except for a relatively small portion of the direct view obscured by housing 240 and/or user input device 228.

Scene 200 includes features above waterline 205 illustrated in FIG. 2 and additionally includes mountains/land features 204, surface 205c of body of water 205a, and deck 106b (e.g., of mobile structure/boat 101 in FIG. 1B). Also shown in FIG. 3, and in particular in the FOV of display 226, are detected waterline 205b, portion 330 of the FOV that extends below waterline 205b, and portion 334 of the FOV that extends above waterline 205b. Portable imaging device 220 may in some embodiments be configured to render detected waterline 205b in display 226 to illustrate a detected location of waterline 205 relative to the FOV of display 226. Portion 330 may include imagery representing bottom feature 207, fish 208, and submerged object 209, similar to objects illustrated in FIG. 2. For example, as shown in FIG. 3, portion 330 may include a number of contour lines 332 rendered by a controller (e.g., controller 221 of FIG. 2) to distinguish depths, relative distances, various characteristics of bathymetric data, and/or other characteristics of underwater features. Alternatively, or in addition, portion 330 may include icons and/or other types of graphical indicators configured to illustrate a position and/or distance to fish 208 or submerged object 209, and/or to distinguish between the two (e.g., based on fish detection processing performed on acoustic returns from fish 208 and/or submerged object 209). Although the FOV of display 226 in FIG. 3 is shown to include both portions 330 and 334, a different position and/or orientation of display 226 and/or portable imaging device 220 could result in portion 330 or 334 encompassing the entire FOV of display 226.

In some embodiments, age or source of sonar data may be differentiated by rendering substantially real time sonar data differently from prior-acquired and/or survey map sonar data (e.g., a $3^{rd}$ party provided chart or collection of bathymetric data for a particular body of water stored in memory, such as memory 222 of FIG. 2). For example, substantially real time sonar data may be rendered in color and prior-acquired and/or survey map sonar data may be rendered in greyscale. In some embodiments, a relative age of once real time sonar data may be indicated by reducing a chrominance level of the sonar data as the sonar data ages. In additional embodiments, portable imaging device 220 (e.g., controller 221 of FIG. 2) may be configured to detect or determine various surfaces of underwater features based on acoustic returns from the surfaces and/or one or more volumetric renderings of corresponding sonar data, and the relative or absolute orientations of the various surfaces may be determined from the volumetric renderings. In such embodiments, portable imaging device 220 may be configured to indicate the relative or absolute surface orientations in portion 330 by mapping the surface orientations to a color and/or intensity map and rendering the sonar data corresponding to the determined surfaces in a corresponding color.

Also shown in portion 330 of the FOV of display 226 is overlapping portion 336, which indicates where deck 106b would otherwise obscure direct view of surface 205c. In some embodiments, portable imaging device 220 may be configured to determine whether portion 330 overlaps with a view of a mobile structure disposed on surface 205c (e.g., mobile structure 101 of FIG. 1A or 1B), thereby forming overlapping portion 336. If overlapping portion 336 exists, portable imaging device 220 may be configured to blend image data of the mobile structure (e.g., captured by imaging modules 223 and/or 224) with sonar data in overlapping portion 336 and rendering the blended data in the overlapping portion 336. In embodiments where portable imaging device 220 is worn by a user and generally occludes direct view of the user's surroundings, the blended imagery can provide a user with a view of sonar data beneath the mobile structure but protect the user from stumbling into objects on the mobile structure and/or walking off deck 106b.

Figure 4:
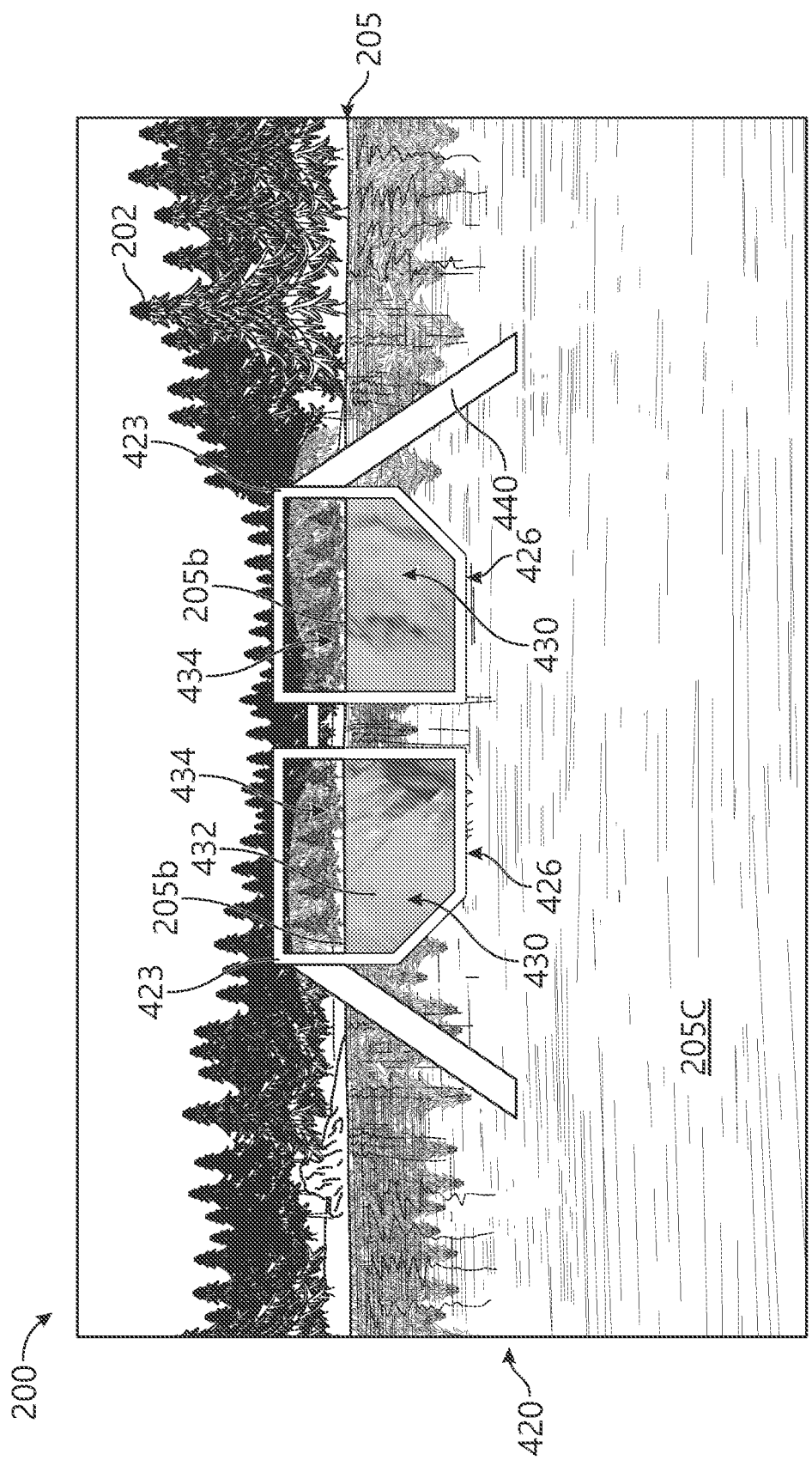
FIG. 4 illustrates a diagram of an augmented reality sonar imagery system in accordance with an embodiment of the disclosure.

FIG. 4 illustrates a diagram of an augmented reality sonar imagery system including wearable portable imaging device 420 in accordance with an embodiment of the disclosure. In various embodiments, portable imaging device 420 may be implemented with similar functionality as that described with reference to portable imaging device 220 in FIGS. 2 and 3. In the embodiment shown in FIG. 4, wearable portable imaging device 420 is oriented to illustrate imagery displayed by displays 426 (e.g., one per user eye) as viewed by a user wearing portable imaging device 420, where the effective optical zoom level is adjusted to reproduce a direct view of scene 200 (except for a relatively small portion of the direct view obscured by imaging modules 423 and/or frame 440).

FIG. 4 includes some of the features above waterline 205 illustrated in scene 200 of FIGS. 2 and 3, and, in particular in the FOV of displays 426, includes detected waterlines 205b, portions 430 of the FOV that extend below respective waterlines 205b, and portions 434 of the FOV that extend above respective waterlines 205b. Portions 430 may include color and/or intensity shading 432 rendered by a controller (e.g., controller 221 of FIG. 2) to distinguish depths, relative distances, various characteristics of bathymetric data, and/or other characteristics of various underwater features.

As illustrated in FIG. 4, wearable portable imaging device 420 may include one or more imaging modules 423, which may be implemented as visible spectrum and/or infrared imaging modules configured to provide monocular (e.g., copied to both displays 426) and/or stereoscopic image data depending on the number and arrangement of imaging modules and the type of image processing applied to image data provided by imaging modules 423. In addition, an IPOS (e.g., IPOS 225 of FIG. 2) may be integrated with any of imaging modules 423, displays 426, and/or frame 440 and be configured to provide a position and/or orientation of one or more of the features to facilitate determining FOVs for displays 426: In some embodiments, portable imaging device 420 may be configured to determine portion 430 of the FOV of display 426 and use an SPOS and actuator in an associated transducer assembly (e.g., actuator 116 coupled to transducer assembly 112 of sonar system 110 in FIG. 1B) to ensonify at least a subset of portion 430 substantially in real time as a user adjusts a position or orientation of wearable portable imaging device 420 by, for example, moving the user's head. Sonar data provided by the associated transducer assembly may be rendered using position data and/or orientation data provided by the SPOS to correlate the sonar data with portion 430, for example, and/or to facilitate other rendering processing described herein.

In some embodiments, displays 426 may be implemented with substantially transparent display panels, where the only portions of displays 426 that obscure a direct view of scene 200, as seen by a user wearing portable imaging device 420, are those portions actively displaying rendered image data. In such embodiments, portable imaging device 420 may be configured to render and display portions 430 and/or detected waterlines 205*b* using displays 426 without also rendering portions 434.

Power for portable imaging device 420 may be embedded within frame 440 and/or electrically coupled to portable imaging device 420 through use of a wire harness and/or an external power source, such as a battery pack or a power source for a mobile structure.

Figure 5:
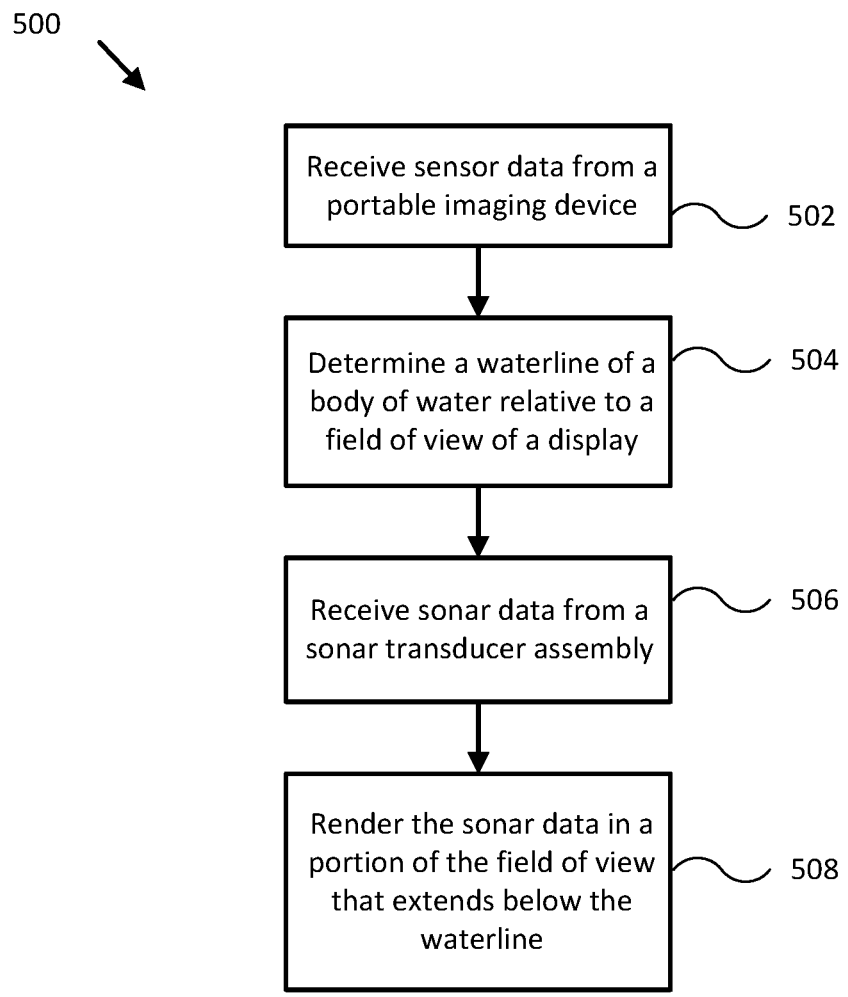
FIG. 5 illustrates a flow diagram of various operations to operate an augmented reality sonar imagery system in accordance with an embodiment of the disclosure.

FIG. 5 illustrates a flow diagram of process 500 to provide augmented reality sonar data and/or imagery for mobile structure 101 in accordance with embodiments of the disclosure. In some embodiments, the operations of FIG. 5 may be implemented as software instructions executed by one or more logic devices associated with corresponding electronic devices, sensors, and/or structures depicted in FIGS. 1A through 4. More generally, the operations of FIG. 5 may be implemented with any combination of software instructions and/or electronic hardware (e.g., inductors, capacitors, amplifiers, actuators, or other analog and/or digital components).

It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems described in reference to FIGS. 1A-4, process 500 may be performed by other systems different from those systems and including a different selection of electronic devices, sensors, assemblies, mobile structures, and/or mobile structure attributes.

Process 500 represents a method for providing augmented reality sonar data and/or imagery using systems 100, 100B, 220, and/or 420 in accordance with embodiments of the disclosure. At the initiation of process 500, various system parameters may be populated by prior execution of a process similar to process 500, for example, or may be initialized to zero and/or one or more values corresponding to typical, stored, and/or learned values derived from past operation of process 500, as described herein.

In block 502, a logic device receives sensor data from a portable imaging device. For example, controller 130 of systems 100 or 100B and/or controller 221 of portable imaging device 220 may be configured to receive visible spectrum image data and/or infrared image data from corresponding imaging modules 223 and/or 224, and position and/or orientation data corresponding to imaging modules 223 and/or 224 and/or display 226 of portable imaging device 220 from IPOS 225. In some embodiments, the controller may be configured to receive position and/or orientation data corresponding to display 225 and then use the position and/or orientation data to aim imaging modules 223 and/or 224 (e.g. using control signals provided to actuators coupled to imaging modules 223 and/or 224) so that their FOVs substantially overlap with an FOV and/or relative orientation of display 226.

In block 504, a logic device determines a waterline of a body of water relative to a field of view of a display. For example, controller 130 of systems 100 or 100B and/or controller 221 of portable imaging device 220 may be configured to determine a waterline using the image data, position data, and/or orientation data acquired in block 502. In some embodiments, the controller may be configured to use feature and/or pattern recognition processing to detect a location of waterline 205 within image data provided by imaging modules 223 and/or 224. The controller may then use the various position and/or orientation data, the location of waterline 205 within the image data, various characteristics of display 226, and/or an effective optical zoom level to determine waterline 205*b* of body of water 205*a* relative to the FOV of display 226, as described herein.

In block 506, a logic device receives sonar data from a sonar transducer assembly. For example, controller 130 of systems 100 or 100B and/or controller 221 of portable imaging device 220 may be configured to receive sonar data from sonar transducer assembly 112 of sonar system 110. In some embodiments the controller may be configured to transmit position and/or orientation data corresponding to portion 330 of the field of view of display 226 that extends below waterline 205*b*, determined in block 504, to sonar system 110 to aim transducer assembly 112 (e.g., using actuator 116 and/or an associated SPOS) at portion 330 (e.g., or to sweep transducer assembly 112 through portion 330) to acquire substantially real time sonar data corresponding to portion 330. In other embodiments, the controller may be configured to transmit such position and/or orientation data to receive sonar data limited to portion 330, such as from prior-acquired sonar data and/or from a survey map limited by partitioning the sonar data according to corresponding position and/or orientation data, which may be provided by an SPOS when the sonar data was acquired.

In block 508, a logic device renders sonar data in a portion of an FOV that extends below a waterline. For example, controller 130 of systems 100 or 100B and/or controller 221 of portable imaging device 220 may be configured to render sonar data acquired in block 506 in portion 330, as determined in part through operation of blocks 502 and/or 504. In some embodiments, the controller may be configured to render image data provided by imaging modules 223 and/or 224 in portion 334 (e.g., the portion of the FOV of display 226 that extends above waterline 205b). In such embodiments, the controller may be configured to generate combined image data from visible spectrum data and infrared image data and render the combined image data in at least a part of portion 334. In other embodiments, the controller may be configured to determine whether portion 330 overlaps with a view of mobile structure 101 (e.g., whether portion 336 exists) and blend (e.g., fuse, alpha blend, or otherwise combine) image data provided by imaging modules 223 and/or 224 with sonar data in overlapping portion 336 when rendering portion 336.

In various embodiments, the controller may be configured to apply various types of image processing to the sonar data when rendering portions 330 and/or 336, such as processing to visually differentiate real time and prior-acquired sonar data, to visually indicate a relative age of different portions of sonar data, to visually indicate surface orientations of underwater features, and/or to provide additional methods to visually differentiate different underwater features and/or different underwater feature characteristics from one another. Similarly, in some embodiments, the controller may be configured to apply various types of image processing to image data when rendering portion 334, such as processing to differentiate above-water objects from one another in low light or otherwise limited visibility environments.

In further embodiments, image data, position data, orientation data, and/or sonar data acquired and/or processed in blocks 502-508 may be used to control operation of mobile structure 101, such as by controlling steering sensor/actuator 150 and/or propulsion system 170 to steer mobile structure 101 according to an orientation of display 226, for example, and/or according to positions and/or depths of floor 206, bottom feature 207, fish 208, and/or submerged objects 209.

It is contemplated that any one or combination of methods to provide augmented reality sonar imagery may be performed according to one or more operating contexts of a control loop, for example, such as a startup, learning, running, and/or other type operating context. For example, process 500 may proceed back to block 502 and proceed through process 500 again to produce updated augmented reality sonar imagery, as in a control loop.

Embodiments of the present disclosure can thus provide augmented reality sonar imagery. Such embodiments may be used to provide sonar imagery to assist in navigation for a mobile structure, survey of a body of water, and/or to assist in the operation of other systems, devices, and/or sensors coupled to the mobile structure.

As noted herein, embodiments of the present disclosure provide techniques for 3D target selection that can be implemented with minimal user input and with intuitive user feedback, thereby providing 3D target selection that is more accurate and easier to use than conventional systems and/or methods, particularly while operating a mobile structure. More generally, such techniques may be used to provide easier selection of an object or position within any type of volume data provided by volume data source, for example, including selecting particular aircraft within a 3D plot of aircraft in an airspace generated by an air traffic control system (e.g., using AIS, radar, beacons, and/or other ranging sensor system data), selecting particular charted objects within a 3D world chart or 3D astronomical chart (e.g., generated by ranging systems and/or astronomical observation systems), selecting particular plotted objects or positions within a 3D depiction or scatterplot of volume data (e.g., including complex data), and selecting particular objects and/or positions within a 3D medical scan (e.g., detected organs, tumors, and/or other structure within a CT scan, MRI volume, and/or other 3D medical scan data).

In particular embodiments, a user interface system and method is provided for selecting a specific object with in a virtual 3D environment rendered on a two dimensional display. In some embodiments, the methodology guides a user in drawing two viewpoint vectors at different angles in the 3D space, which converge at the point/target of interest.

3D environments are difficult to navigate on conventional two dimensional computer displays. In particular, if the user wishes to select an object within the 3D space (e.g., to manipulate it in some way), there is a fundamental challenge in translating its 2D selection point (an x-y coordinate on the screen) to an effectively infinite number of positions within the 3D space (since the z component could be any value between the virtual camera location and the effective opposite edge of the 3D scene). If some objects are in the foreground, with others in the background, the user could be attempting to select any one of these, and so further input is needed to determine the intended target.

Embodiments of the present disclosure relate to systems that present a virtual 3D scene on a physical two dimensional display and provide for 3D target selection. In one embodiment, the process is as follows: 1) the user taps the screen; 2) the system draws a virtual "rod" (e.g., viewpoint vector) through the 3D scene at the angle dictated by the current virtual camera position, starting at the point where the user's finger/cursor was tapped/placed; 3) the system tilts the view through a predetermined angle to present the objects in the scene from a different perspective; 4) the system optionally prompts the user to make a second selection; 5) the user taps the screen and draws another virtual "rod" (e.g., viewpoint vector) through the 3D scene to intersect with the first one; 6) the system selects/identifies the object nearest to the intersection of the two rods and indicates its status as the active object in the user interface. The user may then carry out a chosen function on the selected object (e.g., navigate to object, add a waypoint corresponding to the object, track the object, display various characteristics of the object, such as depth, range, volume, relative or absolute tracking speed, and/or other characteristics, and/or other functions associated with operation of mobile structure 101).

FIGS. 6A-G illustrate display views implementing a 3D target selection system and/or method in accordance with an embodiment of the disclosure. In particular, display views 600-606 of FIGS. 6A-G illustrate a process to select or identify a particular object or position (e.g., fish 208) within volumetric sonar data provided by sonar system 110 and/or system 100.

Figure 6A:
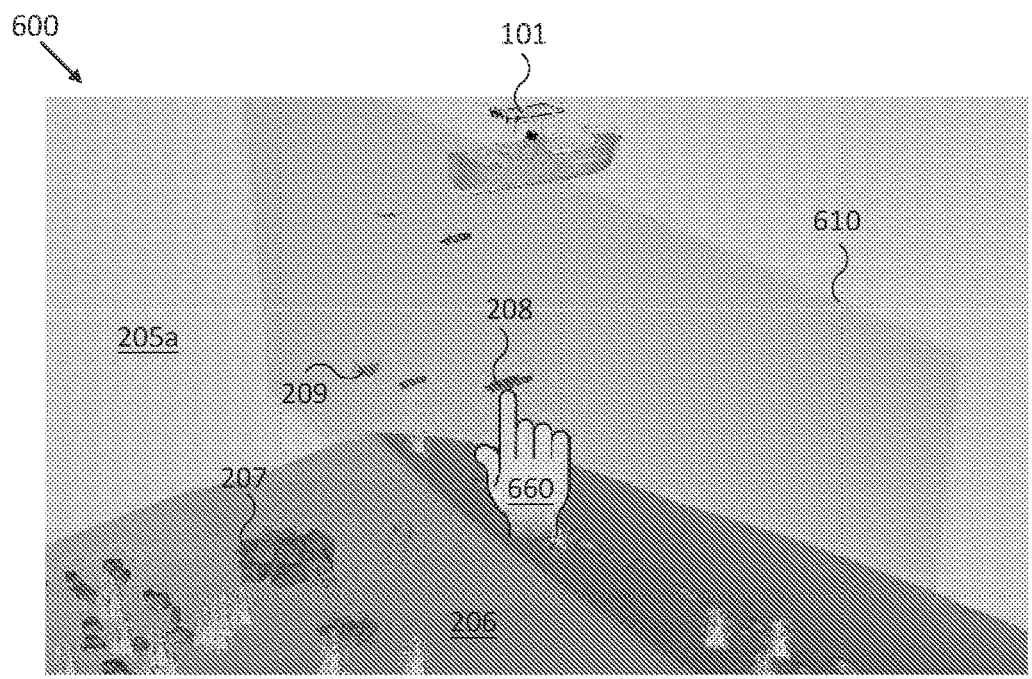
FIGS. 6A-G illustrate display views implementing a three dimensional (3D) target selection system and/or method in accordance with an embodiment of the disclosure.

For example, display view 600 of FIG. 6A illustrates a first step of 3D target selection, according to some embodiments, and shows mobile structure 101 (e.g., a representative icon rendered in display view 600) above various detected objects and/or positions in body of water 205a, including floor 206, bottom features 207, fish 208, and submerged objects 209. Also shown in display view 600 is selector 660 (e.g., representing a user input, such as a finger touch or a mouse click, for example) and optionally rendered semi-transparent plane 610, which may be used to indicate a reference position of mobile structure 101 throughout the perspective of the 3D representation of the sonar data (e.g., volume data) rendered as display view 600.

As described herein, the volume data rendered as display view 600 may be provided by one or more volume data sources, including sonar system 110, portable imaging device 220, chart data (e.g., residing in memory/controller 130/user interface 120), and/or other volume data sources. User interface 120 and/or controller 130 may be configured to receive the volume data from the volume source and render display view 600 on a display of user interface 120. User interface 120 may also be configured to receive user input (e.g., selector 660) attempting to select a particular object or position (e.g., detected fish 208), as shown.

Figure 6B:
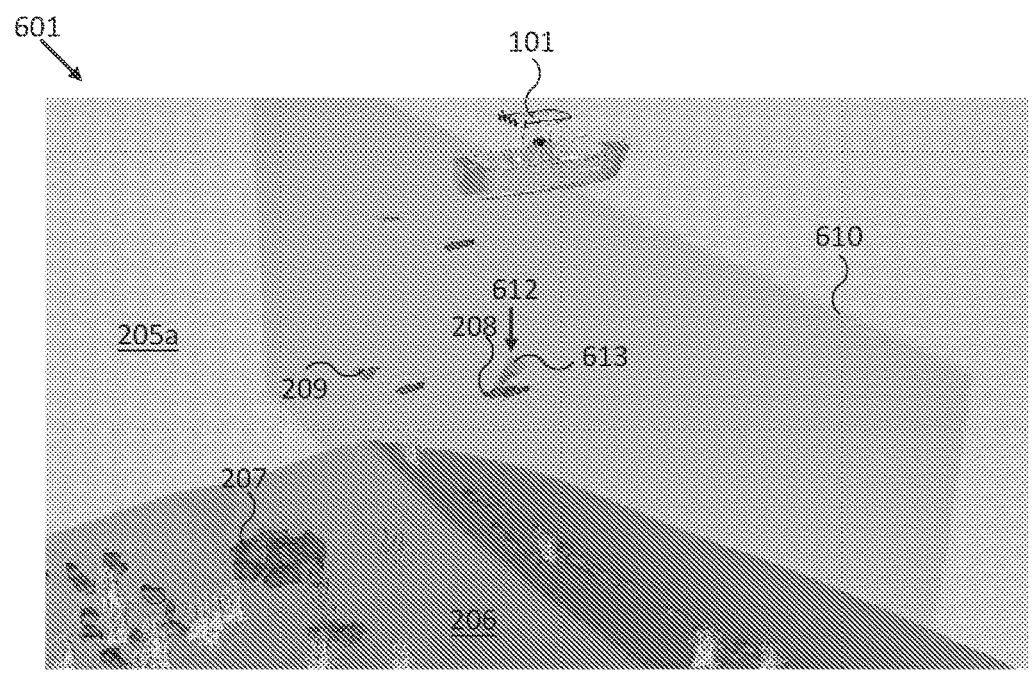

Display view 601 of FIG. 6B illustrates a second step of 3D target selection, according to some embodiments, and includes first viewpoint vector 612. For example, user interface/controller 120/130 may be configured to determine first viewpoint vector 612 (e.g., a source position 612, direction, and/or length of first viewpoint vector 612) within display view 601 based, at least in part, on the user input received by user interface 120 as shown by selector 660 in FIG. 6A.

In some embodiments, source position 613 of first viewpoint vector 612 may be the two dimensional position (e.g., pixel position) on display view 600 selected by selector 660, and the direction of first viewpoint vector 612 may be based on a projection of the virtual camera orientation corresponding to display view 600 (e.g., the "perspective" of display view 600) into display view 600, as referenced by source position 613. For example, in some embodiments, a viewpoint vector with a source position near the center of display view 600 would have a direction substantially parallel to the perspective of display view 600, and a viewpoint vector with a source position near an edge of display view 600 would have a direction based on the perspective of display view 600, the field of view (FOV) of display view 600 (e.g., the angular extent of display view 600), and the source position of the viewpoint vector. In some embodiments, the length of first viewpoint vector 612 may be indefinite (e.g., undefined and/or limited only by the extents of the volume data and/or a particular display view), for example, or may be determined based on a press force, a touch duration associated with selector 660, and/or other characteristic of a user input, as described more fully with reference to FIGS. 7-8. In other embodiments, where first viewpoint vector 612 intersects floor 206 (e.g., or another structure in the volume data or a particular display view), the length of first viewpoint vector 612 may be set as the intersection of first viewpoint vector 612 with floor 206 (e.g., or with another intersecting structure).

In some embodiments, user interface/controller 120/130 may be configured to render first viewpoint vector 612 as user feedback of the user input provided by selector 660. In various embodiments, first viewpoint vector 612 may be rendered as a rod or cylinder with a finite diameter, for example, and the diameter may be selected to be a preset percentage of display view 601, a preset number of pixels, a preset absolute measure (e.g., meters, feet, and/or other absolute distance measure), and/or may be selected to indicate a resolution of the volume data used to generate display view 601. In some embodiments, user interface/controller 120/130 may be configured to render first viewpoint vector 612 as an animated line, rod, or cylinder that progressively extends from the user input provided by selector 660 along the direction of first viewpoint vector 612 until the length of first viewpoint vector 612 reaches an extent of the volume data and/or of display view 600/601, or reaches floor 206 or other structure in display view 600/601, visually similar to a harpoon being fired from a ship with a trailing rope or chain.

Display view 601 is shown slightly tilted away from the perspective of display view 600 to more clearly differentiate first viewpoint vector 612 and its source position 613.

Figure 6C:
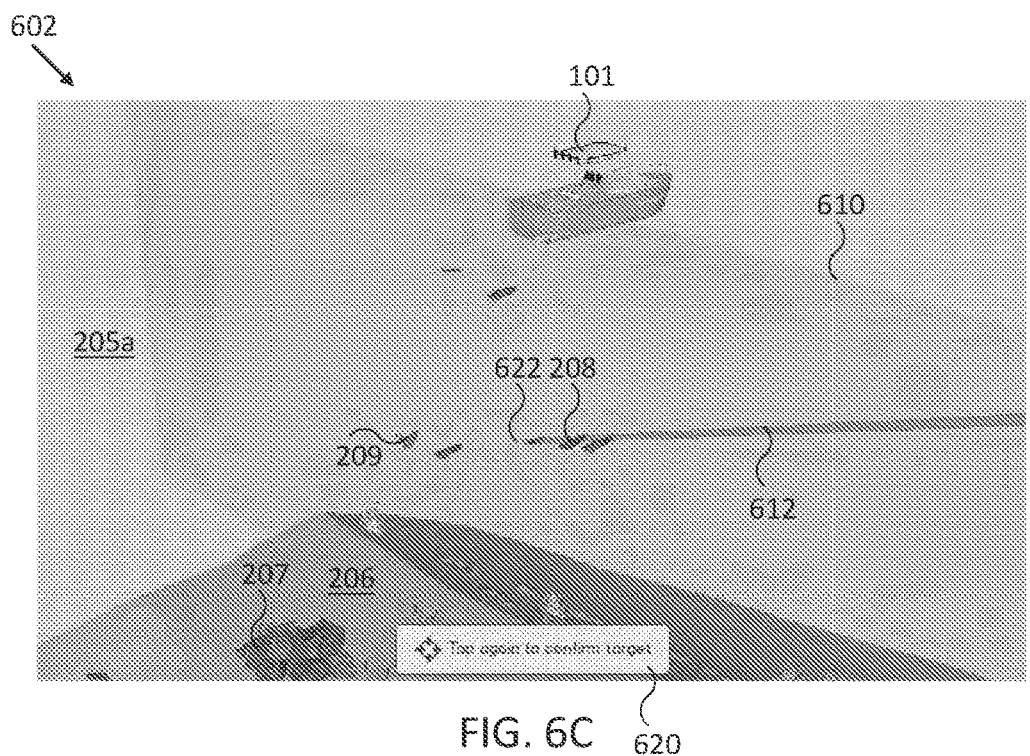

Display view 602 of FIG. 6C illustrates a third step of 3D target selection, according to some embodiments, and includes reference point 622 and optional user prompt 620. For example, user interface/controller 120/130 may be configured to render display view 602 according to a different perspective than that provided by display view 600, upon detection of the user touch provided by selector 660, by rotating the 3D representation provided by display view 600 about reference point 622 within the 3D representation provided by display views 600 and 602. It should be understood that rotating display view 600 (e.g., a perspective of a 3D representation of the volume data, corresponding to a virtual camera position for display view 600) about a reference point can be equivalent to rotating virtual data of display view 600 about the same reference point, but in an opposite direction.

In some embodiments, reference point 622 may correspond to a center point of display view 600, an intersection of first viewpoint vector 612 and plane 610, one or more objects detected in display view 600 intersected by or near/nearest to first viewpoint vector 612, and/or another position depicted within display view 600. As such, reference point 622 may be based, at least in part, on first viewpoint vector 612 and the perspective of display view 600/602. Reference point 622 may also be selected by additional user input provided to user interface 120 to indicate a position in display view 600 corresponding to the reference point. The particular type and/or position for reference point 622, including a type of automatic selection of reference point 622 (e.g., based on first viewpoint vector 612 and display view 600), may be preselected through one or more user configuration parameters.

The rotation angle for the rotation about reference point 622 may typically be between 20 and 90 degrees, for example, and more generally between 5 and 175 degrees, and may in some embodiments be preselected through one or more user configuration parameters. In other embodiments, a custom rotation angle may be selected substantially in real time by user input, such as by a user employing a user touch or a user selector device to select a point within display view 602 and drag the point across display view 602 (e.g., in a swipe motion, for a swipe distance) to rotate display view 602 about reference point 622 according to a rotation angle corresponding to the swipe distance.

In various embodiments, the axis of rotation may be a substantially vertical line through a center of display views 600/602, a line defined, at least in part, by the intersection of plane 610 with first viewpoint vector 612 (e.g., a line extending along a gravitationally defined "down" direction and through the intersection of plane 610 with first viewpoint vector 612, or a line perpendicular to first viewpoint vector 612 and within plane 610), and/or another rotation axis substantially within display views 600 and/or 602, and may also be preselected through one or more user configuration parameters. In some embodiments, the axis of rotation may be based, at least in part, on a user input including a swipe motion across the surface of a display providing display views 600 and/or 602, where the axis of rotation is substantially perpendicular to the length of the swipe. The depth of the axis of rotation into the perspective provided by display view 600/602 may be selected to be one of a variety of depths, such as at a surface of the display (e.g., the depth of the virtual camera position), the depth of the intersection of plane 610 with a center of display view 600/602, and/or other depths as may be selected by a user and/or preselected through one or more configuration parameters.

In some embodiments, such as where a length of first viewpoint vector 612 is undefined, user interface/controller 120/130 may be configured to render optional user prompt 620, for example, to indicate to a user that a second user input is required in order to identify an object or position within the portion of volume data presented by display view 602. For example, optional user prompt 620 may be configured to prompt a user to use selector 660 to indicate a second viewpoint vector, as described herein.

Figure 6D:
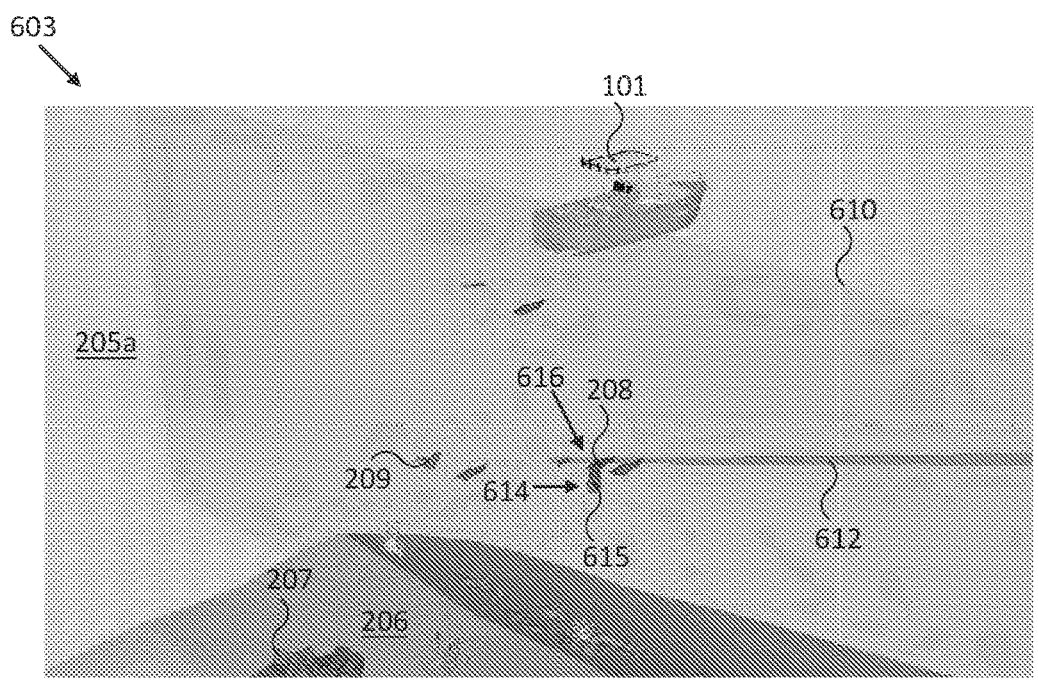

Display view 603 of FIG. 6D illustrates a fourth step of 3D target selection, according to some embodiments, and includes second viewpoint vector 614 with its source position 615 and estimated intersection 616 of first viewpoint vector 612 with second viewpoint vector 614. For example, user interface/controller 120/130 may be configured to determine second viewpoint vector 614 (e.g., a source position 615, direction, and/or length of second viewpoint vector 614) within display view 603 based, at least in part, on user input received by user interface 120, similar to that illustrated by selector 660 in FIG. 6A. Source position 615 and/or a direction of second viewpoint vector 614 may be determined similar to how source position 613 and a direction of first viewpoint vector 612 are determined, as described in reference to FIG. 6B. In various embodiments, the length of second viewpoint vector 614 may be indefinite or undefined, for example, or may be determined based on a press force, a touch duration associated with selector 660, and/or other characteristic of a user input. Second viewpoint vector 614 may be rendered as a rod or cylinder with a finite diameter, for example, and the diameter may be selected to be a preset percentage of display view 601, a preset number of pixels, a preset absolute measure, and/or may be selected to indicate a resolution of the volume data used to generate display view 603.

In various embodiments, user interface/controller 120/130 may be configured to identify an object or position (e.g., fish 208) based, at least in part, on estimated intersection 616. For example, user interface/controller 120/130 may be configured to determine the nearest approach between viewpoint vectors 612 and 614 (e.g., and/or their finite diameters) and select that position as estimated intersection 616. In other embodiments, user interface/controller 120/130 may be configured to determine a volumetric intersection of viewpoint vectors 612 and 614 based, at least in part, on their finite diameters, and select that volume as estimated intersection 616. Upon determining such estimated intersection 616, user interface/controller 120/130 may be configured to identify an object or position associated with the estimated intersection, as described herein.

Figure 6E:
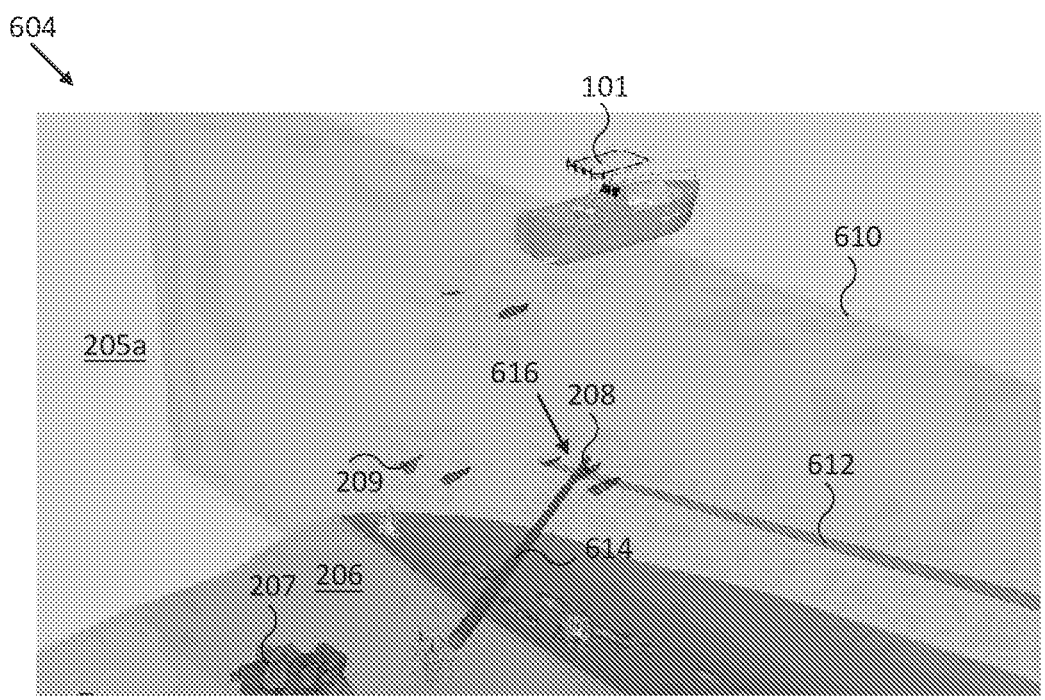

Display view 604 of FIG. 6E shows a perspective slightly tilted away from that shown in display view 603 of FIG. 6D to more clearly illustrate estimated intersection 616 of first and second viewpoint vectors 612 and 614. In some embodiments, user interface/controller 120/130 may be configured to optionally render display view 604 after determining and/or rendering second viewpoint vector 614 in order to provide clearer and/or more definite visual feedback to a user of the position of estimated intersection 616. For example, a user may view display view 604, select a "back" or "cancel" optional user prompt (e.g., similar to optional user prompt 620 in FIG. 6C), and reposition or reselect second viewpoint vector 614.

Figure 6F:
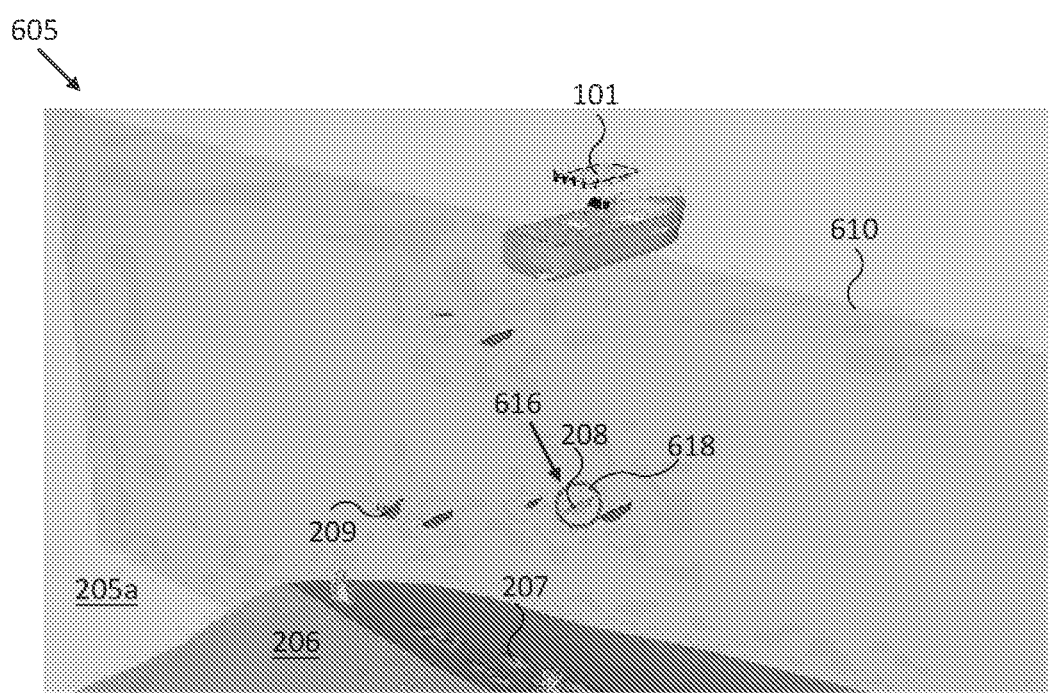

Display view 605 of FIG. 6F illustrates a fifth step of 3D target selection, according to some embodiments, and includes 3D selection graphic 618 indicating an object or position (e.g., detected fish 208) identified within the volume data displayed by display view 605. In some embodiments, user interface/controller 120/130 may be configured to identify object/position 208 based, at least in part, on first viewpoint vector 612 and its corresponding first user input (e.g., provided by selector 660 in FIGS. 6A-B). In embodiments where the user input includes a press force a touch duration and/or other characteristic of a user input, such identification may be based on a length of first viewpoint vector 612 determined according to the press force, touch duration, or other user input or touch characteristic. In other embodiments, where second viewpoint vector 614 may be used to determine estimated intersection 616, such identification may be based on estimated intersection 616.

In various embodiments, user interface/controller 120/130 may be configured to identify one or more detected/selectable objects or positions that are nearest to or within a volume defined by estimated intersection 616, for example, and render 3D selection graphic 618 indicating the identified detected objects or positions. Detected/selectable objects and/or positions may include objects detected and/or identified (e.g., as one or more types of submerged objects, bottom features, fish, and/or volume data points) in the volume data presented by display view 605. Graphics associated with such identified objects or position may be rendered in a differentiated color as compared to similar objects or positions displayed in display view 605. In other embodiments, where the length of first viewpoint vector 612 is known, user interface/controller 120/130 may be configured to identify one or more detected objects or positions that are nearest to or within a volume or surface area defined by an end of first viewpoint vector 612.

Figure 6G:
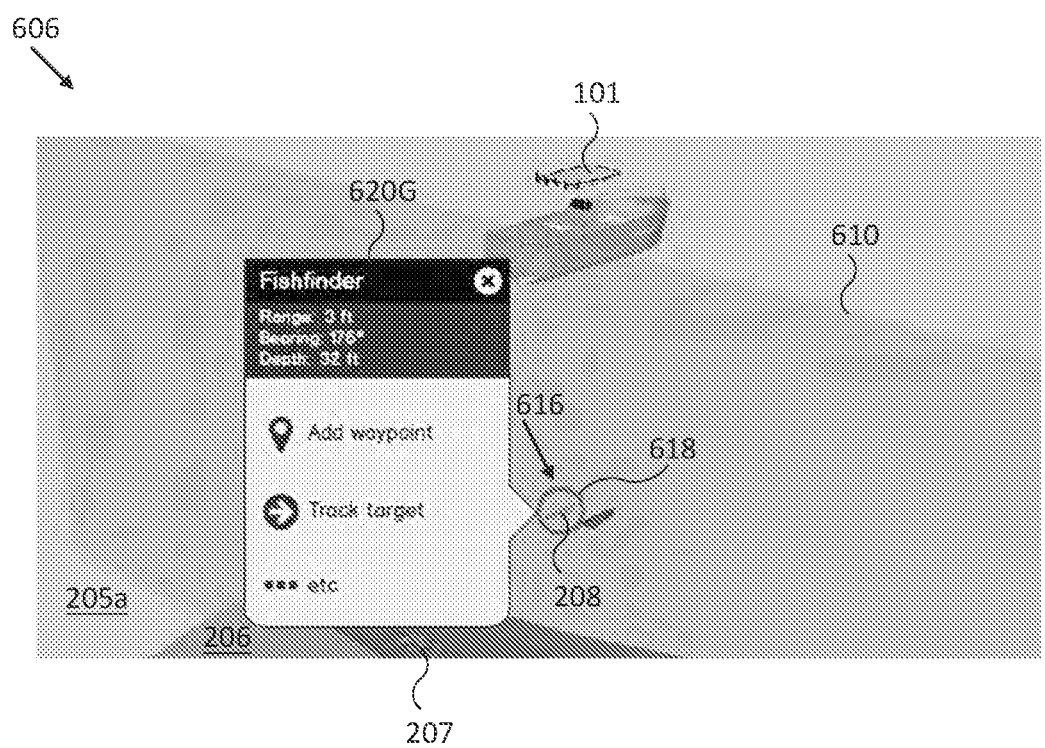

Display view 606 of FIG. 6G illustrates an optional sixth step of 3D target selection, according to some embodiments, and includes selection menu 620G indicating one or more user-selectable operations or functions to perform with respect to the object or position (e.g., detected fish 208) identified within the volume data displayed by display view 605 of FIG. 6F. In some embodiments, user interface/controller 120/130 may be configured to render selection menu 620G to indicate to a user that additional user input is required or receivable to select a particular operation to perform with respect to the object or position identified by 3D selection graphic 618, similar to the rendering of optional user prompt 620 in display view 602.

For example, such operations may include storing a waypoint corresponding to an object or position (e.g., detected fish 208) and/or 3d selection graphic 618, tracking a position, speed, and/or other characteristic of an object (e.g., detected fish 208) indicated by 3d selection graphic 618 in display view 606, and/or other navigational operations performed with respect to the detected object or position, 3d selection graphic 618, mobile structure 101, and/or a sensor system of mobile structure 101 generating the volume data presented in display view 606. In various embodiments, selection menu 620G may additionally or alternatively include one or more characteristics of an identified object, such as the type of object (e.g., fish, school of fish, vessel, hazard, unknown), an estimated size, volume, and/or density of the object, the length of time the object has been tracked, an absolute and/or relative position of the object (e.g., relative to mobile structure 101 and/or other feature in display view 606, such as above floor 206), a depth of the object, and/or other characteristic of the identified object. A stored waypoint may include an absolute surface position of object 208 (e.g., latitude and longitude), for example, and/or may include any one or combination of additional object characteristics, as described herein.

Thus, embodiments of the present disclosure provide 3D target selection that can be implemented with minimal user input (e.g., using a single user touch, or two touches, as described herein) and with intuitive user feedback, thereby providing 3D target selection that is more accurate and easier to use than conventional systems and/or methods, particularly while operating a mobile structure.

Figure 7:
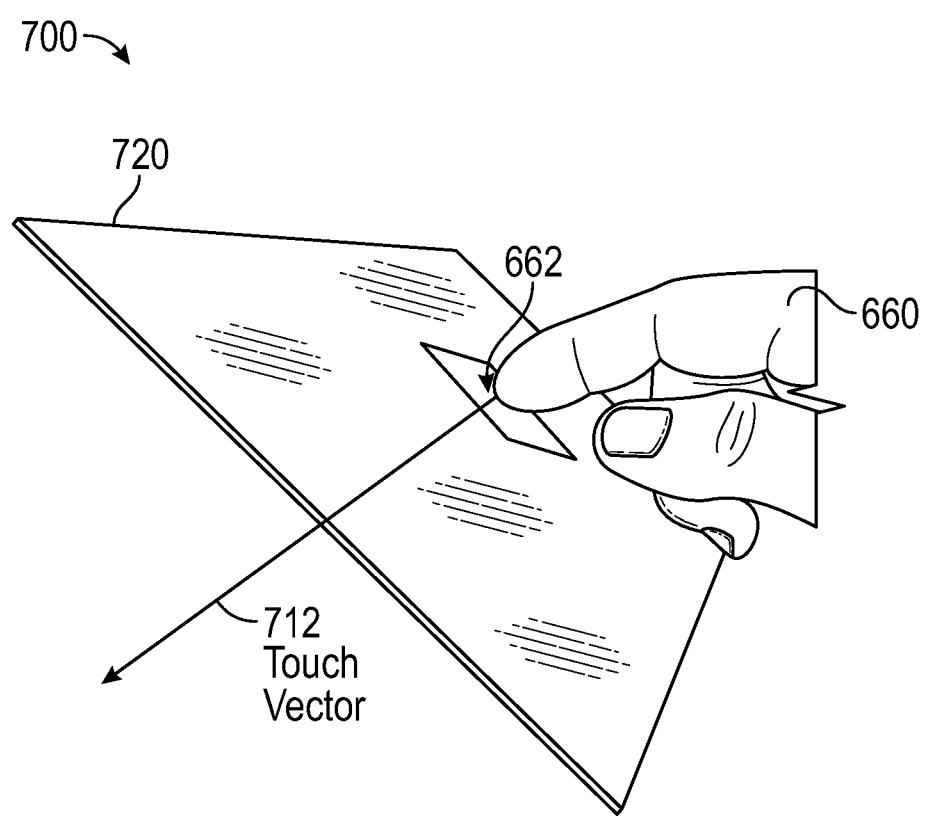
FIG. 7 illustrates a diagram of a 3D target selection system in accordance with an embodiment of the disclosure.

FIG. 7 illustrates a diagram of a 3D target selection system in accordance with an embodiment of the disclosure. In particular, FIG. 7 shows system 700 including touch sensitive display screen 720 configured to provide a length of viewpoint vector 712 (e.g., a "touch vector") in response to selector 660 providing user input 662. For example, touch sensitive display screen 720 (e.g., user interface 120) may be configured to sense a press force and/or a touch duration associated with user input 662, in addition to a screen/pixel position of user input 662, and provide such measurements as characteristics of user input 662 to controller 130. Controller 130 may be configured to determine a length of viewpoint vector 712 based on the sensed press force and/or touch duration. In various embodiments, such determination includes providing visual feedback to a user so that the user can control the press force and/or touch duration to select a desired length.

Figure 8:
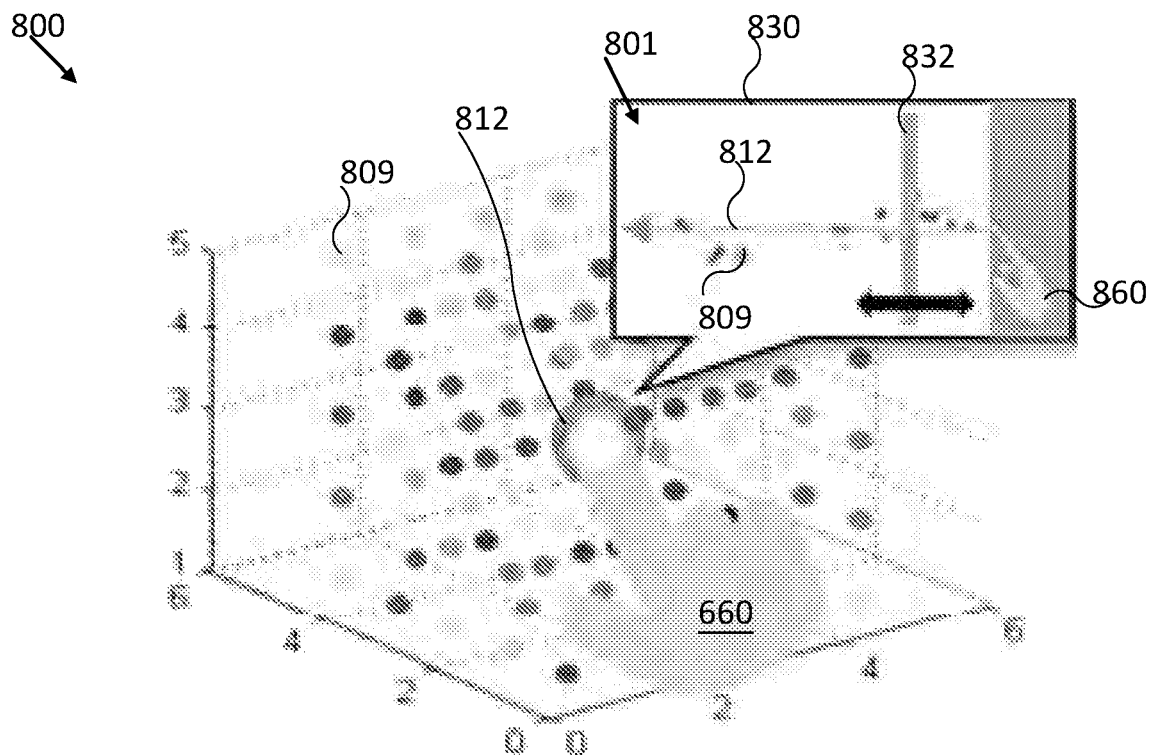
FIG. 8 illustrates a display view implementing a 3D target selection system and/or method in accordance with an embodiment of the disclosure.

For example, FIG. 8 illustrates a display view 800 implementing a 3D target selection system and/or method in accordance with an embodiment of the disclosure. As shown in the embodiment presented by FIG. 8, display view 800 includes a 3D plot of volume data 809 rendered according to a first perspective and inset/popup window 830 providing display view 801 of a portion of volume data 809 substantially along viewpoint vector 812 and rendered according to a second perspective. In various embodiments, display view 801 may be rendered according to a perspective that is substantially orthogonal to viewpoint vector 812, as shown, and that may be generated by rotating display view 800 about a reference point within display view 800, similar to the process described with reference to FIG. 6C. It should be understood that rotating display view 800 (e.g., a perspective of a 3D representation of the volume data, corresponding to a virtual camera position for display view 800) about a reference point can be equivalent to rotating virtual data of display view 800 about the same reference point, but in an opposite direction.

For example, user interface/controller 120/130 may be configured to render a second perspective provided by display view 801 within window 830 with selector indicator 860, feedback vector length indicator 832, and a portion of volume data 809 that lies within a preselected radius away from viewpoint vector 812 along a length of viewpoint vector 812. In various embodiments, user interface/controller 120/130 may be configured to render feedback vector length indicator 832 along viewpoint vector 812 within the second perspective as visual feedback of a current press force or a current touch duration of user touch 662 (e.g., provided by selector 660). User interface/controller 120/130 may then determine a viewpoint vector length of viewpoint vector 812 based, at least in part, on the feedback vector length corresponding to feedback vector length indicator 832 and/or a detected release of a user touch. In embodiments where the user input is through a user selector device, such as a mouse or joystick, feedback vector length indicator 832 may be rendered according to a press force or selection duration of the user input (e.g., measured at the user selector device), and the viewpoint vector length may be determined based, at least in part, on the feedback vector length corresponding to feedback vector length indicator 832 and/or a detected release of the selector device.

In some embodiments, feedback vector length indicator 832 may be implemented as a bar or other shaped indicator moving forward and backward along viewpoint vector 812 in display view 801 in response to a detected press force, and/or forward along viewpoint vector 812 in response to a detected/accumulated touch duration (e.g., which may cycle back to a zero feedback vector length after reaching an extent of viewpoint vector 812 within display view 801). In other embodiments, feedback vector length indicator 832 may indicate only the maximum press force or touch duration associated with a user touch up until a detected release of a user touch or selector device. In alternative embodiments, feedback vector length indicator 832 may be implemented as a differentiated color along a length of viewpoint vector 812 in display view 801 that varies according to the applied press force and/or touch/selection duration. More generally, feedback vector length indicator 832 may be implemented as any graphic, color, indicator, or icon configured to convey visual feedback of a current press force or touch/selection duration applied to a touch screen display and/or other user interface device that corresponds to a desired length of viewpoint vector 812.

In additional embodiments, where the portion of volume data 809 in viewpoint 801 corresponds to a detected set of objects or positions within volume data 809, user interface/controller 120/130 may be configured to render a set of feedback vector lengths along viewpoint vector 812 within display view 801 as visual feedback of vector lengths corresponding to the detected set of objects or positions within volume data 809. For example, feedback vector length indicator 832 may increment from one volume data 809 included in display view 801 to a next volume data 809, in an increasing series of steps corresponding to the detected set of objects/positions, as opposed to varying relatively continuously along a length of viewpoint vector 812 according to an applied press force and/or touch/selection duration.

In one embodiment, feedback vector length indicator 832 may increment between adjacent detected objects/positions at each detected user touch or user input (e.g., taps of a display, or clicks of a mouse), regardless of any detected press force or touch/selection duration, for example, and a user may confirm a particular vector length by selecting any portion of display view 801. Feedback vector length indicator 832 may also increment between adjacent detected objects/positions while a user touch or user input is being pressed. In still further embodiments, a user may define a particular vector length by dragging feedback vector length indicator 832 to a desired position along viewpoint vector 812. In embodiments where only one detected object/position remains within display view 801 (e.g., based on a direction of viewpoint vector 812 and/or a corresponding radius/diameter), feedback vector length indicator 832 may be automatically adjusted to indicate the vector length corresponding to the one detected object/position. In various embodiments, user interface/controller 120/130 may be configured to identify one or more objects or positions in display view 800 based on the set of feedback vector lengths and a detected release of the user touch/user input. In various embodiments, user input may be provided by user touch, a user selector device, or any combination of those.

Figure 9:
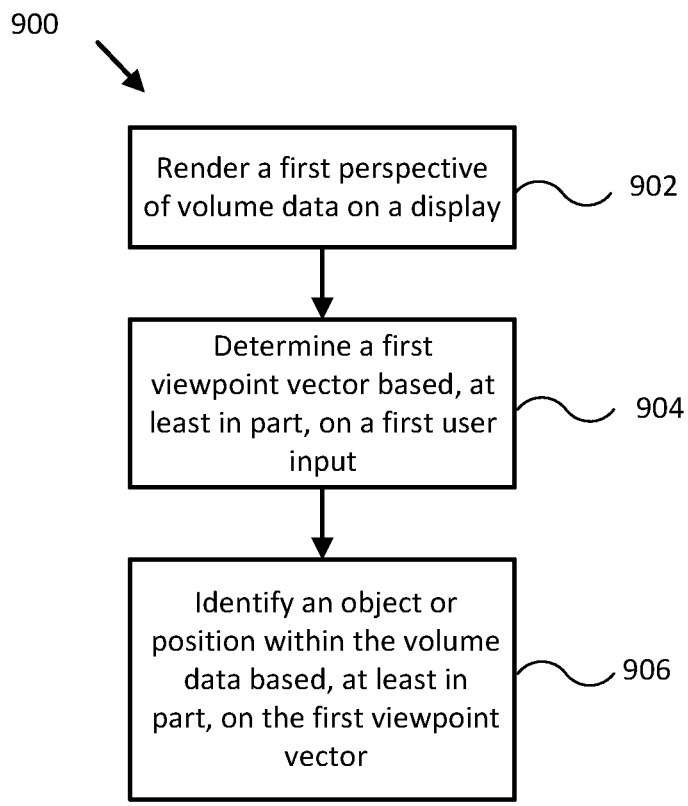
FIG. 9 illustrates a flow diagram of various operations to operate a 3D target selection system in accordance with an embodiment of the disclosure.

FIG. 9 illustrates a flow diagram of various operations to operate a 3D target selection system in accordance with an embodiment of the disclosure. In some embodiments, the operations of FIG. 9 may be implemented as software instructions executed by one or more logic devices associated with corresponding electronic devices, sensors, and/or structures depicted in FIGS. 1A through 4 and 7. More generally, the operations of FIG. 9 may be implemented with any combination of software instructions and/or electronic hardware (e.g., inductors, capacitors, amplifiers, actuators, or other analog and/or digital components).

It should be appreciated that any step, sub-step, sub-process, or block of process 900 may be performed in an order or arrangement different from the embodiments illustrated by FIG. 9. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 900 is described with reference to systems of FIGS. 1A-4 and 7, process 900 may be performed by other systems different from those systems and including a different selection of electronic devices, sensors, assemblies, mobile structures, and/or mobile structure attributes.

Process 900 represents a method for providing 3D target selection using systems 100, 100B, 220, 420, and/or 700 in accordance with embodiments of the disclosure. At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 902, a logic device renders a first perspective of volume data on a display. For example, controller 130 of systems 100 or 100B and/or controller 221 of portable imaging device 220 may be configured to render a first perspective (e.g., display view 600) of a 3D representation of volume data provided by a volume data source (e.g., sonar data provided by sonar system 110) on a display of a user interface (e.g., a display of user interface 120 and/or display 226 of portable imaging device 220). Such volume data may include one or more detected objects and/or positions corresponding to structure and/or data characteristics within the volume data. In various embodiments, controller 130 of systems 100 or 100B and/or controller 221 of portable imaging device 220 may be configured to generate the volume data from sensor data provided by a ranging sensor system, including sonar system 110, a radar or LIDAR system, and/or other ranging sensor systems.

In some embodiments, controller 130 of systems 100 or 100B and/or controller 221 of portable imaging device 220 may be configured to retrieve volume data from a memory device, such as chart, plot, and/or other stored volume data. In particular embodiments, the volume data source may be implemented by a sensor assembly configured to generate sensor data corresponding to an environment about a mobile structure, and the volume data includes the sensor data corresponding to the environment about the mobile structure. In specific embodiments, the mobile structure may be implemented by a watercraft, the sensor assembly may be implemented by a sonar transducer assembly configured to be mounted to the watercraft and placed in a body of water, and the sensor data includes sonar data generated by the sonar transducer assembly. In various embodiments, the first perspective may be updated iteratively (e.g., similar to video or animated graphics) as a position of mobile structure 101 changes and/or corresponding sensor/volume data is updated.

In block 904, a logic device determines a first viewpoint vector based, at least in part, on a first user input. For example, controller 130 of systems 100 or 100B and/or controller 221 of portable imaging device 220 may be configured to determine first viewpoint vector 612 within the 3D representation rendered in block 902 based, at least in part, on a first user input received by a user interface (e.g., a display or user selector device of user interface 120 and/or portable imaging device 220).

In embodiments where the received first user input includes a press force or a touch/selection duration corresponding to detection of the first user input and/or a user touch on a display while rendering the first perspective, controller 130 of systems 100 or 100B and/or controller 221 of portable imaging device 220 may be configured to determine a viewpoint vector length of the first viewpoint vector based, at least in part, on the press force or the touch/selection duration of the first user input.

In some embodiments, controller 130 of systems 100 or 100B and/or controller 221 of portable imaging device 220 may be configured to render a second perspective of the 3D representation (e.g., display view 801), upon detection of a user touch on a display, by rotating the 3D representation (e.g., display view 800 and/or the constituent volume data 809) about a reference point within the 3D representation, render a feedback vector length 832 along the first viewpoint vector 812 within the second perspective (e.g., display view 801) as visual feedback of a current press force, a current touch duration, and/or other characteristic of the user touch, and determine the viewpoint vector length based, at least in part, on the feedback vector length 832 and/or a detected release of the user touch. In other embodiments, controller 130 of systems 100 or 100B and/or controller 221 of portable imaging device 220 may be configured to render display view 801, upon detection of a first user input, by rotating display view 800 and/or volume data 809 about a reference point within display view 800, render feedback vector length 832 along first viewpoint vector 812 within display view 801 as visual feedback of a current press force, a current selection duration of the first user input, or other characteristic of the first user input, and determine the viewpoint vector length based, at least in part, on feedback vector length 832 and/or a detected release of the first user input. In embodiments where the display view is iteratively updated, such as according to changes in position of mobile structure 101 and/or acquisition of new/updated volume data, controller 130 and/or controller 221 may be configured to at least temporarily halt such updates upon detection of the first user input.

In additional embodiments, controller 130 of systems 100 or 100B and/or controller 221 of portable imaging device 220 may be configured to detect a set of objects or positions (e.g., objects and/or positions 206, 207, 208, 209) within the volume data (e.g., volume data 809) substantially intersecting first viewpoint vector 612/812 or within a predefined cylindrical radius from first viewpoint vector 612/812, render display view 801, upon detection of a first user input, by rotating display view 800 about a reference point within display view 801, and render a set of feedback vector lengths 832 along first viewpoint vector 812 within display view 801 as visual feedback of vector lengths corresponding to the detected set of objects or positions within the volume data. In additional and/or alternative embodiments, controller 130 of systems 100 or 100B and/or controller 221 of portable imaging device 220 may be configured to render selection reticules (e.g., similar to 3D selection graphic 618 but including a differentiating color or icon indicating potential objects or positions as opposed to an identified object or position indicated by 3D selection graphic 618) about the detected set of objects or positions substantially intersecting first viewpoint vector 612/812 or within a predefined cylindrical radius from first viewpoint vector 612/812 in display view 602 or 801, for example. Such selection reticules allow a user to select and identify a particular potential object or position out of the set of objects or positions. Detection of objects or positions within a particular set of volume data may be performed on an ongoing basis, for example, or may be initiated upon detection of the first user input. Detection of particular objects and types of objects in the volume data may include performing various types of static and/or differential pattern recognition, signal noise removal, and/or other object detection methods.

In still further embodiments, where a vector length of first viewpoint vector 612 is undefined, controller 130 of systems 100 or 100B and/or controller 221 of portable imaging device 220 may be configured to render a second perspective of the 3D representation (e.g., display view 603) by rotating the 3D representation (e.g., display view 600 and/or constituent volume data) about a reference point within the 3D representation, and determine second viewpoint vector 614 in the 3D representation based, at least in part, on a second user input provided to the user interface (e.g., a display or user selector device of user interface 120 and/or portable imaging device 220).

In block 906, a logic device identifies an object or position within volume data base, at least in part, on a first viewpoint vector. For example, controller 130 of systems 100 or 100B and/or controller 221 of portable imaging device 220 may be configured to identify an object or position (e.g., objects or positions 206, 207, 208, 209) within volume data (e.g., volume data 809) based, at least in part, on first viewpoint vector 612/812 and a first user input (e.g., provided by selector 660).

In embodiments where the received first user input includes a press force or a touch/selection duration corresponding to detection of the first user input and/or a user touch on a display while rendering the first perspective, controller 130 of systems 100 or 100B and/or controller 221 of portable imaging device 220 may be configured to identify the object or position by determining a nearest selectable object (e.g., 208), within the volume data, to an end of first viewpoint vector 812 as defined by the viewpoint vector length determined in block 904. In embodiments where the volume data includes a set of detected objects or positions (e.g., objects or positions 206, 207, 208, 209) controller 130 of systems 100 or 100B and/or controller 221 of portable imaging device 220 may be configured to identify the object or position based on the set of feedback vector lengths and a detected release of a user touch/first user input, determined/detected in block 904.

In still further embodiments, where a vector length of first viewpoint vector 612 is undefined, controller 130 of systems 100 or 100B and/or controller 221 of portable imaging device 220 may be configured to identify the object or position based, at least in part, on estimated intersection 616 of first and second viewpoint vectors 612 and 614 determined in block 904. For example, controller 130 of systems 100 or 100B and/or controller 221 of portable imaging device 220 may be configured to determine the nearest approach between viewpoint vectors 612 and 614 (e.g., and/or their finite diameters) and select that position as estimated intersection 616. In other embodiments, user interface/controller 120/130 may be configured to determine a volumetric intersection of viewpoint vectors 612 and 614 based, at least in part, on their finite diameters, and select that volume as estimated intersection 616. In embodiments where estimated intersection 616 of first and second viewpoint vectors 612 and 614 is a volumetric intersection of first and second viewpoint vectors 612 and 614 (e.g., where the viewpoint vectors include a finite diameter), controller 130 of systems 100 or 100B and/or controller 221 of portable imaging device 220 may be configured to identify (e.g., using 3d selection graphic 618) objects or positions disposed at least partially within the volumetric intersection of first and second viewpoint vectors 612 and 614.

Once such objects or positions are identified, controller 130 and/or controller 221 may be configured to render a selection menu (e.g., selection menu 620G) indicating one or more user-selectable operations or functions to perform with respect to the identified object or position. Such operations may include storing a waypoint corresponding to the identified object or position and/or 3d selection graphic 618, tracking a position, speed, and/or other characteristic of the identified object, and/or other navigational operations performed with respect to the detected object or position, 3d selection graphic 618, mobile structure 101, and/or a sensor system of mobile structure 101.

Thus, embodiments of the present disclosure provide 3D target selection that can be implemented with simplified user input and intuitive user feedback, thereby providing 3D target selection that is accurate and reliable when performed while operating a mobile structure.

In another aspect of the present disclosure, various techniques are disclosed for enhancing a user's viewing experience of a digitally rendered 3D representation of a scene (e.g., an underwater environment, etc.) by providing intuitive indicator keys that are customized for different viewing scenarios. The 3D representation is rendered, in some embodiments, by a logic device based on volume data (e.g., sonar data) received from a volume data source (e.g., sonar system 110, mobile structure 101, etc.). In some embodiments, various indicators (also referred to as "annotations" hereinafter) that are not part of the scene may be introduced to the rendered 3D representation. For example, the indicators may include a set of depth indicators, a set of range indicators, and/or a coverage boundary indicator. In particular, each set of indicators may be rendered within or on a two dimensional (2D) plane that is bound to a fixed rotational axis within the 3D representation, and the 2D plane may rotate about the rotational axis within the 3D representation in response to a detected change in perspective (e.g., a change in the view of the 3D representation as displayed to a user on a display of user interface 120).

For example, the 2D plane on which the set of range indicators is rendered may rotate about its fixed rotational axis in response to user selection of a new viewing perspective of the 3D representation so that the set of range indicators are displayed in a direction that is more favorable for viewing in and/or substantially aligned with the new viewing perspective, as limited by the fixed rotational axis of the range indicator plane. Similarly, the 2D plane on which the set of depth indicators is rendered may rotate about its fixed rotational axis in response to user selection of a new viewing perspective of the 3D representation so that the set of depth indicators are displayed in a direction that is more favorable for viewing in and/or substantially aligned with the new viewing perspective, as limited by the fixed rotational axis of the depth indicator plane. In another example, the 2D plane within or on which the coverage boundary indicator is rendered may rotate about its corresponding rotational axis in response to a detected change in orientation (a change in attitude) of the volume data source.

In some embodiments, the disclosed features (e.g., indicator keys) added to a 3D representation of the underwater environment may advantageously ease a user's interpretation of the scene and aid the user in the fishing experience. The features may include various annotation techniques and highlighting techniques.

A sonar system (e.g., sonar system 110 of mobile structure 101) or combined sonar systems may generate a 3D representation of an environment below a water surface. Such 3D representation may include representations of various real world objects within a scene (e.g., an underwater environment). In some embodiments, the sonar system comprises a 3D capable sonar or a depth sensing sonar, which may be configured to convert a track (e.g., sonar data) to 3D or volume data. The sonar system may also include (or be communicatively coupled with) a GPS module (e.g., GPS module 146) to obtain position data in order to support the generation of the 3D representation of the scene. Preferably, the sonar system also includes an attitude sensor to detect and/or correct the physical attitude of the sonar system, a logic device (e.g., controller 130 and/or user interface 120) configured to convert sonar data to volume data and generate a 3D representation, a display (e.g., display 226) configured to display a rendering of the 3D representation, and a user interface (e.g., user interface 120) configured to enable the user to interact with the rendering of the 3D representation.

In some embodiments, in addition to generating a 3D representation of a scene based on sonar data, GPS data, and optionally attitude data, the sonar system of some embodiments is configured to add one or more of the following features to aid a user's interpretation of the scene: a depth and range grid, surface range circles markers, direction indicators that align with the boat direction, direction indicators that align with north, axis aligned annotation on depth and range markers, complimentary color of text foreground in response to scene background color, axis aligned color key, beam shape indicator with attitude information, vessel position indicator with attitude information, and axis aligned way point and object indicators. These features will now be described in more detail in the following sections below.

3D Underwater Scene Point Cloud

In some embodiments, sonar system 110 and/or mobile structure 101 is configured to generate a 3D representation of an underwater scene (e.g., a virtual 3D underwater scene) using point clouds to represent each echo return from the underwater environment and structure, which is described in detail in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. Each echo return is a result of a sonar transducer assembly (e.g., a volume data source) emitting an acoustic signal and the signal reflecting back from an underwater object or surface. Echo returns or portions thereof typically have higher intensities when an object or surface has certain characteristics, such as being harder, having a rougher or smoother surface, having higher back scatter characteristics, having a surface facing directly back to a transducer of the sonar transducer assembly, etc. Similarly, echo returns or portions thereof can have lower intensities when an object or surface includes poorer reflectors or is in areas shadowed or obscured (e.g., by other objects) from the emitted signal or from the receptive sonar transducer(s). The time for the echo to reflect back to the sonar transducer assembly may be used to determine a range between the object or surface and the sonar transducer assembly (e.g., a depth of the object). Different techniques may be applied to differentiate how the points are rendered based on the characteristics of the echo returns. In general, points that are rendered close to each other would generate the appearance of a point cloud that can define a surface of an underwater object or surface.

Figure 10:
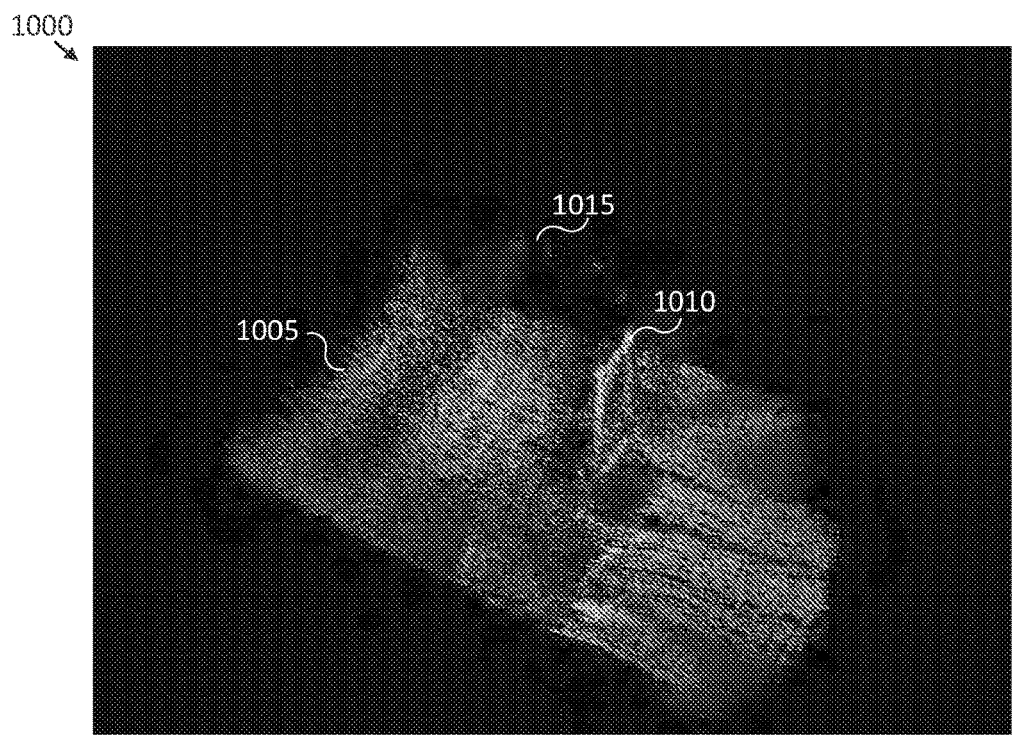
FIG. 10 illustrates a display view implementing a 3D representation generation techniques in accordance with some embodiments of the disclosure.

In some embodiments, sonar system 110 and/or mobile structure 101 may be configured to render the points in the point cloud with luminosity (brightness) levels proportional to the intensity levels of the echo returns. FIG. 10 illustrates a display view 1000 that implements such an approach to render a 3D representation of an underwater scene. As shown, view 100 shows different objects, including a floor 1005, a bridge strut 1010, and other in-water objects (e.g., bait schools) 1015 that are made up of various shades of brown points (dots). As such, the portion of the 3D representation that is darker (e.g., some portion of floor 1005) means that the corresponding real world object either provided a relatively low intensity echo return or is shadowed from the sonar (e.g., areas behind bridge strut 1010).

Depth and Range Grid

In some embodiments, in addition to rendering representations for various objects in the scene, sonar system 110 and/or system 100 is configured to introduce one or more indicator keys (annotations) in the 3D representation to aid users in interpreting the 3D representation. For example, sonar system 110 and/or system 100 may be configured to introduce a grid in the 3D representation to help a user to determine range and depth positions of the various detected objects within the 3D representation. In some embodiments, the grid is introduced in the 3D representation at the point at which new data is being added to the 3D representation from the sonar system 110 and/or system 100 with grid lines annotated with text identifying the horizontal range either side of mobile structure 101 and depth below the water surface.

Figure 11:
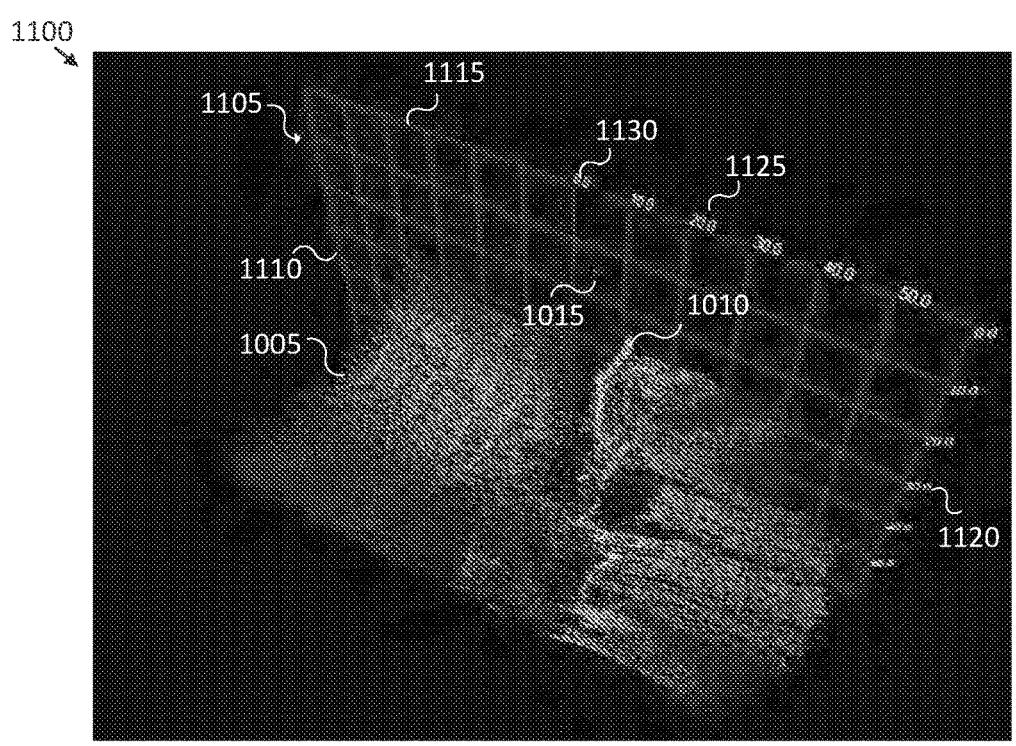
FIG. 11 illustrates a display view that shows a grid rendered within a 3D representation in accordance with an embodiment of the disclosure.

FIG. 11 illustrates an example grid 1105 that may be added to a 3D representation of an underwater scene by sonar system 110 and/or system 100. Similar to display view 1000 of FIG. 10, display view 1100 includes a 3D representation of various detected underwater objects such as floor 1005, bridge strut 1010, and bait school 1015. In addition, display view 1100 also shows grid 1105 being rendered in the 3D representation. As shown, grid 1105 is being rendered on a two dimensional (2D) plane having a vertical axis and a horizontal axis. Grid 1105 has vertical grid lines (e.g., grid line 1110) that are aligned with (parallel to) the vertical axis of the 2D plane and horizontal grid lines (e.g., grid line 1115) that are aligned with (parallel to) the horizontal axis of the 2D plane. Preferably, the vertical axis (the vertical grid lines) of the 2D plane is parallel to a direction of the gravity (e.g., vertical axis 104), such that the horizontal grid lines (e.g., grid line 1115) provide indications of different depth levels.

In some embodiments, the horizontal axis of the 2D plane on which grid 1115 is rendered may be tied to an orientation of sonar system 110 and/or mobile structure 101. For example, the horizontal axis of the 2D plane (and the horizontal grid lines) may be parallel to either the longitudinal axis 102 or the lateral axis 103. In other embodiments, the horizontal axis of the 2D plane for grid 1105 may be tied to an absolute direction (e.g., Magnetic North). For example, the horizontal axis of the 2D plane may be parallel to the east/west directions with respect to Magnetic North. Preferably, grid 1115 is centred at a location of sonar system 110 and/or mobile structure 101 such that the vertical grid lines (e.g., grid line 1110) provide indications of range distances from sonar system 110 and/or mobile structure 101. In this example, the location in the middle of the top horizontal grid line (position 1130) is where sonar system 110 or mobile structure 101 is located in the 3D representation.

To further assist the users to determine depth and range distances within the 3D representation, sonar system 110 and/or system 100 of some embodiments is configured to also render additional indication keys such as a depth scale 1120 and a range scale 1125 to be displayed next to grid 1115.

Depth scale 1120 of some embodiments includes multiple numbers (e.g., 0.0, 10.0, 20.0, 30.0, 40.0, 50.0, etc.) for indicating the different depth levels for the corresponding horizontal grid lines. As shown, sonar system 110 and/or system 100 may be configured to render depth scale 1120 on a 2D plane separate from the 2D plane on which grid 1115 is rendered. The 2D plane on which depth scale 1120 is rendered may share the same vertical axis as the 2D plane on which grid 1115 is rendered. In some embodiments, a vertical edge of depth scale 1120 adjoins a vertical edge of grid 1105, as shown in FIG. 11. However, the 2D plane on which depth scale 1120 is rendered may have a different horizontal axis than the 2D plane on which grid 1115 is rendered.

Similar to depth scale 1120, range scale 1125 also includes multiple numbers (e.g., 0.0, 10.0, 20.0, 30.0, 40.0, 50.0, etc.) for indicating the different range distances for the corresponding vertical grid lines from the location of sonar system 110 or mobile structure 101. As shown, sonar system 110 and/or system 100 may be configured to render range scale 1125 on a 2D plane separate from the 2D plane on which grid 1115 is rendered. The 2D plane on which range scale 1125 is rendered may share the same horizontal axis as the 2D plane on which grid 1115 is rendered. In some embodiments, a horizontal edge of range scale 1125 adjoins a horizontal edge of grid 1105, as shown in FIG. 11. However, as shown, the 2D plane on which range scale 1125 is rendered may have a different vertical axis than the 2D plane on which grid 1115 is rendered.

One feature of the indicator keys according to various embodiments of the disclosure is the ability to automatically rotate depth scale 1120 and range scale 1125 for better viewing in a particular viewing perspective. In this regard, range scale 1125 and depth scale 1120 have their respective rotational axes. For example, range scale 1125's rotational axis can be its horizontal axis, and preferably, range scale 1125's rotational axis is aligned with the horizontal edge that adjoins grid 1105. Similarly, depth scale 1120's rotational axis can be its vertical axis, and preferably, depth scale 1120's rotational axis is aligned the vertical edge that adjoins grid 1105. It is noted that the entire depth scale 1120 or range scale 1125 is rotated as a whole about the rotational axis. In other words, all of the text (numerals) that belong to depth scale 1120 or range scale 1125 are fixed on their corresponding 2D plane and rotate together about their rotational axis.

In some embodiments, sonar system 110 and/or system 100 is configured to rotate range scale 1125 and depth scale 1120 about their respective rotational axes in response to a change of a viewing perspective. In other words, the annotations rotate towards the virtual camera as the viewing perspective is changed. In such embodiments, as mobile structure 101 detects an indication of a change from a current viewing perspective to a new viewing perspective (e.g., receiving a user input via user interface 120), mobile structure 101 is configured to rotate depth scale 1120 and range scale 1125 about their respective rotational axes such that the text (numbers) on the scale would face the virtual camera in the new viewing perspective.

Figure 12A:
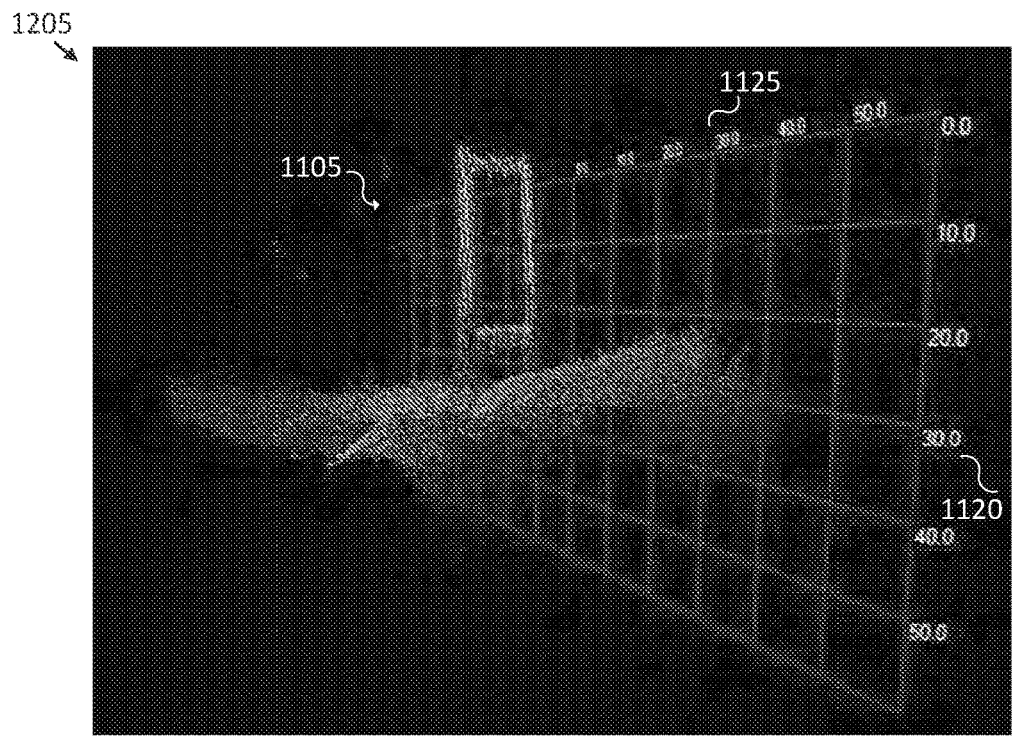
FIG. 12A illustrates a display view that shows a depth scale and a range scale rotated about an axis within a rendered 3D representation in response to a changed view perspective in accordance with an embodiment of the disclosure.

FIG. 12A illustrates display view 1205 after the viewing perspective has been changed from the viewing perspective of FIG. 11 to a new viewing perspective. As shown, while grid 1105 is fixed in the same orientation, range scale 1125 has been rotated about its horizontal axis (around the horizontal edge of grid 1105) and depth scale 1120 has been rotated about its vertical axis (around the vertical edge of grid 1105) so that they face more toward the virtual camera in order to improve the viewing experience in the new viewing perspective.

Figure 12B:
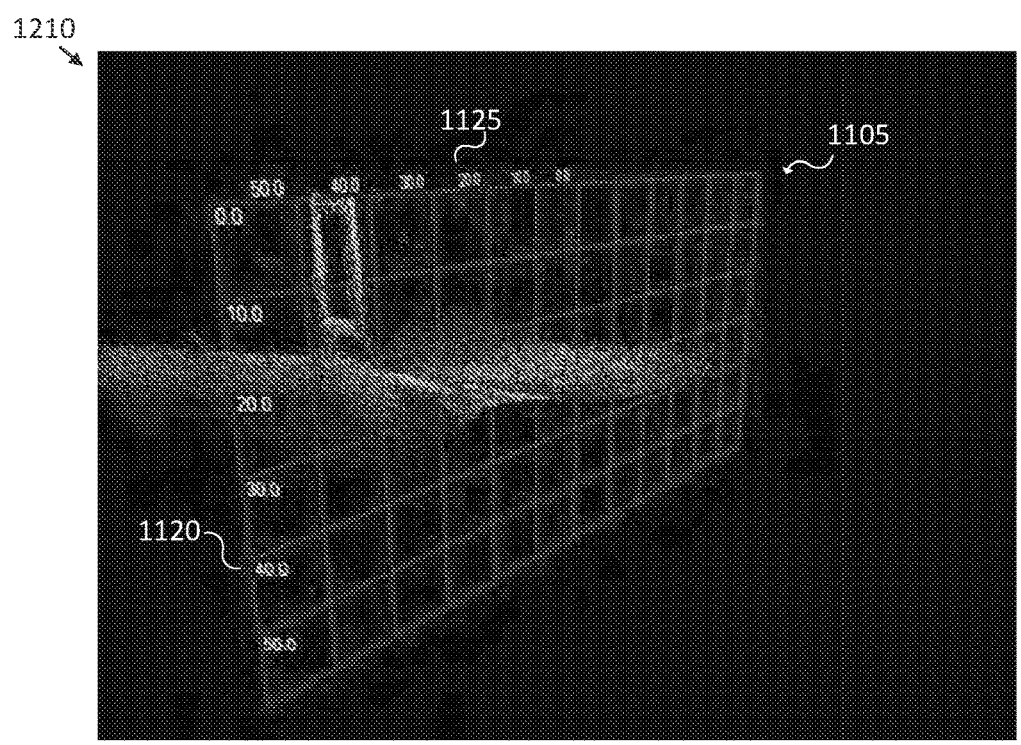
FIG. 12B illustrates another display view that shows a depth scale and a range scale rotated about an axis within a rendered 3D representation in response to a changed view perspective in accordance with an embodiment of the disclosure.

FIG. 12B illustrates another display view 1210 after the viewing perspective has been changed from the viewing perspective of FIG. 12A to a new viewing perspective. As shown, grid 1105 is still fixed in the same orientation within the 3D representation—same orientation as in the viewing perspectives shown in FIG. 12A. However, range scale 1125 has been rotated about its horizontal axis (around the horizontal edge of grid 1105) and depth scale 1120 has been rotated about its vertical axis (around the vertical edge of grid 1105) so that they face more toward the virtual camera in order to improve the viewing experience. It is noted that in this new viewing perspective, the virtual camera has gone from in front of grid 1105 to behind grid 1105. As such, in addition to rotating range scale 1125 and depth scale 1120, the text (numbers) on range scale 1125 and depth scale 1120 are also flipped so that they are displayed in the correct orientation for viewing in this new viewing perspective.

FIGS. 11, 12A, and 12B illustrate display views 1100, 1205, and 1210 having a dark background color. It has been contemplated that the background color may be adjusted (either automatically or by user's input) to suit viewing conditions. For example, when mobile structure 101 detects a bright sunshine condition, mobile structure 101 may render a light background color to improve viewability of the image, and vice versa. The color of the text may also be adjusted in a complimentary manner to maintain clarity of the text.

Rotating the text annotation (e.g., depth scale 1120 and range scale 1125) so that they point towards the virtual camera ensures that the information is clearly visible to the user independently of the view direction. Further, by keeping the rotation to a fixed single axis (their corresponding rotational axes), the annotations maintains their association with the markers on grid 1105.

Additionally, adding tick marks (the numerals in depth scale 1120 and range scale 1125) at the same spacing as grid 1105 can assist the user in interpreting the 3D representation.

Axis Aligned Color Key

Figure 13A:
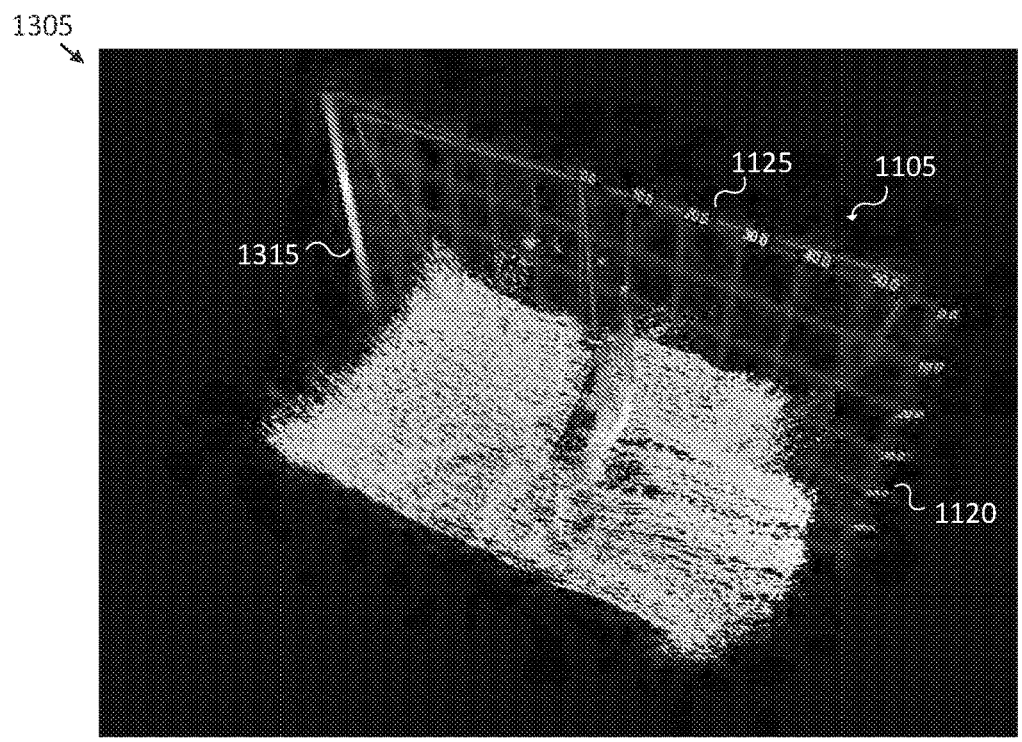
FIG. 13A illustrates a display view that shows a color key rendered within a 3D representation in accordance with an embodiment of the disclosure.

FIGS. 11, 12A, and 12B illustrate a depth scale that includes numerals for indicating depth levels of various objects within the 3D representation. It has been contemplated that instead of, or in addition to, numerals, a color key may be used as a depth scale. FIG. 13A illustrates a display view 1305 having a color key 1315 within the 3D representation. When the 3D representation is colored as a function of depth, it is necessary to show a color key to indicate the color that is used for a particular depth level. In this example, as shown by color key 1315, the order of colors (red, orange, yellow, green, cyan, and blue) represent an increasing order of depth level below water surface. It has been contemplated that color key 1315 may also be rotatable around the grid's edge in a similar manner as depth scale 1120.

In this example, color key 1315 is rendered similarly as depth scale 1120. That is, color key 1315 is also rendered on a 2D plane that is separate from grid 1105, but share a vertical axis with grid 1105. Also as shown in this example, color key 1315 is rendered to adjoin a vertical edge of grid 1105, opposite to the vertical edge that adjoins depth grid 1120. Other implementation may render color key 1315 at other locations relative to grid 1105 (e.g., in the middle of grid 1105 or next to depth scale 1120, etc.). A contemplated feature is that color key 1315 may also be rotated about its rotational axis. In this example, color key 1315 has a rotational axis that is parallel to its vertical axis and aligned with the vertical edge of grid 1105.

Figure 13B:
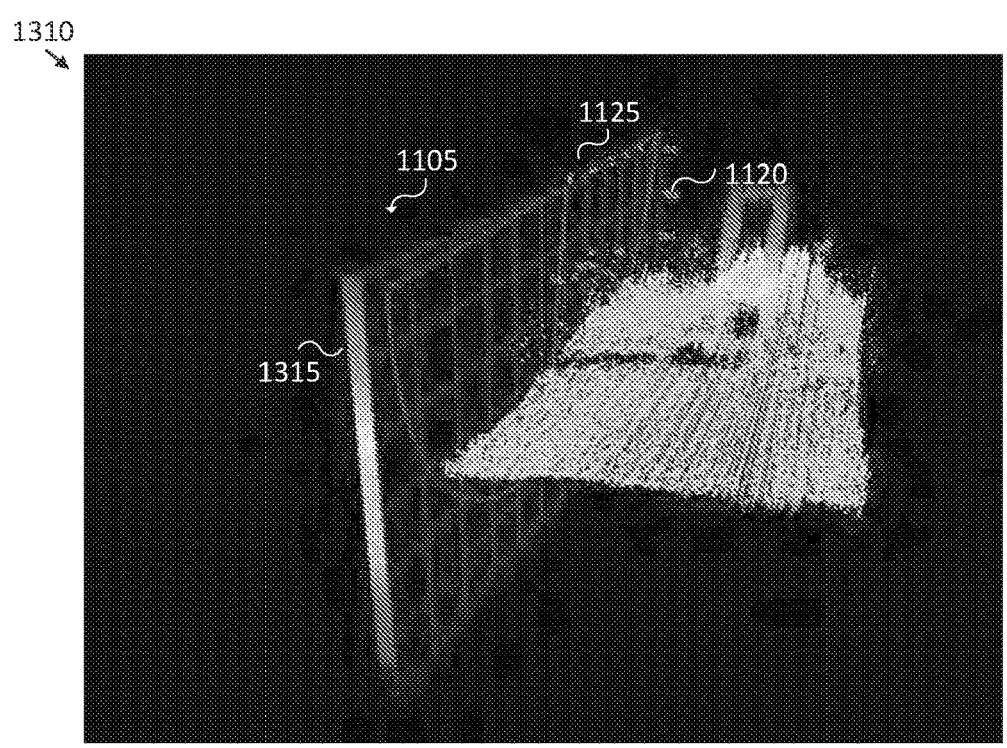
FIG. 13B illustrates a display view that shows a color key rotated about an axis within a rendered 3D representation in response to a changed view perspective in accordance with an embodiment of the disclosure.

FIG. 13B illustrates a display view 1310 after the viewing perspective has been changed from the viewing perspective of FIG. 13A to a new viewing perspective. As shown, while grid 1105 is fixed in the same orientation, color key 1315 has been rotated about its rotational axis so that color key 1315 faces more toward the virtual camera in order to improve the viewing experience in the new viewing perspective.

Beam Shape Indicator

Figure 14A:
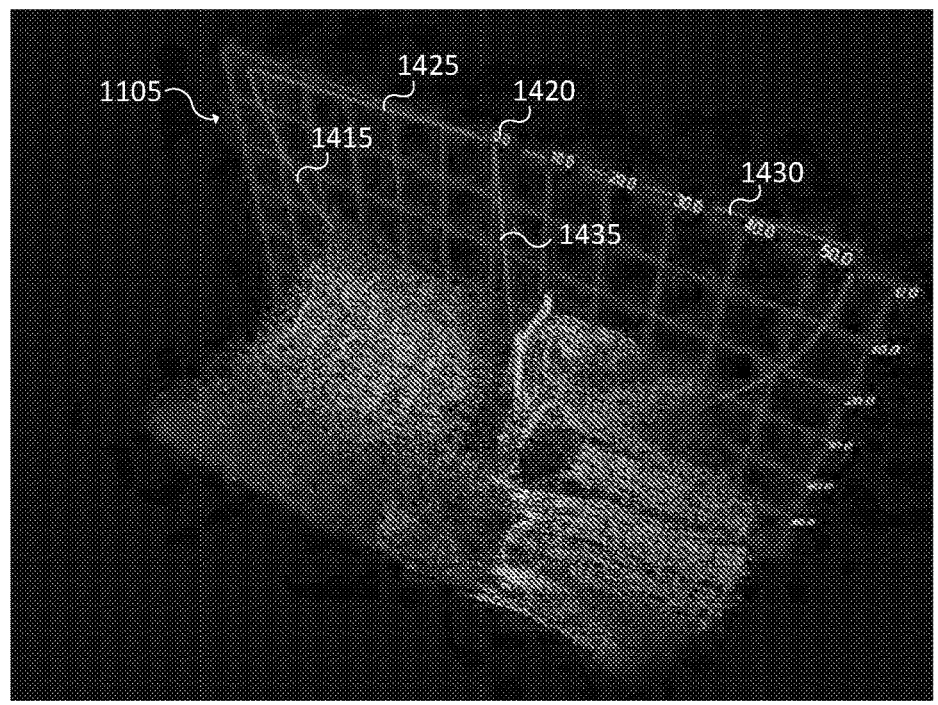
FIG. 14A illustrates a display view that shows a coverage indicator in a form or an arc rendered within a 3D representation in accordance with an embodiment of the disclosure.

It is often important to indicate to the user the position and extent of the sonar coverage by sonar system 110 or mobile structure 101. As such, it has been contemplated that an indicator for indicating sonar coverage may be rendered within the 3D representation. In some embodiments, the sonar coverage indicator may be implemented as an arc. FIG. 14A illustrates a display view 1405 that includes such a sonar coverage indicator 1415 in the 3D representation. As shown, sonar coverage indicator 1415 may be rendered on the same 2D plane on which grid 1105 is rendered. The position, orientation, and size (radius) of the arc of sonar coverage indicator 1415 may be determined based on a location of sonar system 110/mobile structure 101, an orientation (attitude) of sonar system 110/mobile structure 101, and a configuration of sonar system 110 (the extent of its coverage). For example, the radius of the arc equals to the maximum distance that sonar system 110 may cover. To improve visibility of sonar coverage indicator 1415, it has been contemplated that sonar coverage indicator 1415 and grid 1105 may be rendered in different colors (e.g., sonar coverage indicator 1415 may be rendered in pink while grid 1105 may be rendered in blue, as shown in FIG. 14A).

In some embodiments, sonar coverage indicator 1415 may be centered at a position in the 3D representation that corresponds to the position of the volume data source (e.g., location of the sonar system 110 or mobile structure 101). As shown, the center of sonar coverage indicator 1415 is rendered at position 1420, which is where sonar system 110 or mobile structure 101 is located in the 3D representation. In this example, sonar coverage indicator 1415 includes an arc and three straight lines (lines 1425, 1430, and 1435) emanating from the center 1420. Lines 1420 and 1430 are aligned with the roll attitude (orientation) of sonar system 110 or mobile structure 101. Line 1435 is aligned with a direction of a sonar beam emitted from sonar system 110 (and may be perpendicular to lines 1420 and 1430, as shown in this example).

Figure 14B:
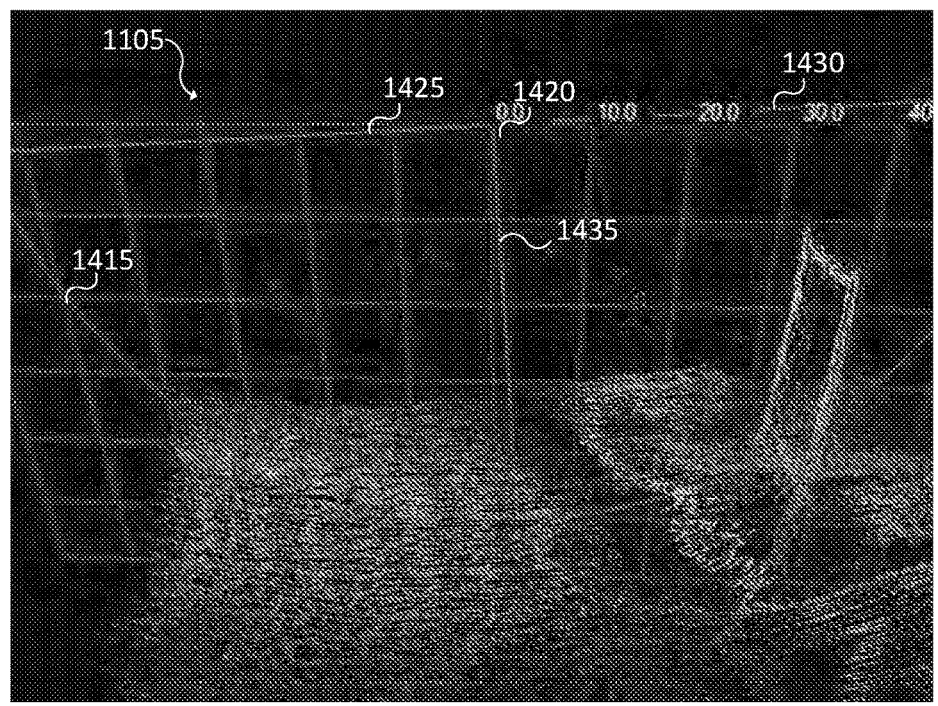
FIG. 14B illustrates a display view that shows a coverage indicator rotated about an axis within a rendered 3D representation in response to a detected changed attitude of a volume data source in accordance with an embodiment of the disclosure.

FIG. 14B illustrates another display view 1410 that include sonar coverage indicator 1415. One benefits of including a sonar coverage indicator (e.g., sonar coverage indicator 1415) is that it shows the user locations where the sonar coverage ends, such that the user may understand that the lack of representation in an area within the 3D representation does not mean a detection of no object in that area, but may merely mean that the area is outside the coverage of the sonar system. FIG. 14B shows that the point cloud on the left side of the scene ends before the edge of grid 1105, which is because the echo returns end at the extent of the range of the sonar as indicated by sonar coverage indicator 1415.

In some embodiments, sonar system 110 and/or system 100 is configured to rotate sonar coverage indicator 1415 about one or more rotational axes in response to a detected change of orientation (e.g., a roll or pitch) of sonar system 110 or mobile structure 101. In this example, sonar coverage indicator 1415 has a first rotational axis at position 1420 that is parallel to the longitudinal axis 102. As shown in FIG. 14B, sonar coverage indicator 1415 is tilted to the left (the left side of sonar coverage indicator 1415 is lower than the right side), which indicates that sonar system 110 or mobile structure 101 has rolled to the left. In some embodiments, sonar coverage indicator 1415 also has a second rotational axis that is the top horizontal edge of grid 1105. When sonar system 110 and/or system 100 detects a pitch change of sonar system 110 or mobile structure 101, sonar system 110 and/or system 100 is configured to rotate sonar coverage indicator 1415 about the second rotational axis relative to grid 1105 to update the coverage boundary.

Sonar coverage indicator 1415 provides additional information to the user so that the interpretation of where, in the scene, points are generated and where they cannot be generated are self-explanatory and intuitive to the user.

Figure 15A:
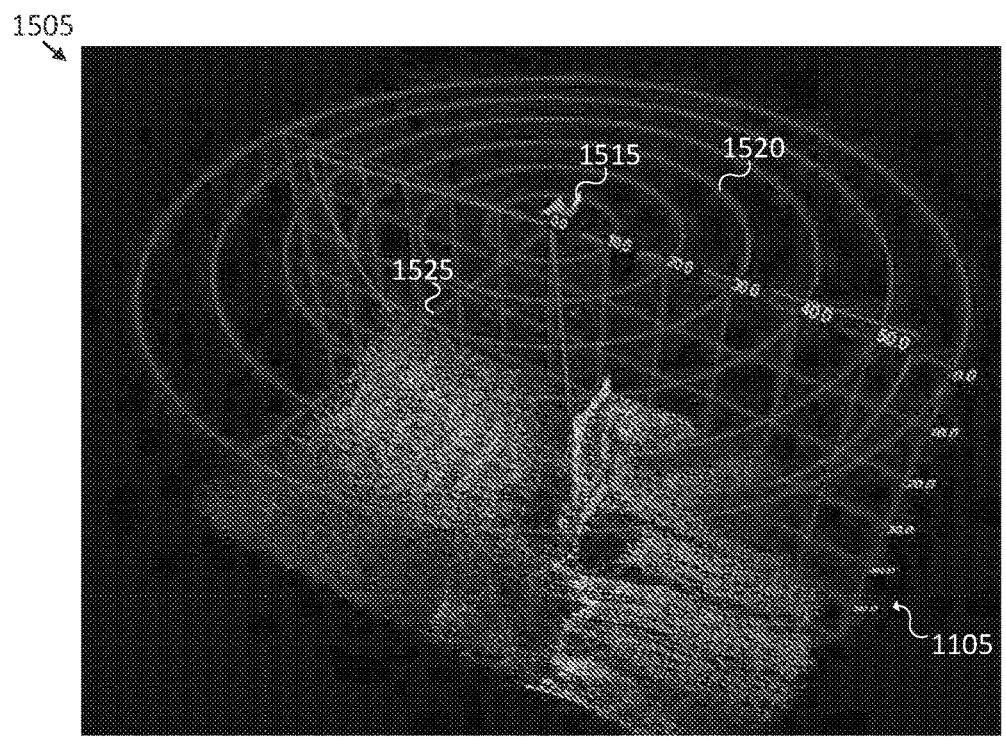
FIG. 15A illustrates a display view that shows a series of range circles rendered within a 3D representation in accordance with an embodiment of the disclosure.

It has been contemplated that adding an indicator of the position of sonar system 110 or mobile structure 101 within 3D representation and applying rotations from an attitude sensor enhances this feature. FIG. 15A illustrates a display view 1505 that includes an indicator 1515 (in the shape of a boat) for indicating a location of the sonar system 110 or mobile structure 101 within the 3D representation. In some embodiments, 3D boat model 1515 rocks and rolls according to the attitude sensor information. Another feature for this boat indicator 1515 is to size with the zoom level of the 3D representation so that it has a constant size in the image.

Surface Range Circles

Although the grid, in combination with the depth scale and the range scale, provides information about the range either side of sonar system 110 or mobile structure 101, the range around sonar system 110 or mobile structure 101 could be important for fishermen as it provides an indication of the distance necessary to cast. To further enhance the viewing experience of the 3D representation, the range information around sonar system 110 or mobile structure 101 can be provided by including range circles in the 3D representation. In some embodiments, sonar system 110 and/or system 100 is configured to render the range circles at the same spacing as the grid markers (the vertical grid lines of grid 1105) keeps the scene simple and least cluttered.

FIG. 15A also illustrates an implementation of such range circles in display view 1505. As shown, a series of range circles (e.g., range circle 1520) is rendered within the 3D representation, along with grid 1105. The series of range circles are spaced in the same manner as the vertical grid lines of grid 1105 such that users can trace any one of the range circle back to a corresponding vertical grid line in grid 1105 to determine range information. In some embodiments as in the example shown in FIG. 15A, the series of range circles may be rendered on a 2D plane that is perpendicular to grid 1105. More specifically, the series of range circles may be rendered on the plane that is parallel to the water surface within the 3D representation. In other embodiments, however, the series of range circles may be rendered on another plane that is perpendicular to grid 1105. For example, it is contemplated that the series of range circle may be rendered close to the floor in the 3D representation. To further improve the viewing experience, the different indicator keys (e.g., series of range circles, grid 1105, sonar coverage indicator, etc.) may be rendered in different colors. For example, the series of range circles are rendered in green while grid 1105 is rendered in blue.

Furthermore, since this feature can still interrupt the view of underlying objects within the 3D representation, sonar system 110 and/or system 100 may be configured to provide, via user interface 120, a user interface tool that enables a user to toggle on/off the display of the series of range circles.

It is also noted that adding lines to the circles that emanate from the center of the range circles (the location of the sonar system 110 or mobile structure 101) may provide additional useful information to the user. For example, rending an additional single line (e.g., line 1525) in a direction directly behind the sonar system 110 or mobile structure 101 may provide a clear indication of the direction of the mobile structure 101 (e.g., a vessel) that houses sonar system 110. Furthermore, instead of or in addition to a line that indicates the vessel's direction, a single line (e.g., line 1530) may also be rendered to indicate the direction of the Magnetic north. In some embodiments, line 1530 may also include an arrow or a compass rose (which may be rendered in a different color than the series of range circle) that is centered on the position of sonar system 110 within the 3D representation to illustrate that the indication is for true North. Sonar system 110 and/or system 100 may be configured to include a tool in user interface 120 to enable the user to select which mode (vessel direction or true North) to use.

Axis Aligned Marker

Figures 16, 17:
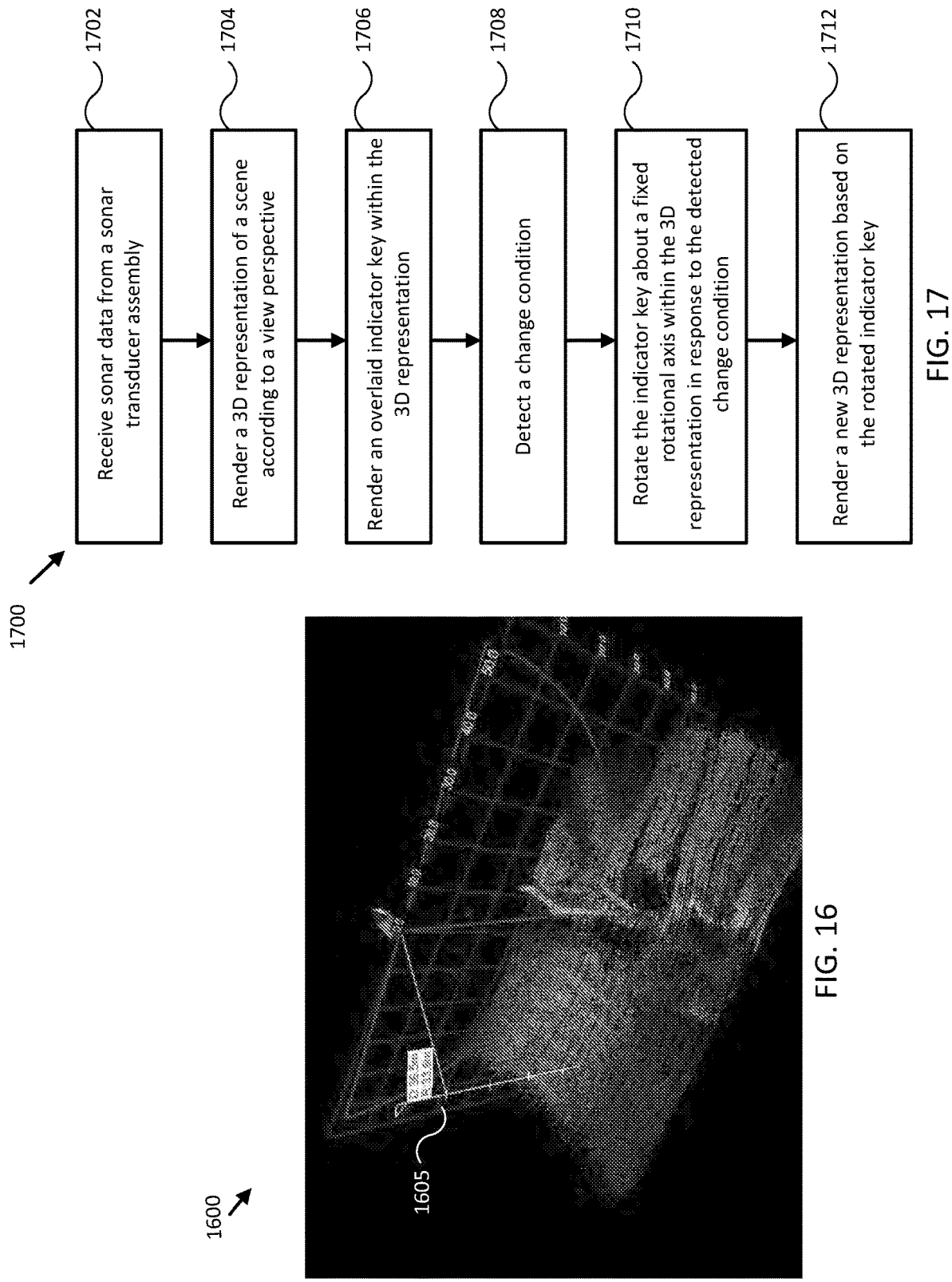
FIG. 16 illustrates a display view that shows marker information rendered within a 3D representation in accordance with an embodiment of the disclosure.
FIG. 17 illustrates a flow diagram of various operations to render customized indicator keys in a 3D representation in accordance with an embodiment of the disclosure.

It is advantageous to allow a user to add a marker (e.g., a point of interest) within the 3D representation. The process of adding a marker in a 3D representation may be implemented in many ways, for example, using the techniques described in the present disclosure above. Once an object (or merely just a position within the 3D representation) is selected, additional information may be provided to the user to support whichever task the user endeavor to accomplish (e.g., fishing). As such, in some embodiments, sonar system 110 and/or system 100 is configured to automatically compute a depth distance of the selected marker and a range distance of the selected marker from sonar system 110. FIG. 16 illustrates a display view 1600 that includes exemplary marker information. In this example, the user has selected a marker location 1605, for example, via a marker selection tool on user interface 120. In response to receiving a selection of marker location 1605, sonar system 110 and/or system 100 is configured to automatically compute, using the volume data, GPS data, attitude data, etc., information related to marker location 1605. In some embodiments, sonar system 110 and/or system 100 is configured to render at least some or all of the computed information in the 3D representation. For example, as shown in FIG. 16, depth information and range information are rendered to be displayed next to marker location 1605. It has been contemplated that other information such as 1) latitude and longitude data, 2) bearing, and 3) cast guidance information may also be rendered to be displayed as well.

FIG. 17 illustrates a flow diagram of process 1700 to provide customized indicator keys in a 3D representation for mobile structure 101 in accordance with embodiments of the disclosure. In some embodiments, the operations of FIG. 17 may be implemented as software instructions executed by one or more logic devices associated with corresponding electronic devices, sensors, and/or structures depicted in FIGS. 1A through 4. More generally, the operations of FIG. 17 may be implemented with any combination of software instructions and/or electronic hardware (e.g., inductors, capacitors, amplifiers, actuators, or other analog and/or digital components).

It should be appreciated that any step, sub-step, sub-process, or block of process 1700 may be performed in an order or arrangement different from the embodiments illustrated by FIG. 17. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1700 is described with reference to systems described in reference to FIGS. 1A-4, process 1700 may be performed by other systems different from those systems and including a different selection of electronic devices, sensors, assemblies, mobile structures, and/or mobile structure attributes.

Process 1700 represents a method for providing customized indicator keys in a 3D representation using systems 100 and/or 100B in accordance with embodiments of the disclosure. At the initiation of process 1700, various system parameters may be populated by prior execution of a process similar to process 1700, for example, or may be initialized to zero and/or one or more values corresponding to typical, stored, and/or learned values derived from past operation of process 1700, as described herein.

In block 1702, a logic device receives sonar data from a sonar transducer assembly. For example, controller 130 of systems 100 or 100B may be configured to receive sonar data from sonar transducer assembly 112 of sonar system 110. In some embodiments the controller may be configured to also receive position data from GPS module 146 and orientation (attitude) data from orientation sensor 140. In this regard, sonar system 110 may be instructed to aim transducer assembly 112 to an underwater scene below mobile structure 101 to acquire substantially real time sonar data.

In block 1704, a logic device renders a 3D representation of the underwater scene based on the received sonar data, position data, and orientation data. For example, controller 130 of systems 100 or 100B may be configured to render a 3D representation that is similar to display view 1000 of FIG. 10. In some embodiments, controller 130 may be configured to use a point cloud technique as described above to render the 3D representation of the scene. The 3D representation includes representations of various objects detected within the scene, as shown in FIG. 10.

Figure 15B:
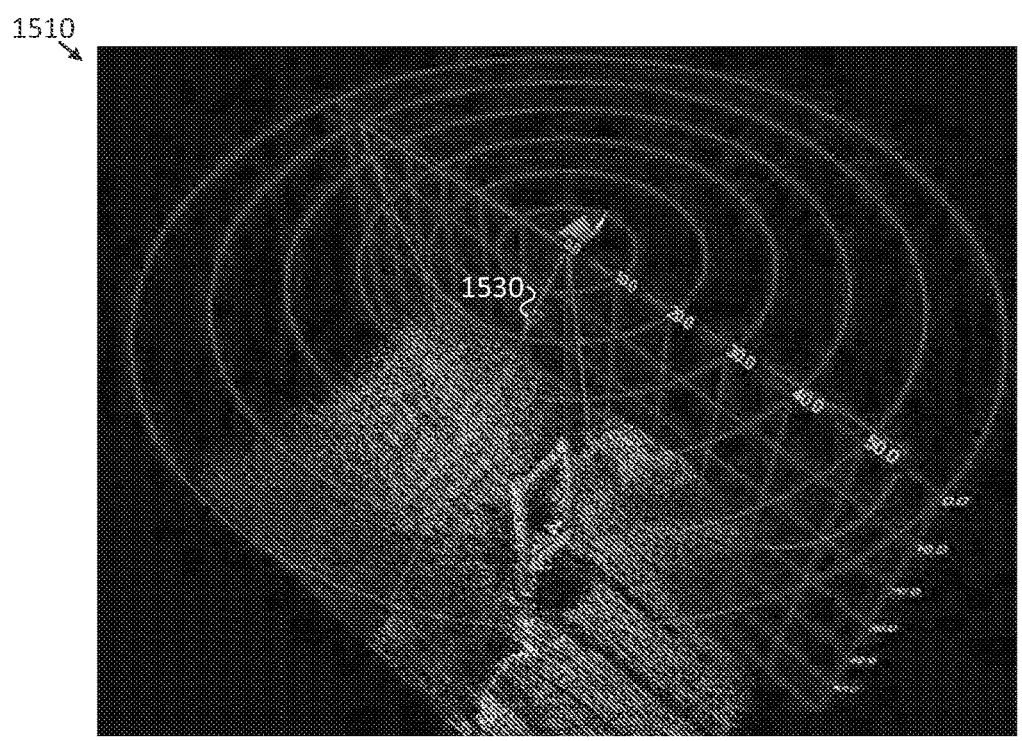
FIG. 15B illustrates a display view that shows a series of range circles with a true North indicator rendered within a 3D representation in accordance with an embodiment of the disclosure.

In block 1706, a logic device renders one or more indicator keys that are overlaid within the 3D representation. For example, controller 130 of systems 100 or 100B may be configured to render one or more of a grid (e.g., grid 1105 as shown in FIG. 11), one or more depth scales (e.g., depth scale 1120 as shown in FIG. 11, color key 1315 as shown in FIG. 13), a range scale (e.g., range scale 1125 as shown in FIG. 11), a coverage indicator (e.g., sonar coverage indicator 1415 as shown in FIG. 14), and a series of range circles (e.g., range circles 1520 of FIG. 15). In some embodiments, controller 130 may be configured to render these indicator keys on various 2D planes within the 3D representation. Furthermore, to improve visibility of the 3D representation, these indicator keys may be rendered in different colors, and preferably in different colors than the representations of the actual underwater scene. As mentioned above, each of the indicator key may be rotatable within the 3D representation. As such, when rendering each the indicators key, controller 130 may be configured to define a rotational axis about which the indicator key may rotate.

In block 1708, a logic device detects a change condition. The change condition may be different for each indicator key, and may be pre-defined. For example, the change condition for depth scale 1120, range scale 1125, and color key 1315 may be a change of the viewing perspective. Thus, controller 130 may be configured to detect whether a user has changed a viewing perspective of the display of the 3D representation. In some embodiments, controller 130 may be configured to detect such a change via receiving and monitoring user input via user interface 120. In another example, the change condition for sonar coverage indicator 1415 may be a change of orientation (attitude) of mobile structure 101. Thus, controller 130 may be configured to also detect whether the orientation/attitude of mobile structure 101 has been changed. IN some embodiments, controller 130 may be configured to detect such a change by receiving and monitoring orientation (attitude) data from orientation sensor 140.

In block 1710, in response to detecting a change condition, a logic device rotates one or more indicator keys about their corresponding rotational axis within the 3D representation. For example, in response to detecting a change of viewing perspective to a new viewing perspective, controller 130 may be configured to rotate depth scale 1120, range scale 1125, and color key 1315 about their corresponding rotational axes in a manner described above by reference to FIGS. 11, 12A, 12B, 13A, and 13B. In another example, in response to detecting a change of orientation (attitude) of mobile structure 101, controller 130 may be configured to rotate sonar coverage indicator 1415 about its rotational axis in a manner described above by reference to FIGS. 14A and 14B.

In block 1712, a logic device renders a new 3D representation of the scene based on the rotated indicator key(s). It is noted that the logic device may perform different adjustments from what has been described above to the 3D representation in response to a detected change. Specifically, the logic device may be configured to display additional indicator key in response to a user input. For example, controller 130 may detect that a user has selected a marker (a position or an object within the 3D representation) via user interface 120. In response to receiving a selection of the marker, controller 130 may be configured to display information (e.g., depth distance, range distance, etc.) related to the marker as described above by reference to FIG. 16.

In yet another aspect of the present disclosure, various techniques are disclosed for enhancing a user's viewing experience of a digitally rendered 3D representation of a scene (e.g., an underwater environment, etc.) by rendering objects within a scene with distinctive rendering characteristics based on the objects' attributes. In some embodiments, the distinctive rendering characteristics include providing different rendering characteristics to representations of the floor and representations of in-water objects to assist the user in distinguishing the two types of underwater features. For example, the floor and the in-water objects may be rendered in different color palettes. Representations of the in-water objects may be further differentiated according to their echo return intensity or their different depth levels from the water surface (e.g., range from the sonar system). For example, by rendering the representations differently (e.g., different colors, different transparency levels, different sizes, etc.) according to the intensity of the echo returns, noises and objects in the 3D representation that are irrelevant to the user could be suppressed.

In some embodiments, instead of rendering a one dimensional point (dot) for each detected echo return based on the volume data, a 3D object (or alternative a pseudo-3D-object such as a pseudo-sphere) may be rendered for an echo return to enhance the appearance of the objects (e.g., the objects appear to have a fuller body) within the 3D representation. Shadows that correspond to the in-water objects may also be introduced in the 3D representations. Additionally, historical sonar data may be used to render a ghost representation of the object on the 2D plane of a grid to emphasize the range and depth distance of the object. Such a ghost representation may persist in the 3D representation, and may fade and completely disappear after a predetermined length of time.

In short, the features disclosed herein include: rendering a bottom surface (floor) differently from in-water objects (different color palettes), rendering in-water objects using pseudo-objects, rendering objects in different transparency according to their echo return intensity, rendering objects in different sizes according to their echo return intensity, rendering shadows directly below targets superimposed on the bottom surface, rendering the shadows in different transparency according to the corresponding objects' echo return intensity, rendering the shadows in different sizes according to the corresponding objects' echo return intensity, shadows with features to enhance or diminish their presence in the 3D representation, and rendering all echo returns using pseudo-objects. These features will be described in more detail in the following sections below.

Separating Bottom Echoes and in-Water Echoes

Differentiating (or separating) echo returns that constitute bottom features (floor) and those that correspond to targets in the water (in-water objects) may be implemented using various techniques. Once the echo returns are separated into the two categories, sonar system 110 and/or system 100 may be configured to provide different rendering for the different types of echo returns such that bottom features may be visually distinct from in-water objects in the rendered 3D representation. In some embodiments, sonar system 110 and/or system 100 may render bottom features and in-water objects in different color palette.

Figure 18:
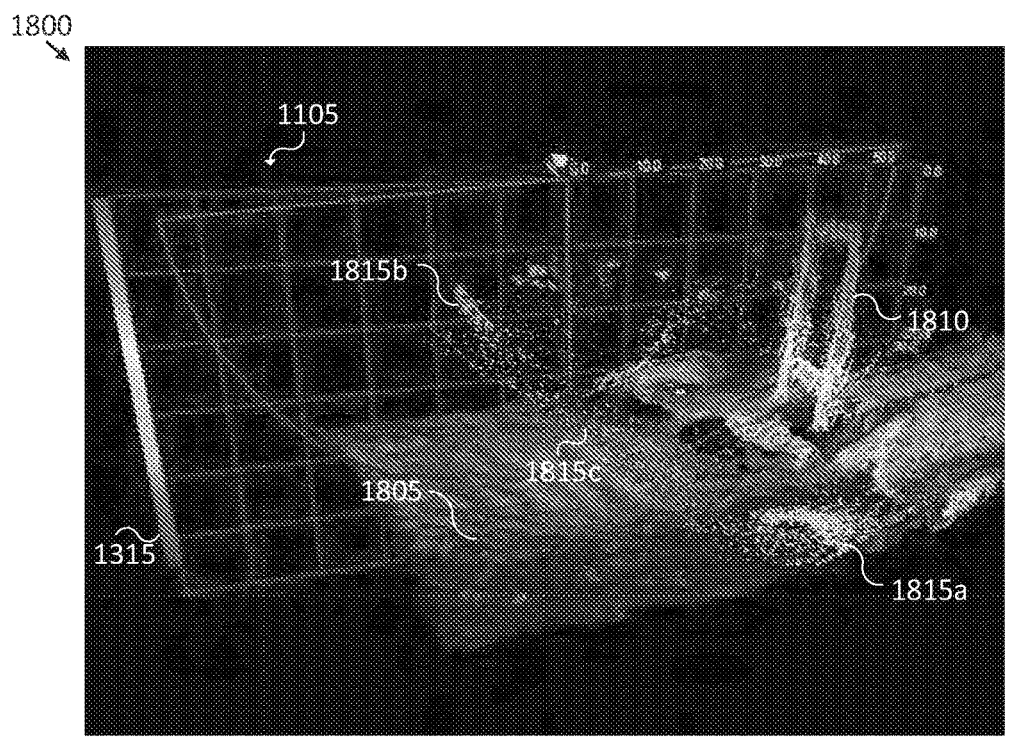
FIG. 18 illustrates a display view that shows different color palettes applied to bottom features and in-water features in a 3D representation in accordance with an embodiment of the disclosure.

FIG. 18 illustrates a display view 1800 that include a 3D representation of an underwater scene rendered using such a technique. As shown, the 3D representation includes representation of a floor 1805, a bridge strut 1810, and various movable in-water objects 1815*a*-1815*c* (e.g., bait schools, debris, etc.). In this example, sonar system 110 and/or system 100 is configured to render the bottom feature (floor 1805) in various shades of dull brown colors. The various shades may be rendered according to detected echo return intensities in some embodiments. By contrast, sonar system 110 and/or system 100 is configured to render the in-water objects (e.g., in-water objects 1815*a*-1815*c*) according to color key 1315 (the depth scale) and their detected depth. As discussed above, color key 1315 includes a color range from red, orange, yellow, green, cyan, and blue, which has a very different color palette than the dull brown colors chosen for the floor 1805. As shown, in-water objects 1815*a*-1815*c* are rendered in various colors of cyan, red, orange, and yellow according to their detected depth.

Thus, in this particular example, the in-water targets are rendered in colors that represent the depth of the targets according to color key 1315, while the bottom floor echo returns are rendered in colors defined as a function of the intensities. Other combinations of color palettes may be used.

The in-water targets include bait schools, detritus, and a bridge strut, all of which were not as prominent in the 3D representation without using the rendering technique described above.

It can be seen in FIG. 18 that the bait schools (e.g., in-water objects 1815*a*-1815*c*) are not very well defined and bridge strut 1810 does not look solid. The points derived from echo returns are rendered in the same size regardless of how close they are to the virtual camera because perspective cannot be applied to point primitives. It has been contemplated that the viewing experience may be improved by replacing the points from the cloud corresponding to in-water targets by a 3D object, such as a sphere. In such embodiments, sonar system 110 is configured to render a 3D object (e.g., a sphere) in the 3D representation of the scene, for each detected echo return. In some embodiments, sonar system 110 may be configured to adjust a size of the rendered 3D object to provide the appearance of fuller bodies of these objects within the 3D representations.

However, one issue with this approach is the increase number of triangles required to represent these objects and therefore imposing a huge increase in processing load. This issue is especially critical for an embedded system with limited processing resources.

One approach to minimize the processing load is to use a technique that employs an 'imposter' technique (or a pseudo-3D-object) to represent the 3D object. Instead of rendering a true 3D object, sonar system 110 and/or system 100 of these embodiments is configured to render a single quadrilateral object or a pair of triangles for each point derived from an echo return. Sonar system 110 and/or system 100 may be configured to render the pseudo-3D-object to always be facing at the direction of the virtual camera. Preferably, the selected pseudo-3D-object has a perfect symmetry (e.g., a sphere) such that the pseudo-3D-object would appear the same from any view angle, which improves the illusion of three dimensionality when viewed in the 3D representation even though the pseudo-3D-object is constructed with only a single quadrilateral object or a pair of triangles.

In some embodiments, sonar system 110 and/or system 100 is configured to draw the pseudo-3D-object procedurally when the 3D representation is rendered to a two dimensional image, which offers the enhanced capability of applying shading based on the light source, defined object material and the calculated object's shape. The disclosed technique provides a more three dimensional look for single targets and for targets that are close enough to merge together. It is noted that other shapes (other than sphere) may be used advantageously using the disclosed techniques. For example, it has been contemplated that multiple targets (multiple points) that are in proximity with each other may be combined into a single shape that is generated procedurally on a single pseudo-object, with multiple similar pseudo-objects in the scene.

Figure 19A:
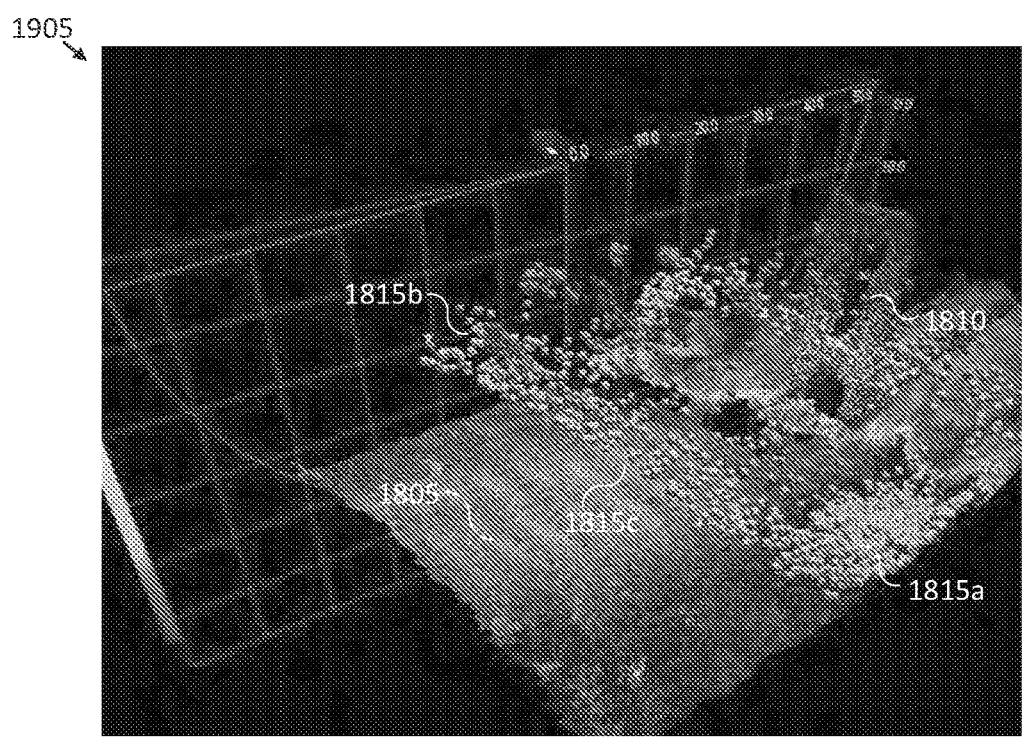
FIG. 19A illustrates a display view that shows rendering of pseudo-objects within a 3D representation in accordance with an embodiment of the disclosure.

FIG. 19A illustrates a display view 1905 that includes a 3D representation of an underwater scene rendered using such rending techniques. As shown, the echo returns from in-water objects are rendered as pseudo-spheres (e.g., in-water objects 1815*a*-1815*c*). The pseudo-spheres may also be rendered in larger or smaller sizes by sonar system 110 and/or system 100 to optimize the viewing experience.

It can be seen that the targets in the water are emphasized, with grouped echo returns producing more solid looking objects (e.g., group 1815*a*-1815*c*). It can also be seen that unwanted targets such as echo returns from detritus in the water are also emphasized. Various techniques have been contemplated to mitigate this issue.

Under a first approach, different echo returns may be rendered in different sizes according to their return intensity. Thus, sonar system 110 and/or system 100 may be configured to use the intensity of the return to define the size of the object used in the 3D representation. In some embodiments, sonar system 110 and/or system 100 is configured to render echo returns having higher intensities in larger object sizes in the 3D representation, and render echo returns having lower intensities in smaller object sizes in the 3D representation (by for example mapping different intensities to different sizes in a look-up table).

Figure 19B:
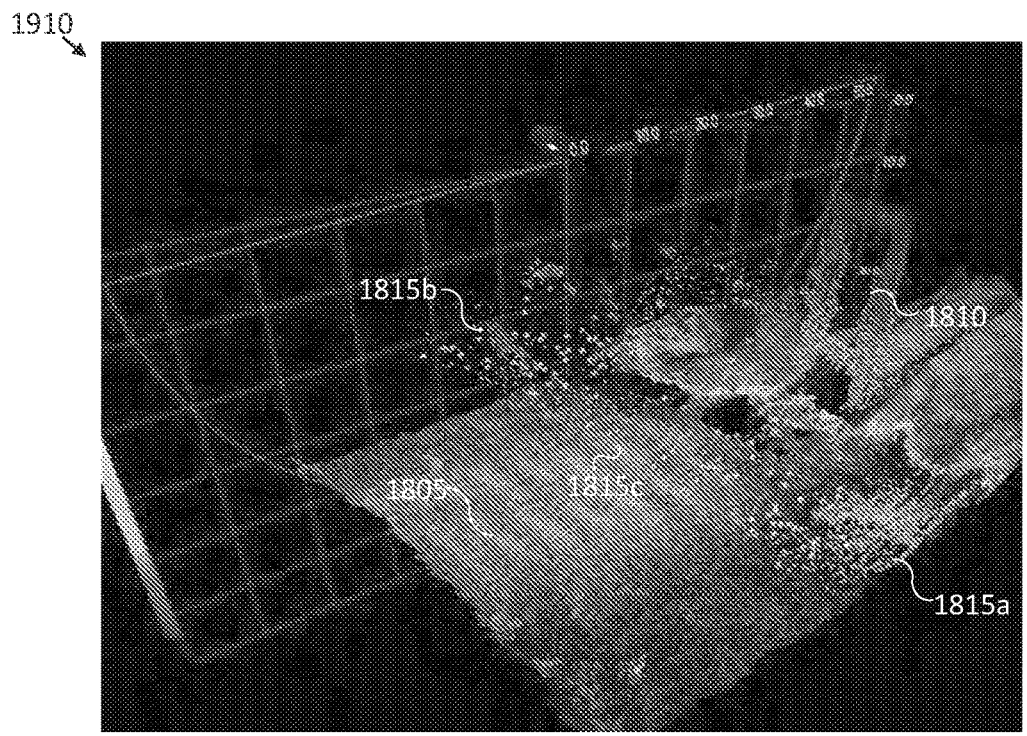
FIG. 19B illustrates a display view that shows rendering of pseudo-objects with size variations within a 3D representation in accordance with an embodiment of the disclosure.

FIG. 19B illustrates a display view 1910 that includes a 3D representation of an underwater scene with objects rendered in different sizes according to their echo return intensities. As shown, in-water objects 1815*a* and 1815*b* are rendered as bigger sized pseudo-spheres than in-water object 1815*c* since sonar system 110 has detected that echo returns corresponding to in-water objects 1815*a* and 1815*b* have higher intensity levels than in-water object 1815*c*. This approach improves the viewing experience of the 3D representation by suppressing the unwanted noise without increasing the amount of processing.

Under a different approach, instead of adjusting the sizes of the pseudo-objects, different echo returns may be rendered in different transparency levels according to their return intensity. Thus, sonar system 110 and/or system 100 may be configured to use the intensities of the echo returns to define the transparency of the objects used in the 3D representation. In some embodiments, sonar system 110 and/or system 100 is configured to render echo returns having higher intensities in less transparency levels (more opaque) in the 3D representation, and render echo returns having lower intensities in higher transparency levels (less opaque) in the 3D representation (by for example mapping different intensities to different transparency levels in a look-up table).

Figure 19C:
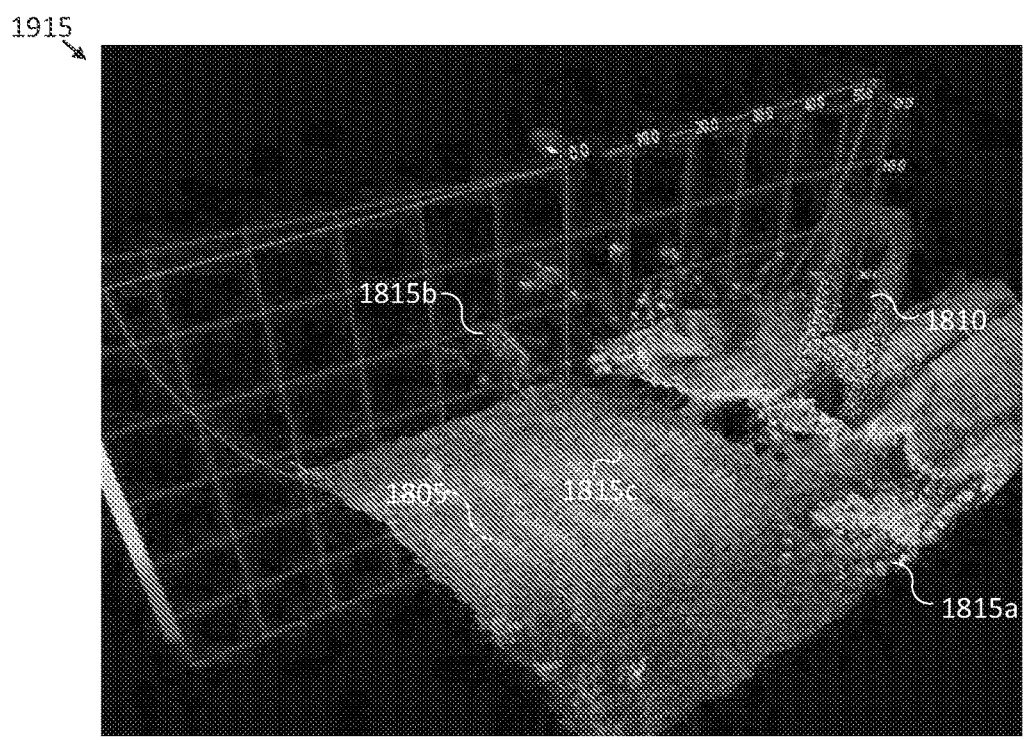
FIG. 19C illustrates a display view that shows rendering of pseudo-objects with transparency variation within a 3D representation in accordance with an embodiment of the disclosure.

FIG. 19C illustrates a display view 1915 that includes a 3D representation of an underwater scene using this alternative approach. As shown, in-water objects 1815*a* and 1815*b* are rendered as less transparent (more opaque) pseudo-spheres than in-water object 1815*c* since sonar system 110 has detected that echo returns corresponding to in-water objects 1815*a* and 1815*b* have higher intensity levels than in-water object 1815*c*. This approach also improves the viewing experience of the 3D representation by suppressing the unwanted noise without increasing the amount of processing.

It has also been contemplated that the above two approaches may be combined such that sonar system 110 and/or system 100 is configured to map different intensities to different sizes and different transparency levels, and render the pseudo-objects accordingly.

Full 3D Scene Using Imposters

FIGS. 19A-19C in the previous section illustrate employing pseudo-3D-objects for improving the appearance of the in-water targets. It has been contemplated that the above-described technique may be advantageously applied to the entire 3D representation in some circumstances. When applying these techniques to the entire 3D representation, the steps of separating the echo returns into in-water echo returns and bottom echo returns and rendering the two types of return differently may be avoided.

Figure 20A:
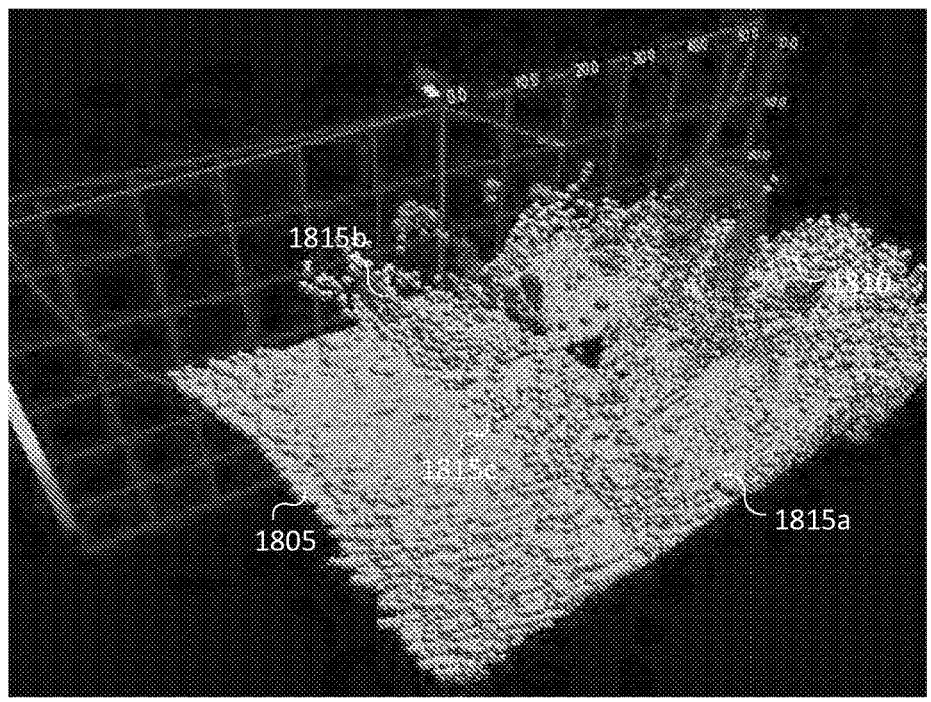
FIG. 20A illustrates another display view that shows rendering of pseudo-objects within a 3D representation in accordance with an embodiment of the disclosure.

FIG. 20A illustrates a display view 2005 that includes a 3D representation of an underwater scene rendered using such a technique. As shown, in addition to in water objects 1815a-1815c, floor (bottom features) 1805 is also rendered by employing the pseudo-3D-object (e.g., spheres). The 3D representation may appear to be cluttered, which may be further improved by applying different transparency levels to the representations according to their echo return intensities.

Figure 20B:
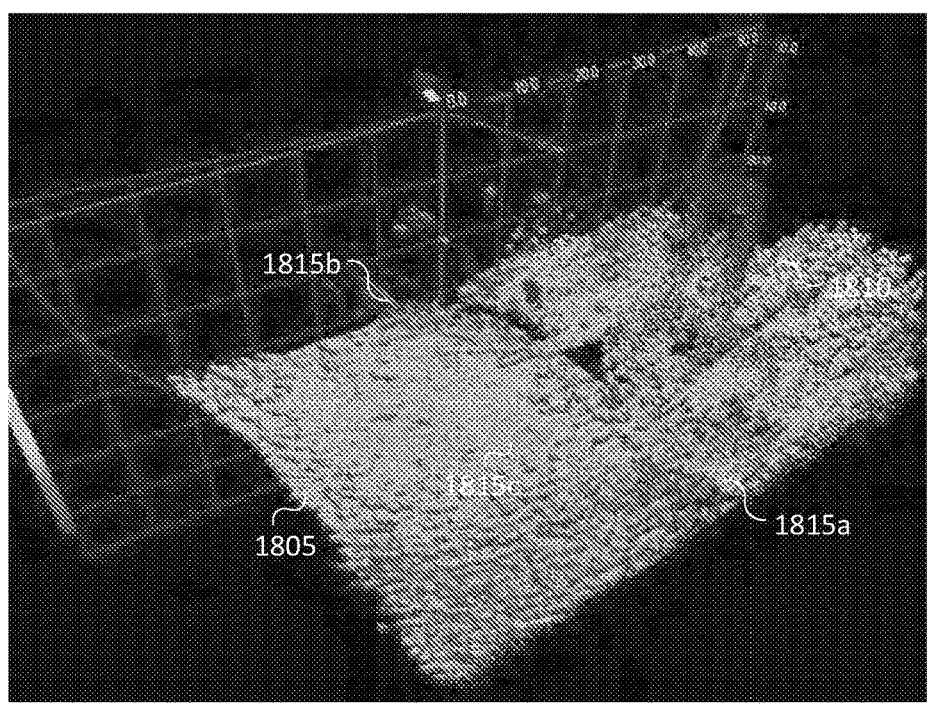
FIG. 20B illustrates another display view that shows rendering of pseudo-objects with transparency variation within a 3D representation in accordance with an embodiment of the disclosure.

FIG. 20B illustrates a display view 2005 that includes a 3D representation of an underwater scene rendered using the pseudo-3D-object technique, with the addition of varying the transparency levels according to their echo return intensities. Even though not shown in FIG. 20B, instead of or in addition to transparency variations, size variation (that is, rendering the pseudo-objects in different sizes according to their echo return intensities) may also be applied in some embodiments.

Figure 21A:
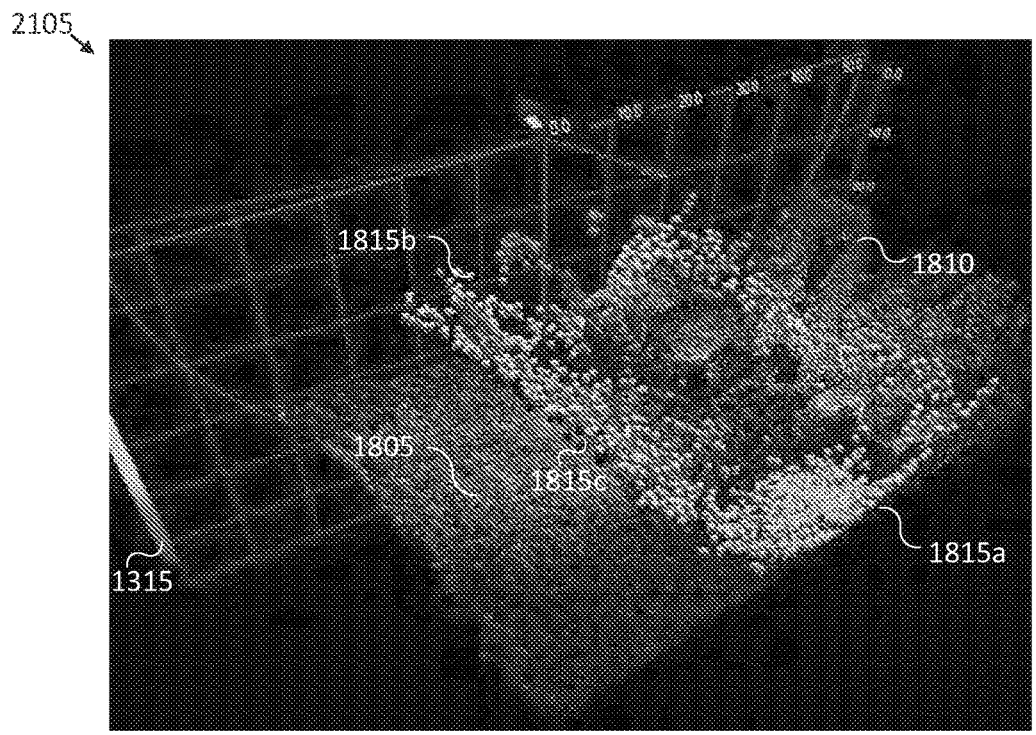
FIG. 21A illustrates a display view that shows rendering of pseudo-objects with color palette variation within a 3D representation in accordance with an embodiment of the disclosure.

The viewing experience may be further enhanced if sonar system 110 renders the bottom echo returns and the in-water echo returns differently, using the techniques described above. FIG. 21A illustrates a display view 2105 that includes a 3D representation rendered using the pseudo-3D-object techniques, with the addition of rendering bottom echo returns and in-water echo returns in different color palettes. The 3D representation rendered in display view 2105 is very similar to the 3D representation rendered in display view 2005 of FIG. 20A, except that the floor 1805 is rendered using a first color palette (e.g., in various shades of dull brown colors), while the in-water objects (e.g., in-water objects 1815a-1815c, strut 1810) are rendered using a different, second color palette (e.g., according to color key 1315).

Figure 21B:
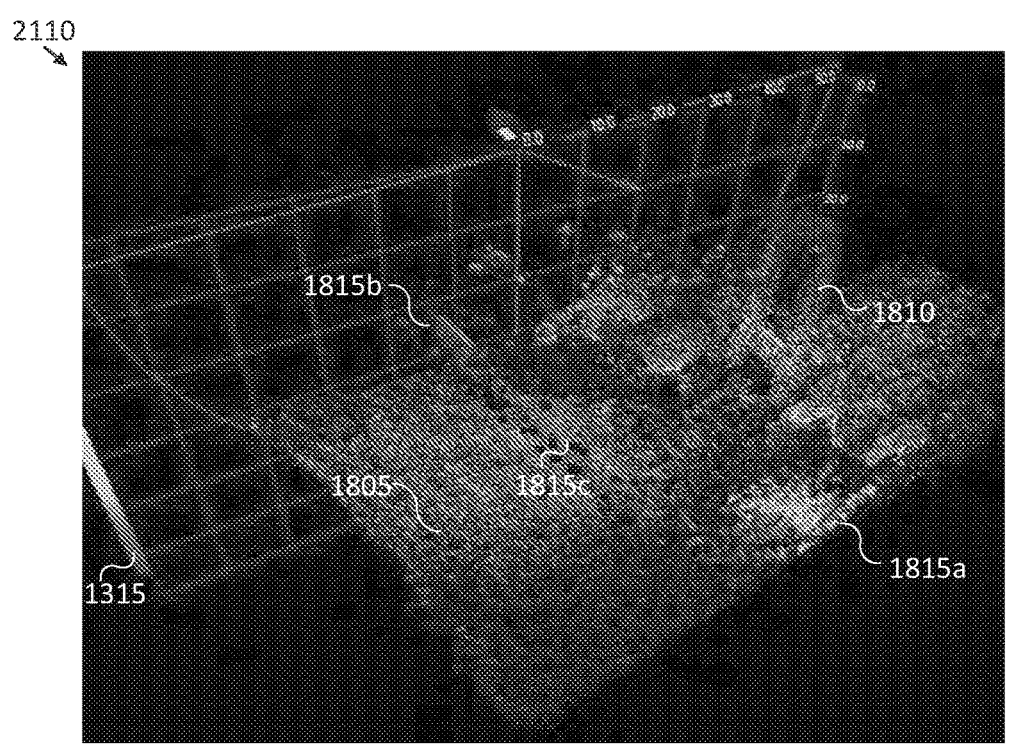
FIG. 21B illustrates a display view that shows rendering of pseudo-objects with both color palette and transparency variations within a 3D representation in accordance with an embodiment of the disclosure.

Transparency variation may also be added to this rendering. FIG. 21B illustrates a display view 2110 that includes a 3D representation rendered using the pseudo-3D-object techniques, with the addition of rendering bottom echo returns and in-water echo returns in different color palettes and rendering the objects in different transparency levels according to their echo return intensities. The 3D representation rendered in display view 2110 is very similar to the 3D representation rendered in display view 2010 of FIG. 20B, except that the floor 1805 is rendered using a first color palette (e.g., in various shades of dull brown colors), while the in-water objects (e.g., in-water objects 1815a-1815c, strut 1810) are rendered using a different, second color palette (e.g., according to color key 1315).

Target Shadows

In the previous sections, various techniques for emphasizing targets in the water from the bottom were described. A further enhancement is to add a guide to help with identifying the positions of the in-water objects in the 3D representation by providing 'false' shadows for in-water targets on the bottom surface. Under one approach, the 'false' shadows may be implemented by first identifying, for each in-water target, a position on the bottom surface that corresponds to the in-water target and rendering a semitransparent shadow in the 3D representation at that position. This approach allows the option for a user to switch the shadows on and off, for example, via user interface 120. In some embodiments, the corresponding position for an in-water target may be defined as a position on the bottom surface that is directly below the in-water target. In other words, the shadow position is defined to have the same coordinates in the longitudinal axis 102 and the lateral axis 103, and only vary the coordinate in the vertical axis 104. In these embodiments, sonar system 110 and/or system 100 may be configured to simply identify a position on the bottom surface having the same longitudinal and lateral coordinates as the in-water target. Other methods may be applied as well, such as drawing a straight line from the volume data source (e.g., sonar system 110 or mobile structure 101) through the in-water target all the way to the bottom surface, and define the position where the straight line crosses the bottom surface as the position for the corresponding shadow.

Under an alternative approach, the false shadows may be added to the texture that overlays the bottom surface when rendering the texture. This alternative approach requires less processing load, but may prevent the ability to switch the shadows on and off without regenerating (re-rendering) the entire surface's texture, which is processor intensive.

Figure 22A:
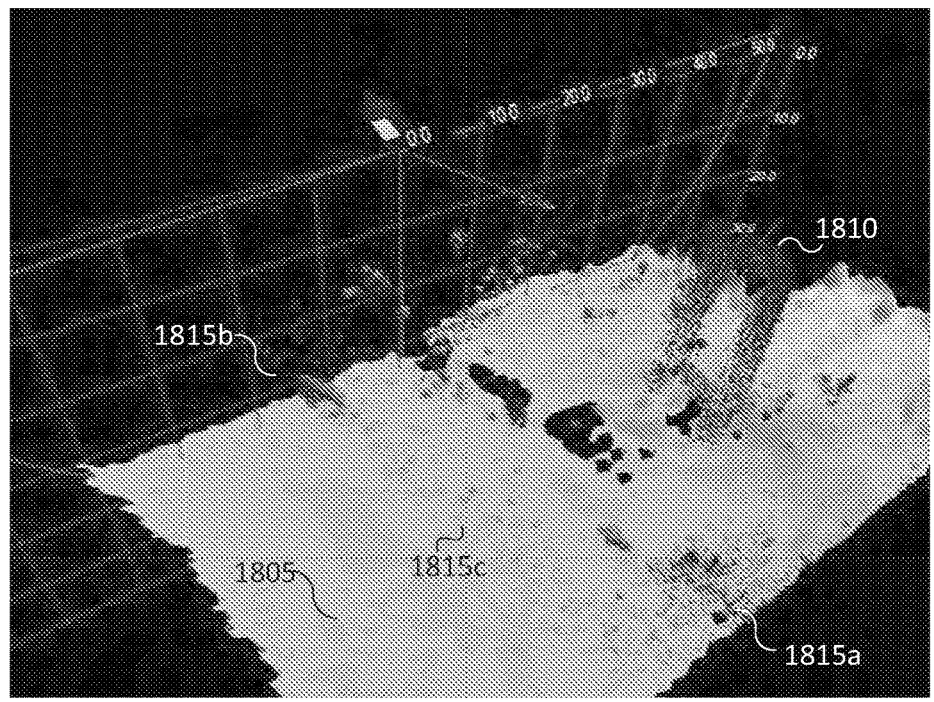
FIG. 22A illustrates a display view that shows rendering of pseudo-objects without color palette variations within a 3D representation in accordance with an embodiment of the disclosure.
Figure 22B:
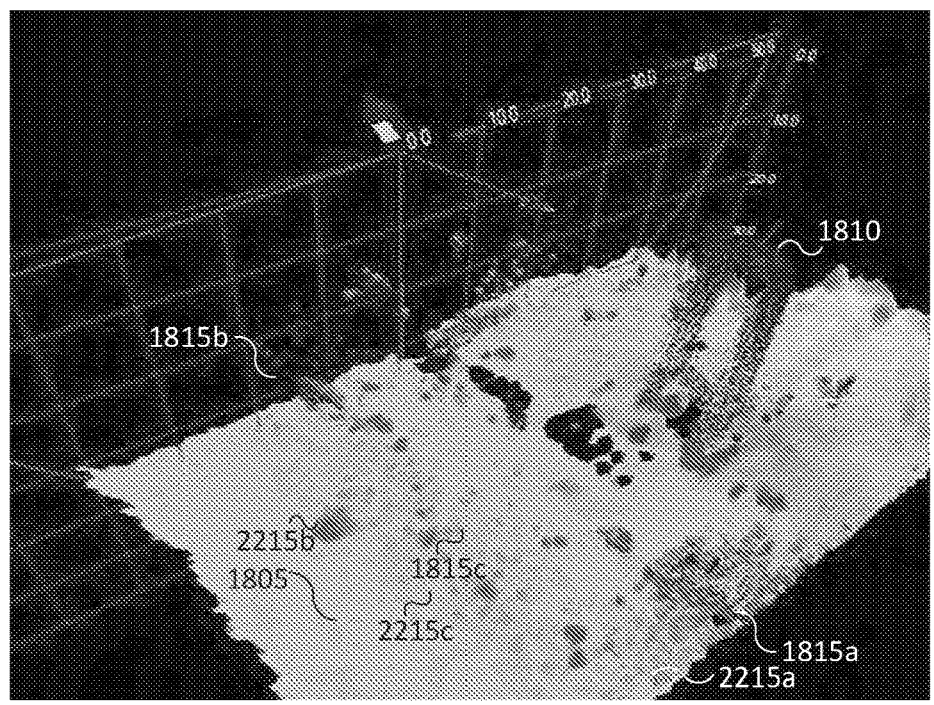
FIG. 22B illustrates a display view that shows rendering of object shadows within a 3D representation in accordance with an embodiment of the disclosure.

FIG. 22A illustrates a display view 2205 that includes a 3D representation where the bottom surface generated using colors that represent depths, without superimposing shadows on the bottom surface. FIG. 22B illustrates a display view 2205 that includes an almost identical 3D representation shown in FIG. 22A, except that shadows of in-water targets are rendered in FIG. 22B. As shown, shadows 2215a is rendered on floor 1805 for corresponding in-water objects 1815a, shadows 2215b is rendered on floor 1805 for corresponding in-water objects 1815b, and shadows 2215c is rendered on floor 1805 for corresponding in-water objects 1815c.

One potential issue for adding shadows to a 3D representation is that when there is considerably large number of in-water targets with associated shadows, the resulting 3D representation can be overwhelmed with shadows to make it very cluttered and not viewer friendly. It has been contemplated that the clutter may be reduced by applying transparency variation to the shadows as a function of the intensity of the return echoes. As such, sonar system 110 and/or system 100 may be configured to render a less transparent (more opaque) shadow for an in-water object when the echo return associated with the in-water object has higher intensity, and render a more transparent (less opaque) shadow for an in-water object when the echo return associated with the in-water object has lower intensity.

Figure 23:
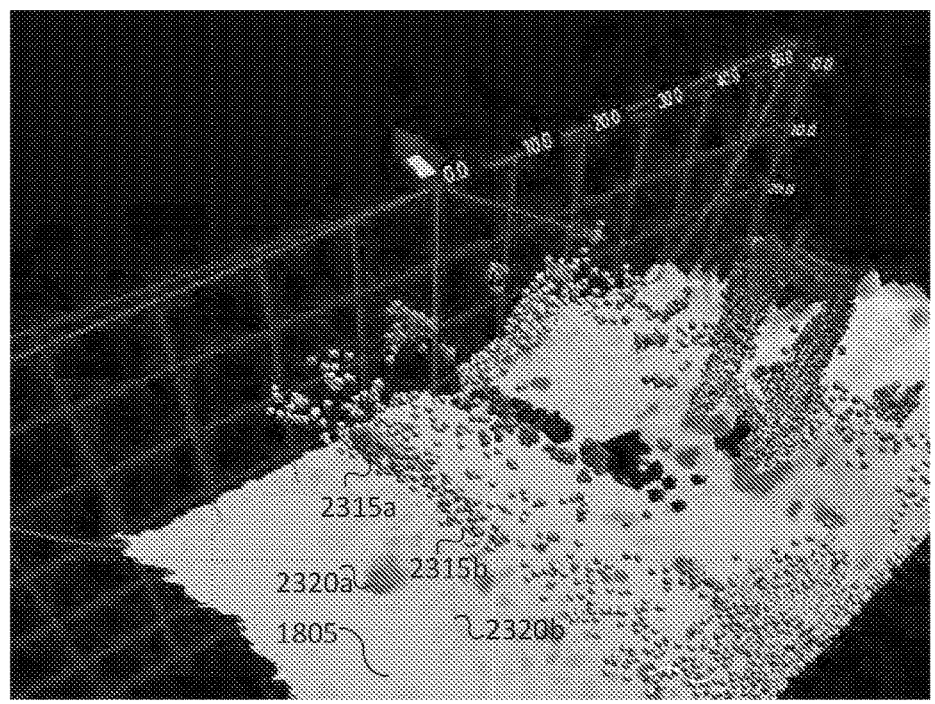
FIG. 23 illustrates a display view that shows rendering of object shadows with transparency variation within a 3D representation in accordance with an embodiment of the disclosure.

FIG. 23 illustrates a display view 2300 of a 3D representation that is rendered with transparency-varied shadows. In this example, sonar system 110 has rendered shadows 2320a for in-water objects 2315a, and has rendered shadows 2320b for in-water objects 2315b. Since in-water objects 2315a has been detected to have higher echo return intensity than in-water objects 2315b, sonar system 110 has rendered shadows 2320a to have less transparency than shadows 2320b.

Instead of, or in addition to, adjusting the transparency of the rendered shadows, it has been contemplated that sonar system 110 and/or system 100 may be configured to adjust the size of the shadows as a function of the echo return intensity of the corresponding in-water objects. That is, sonar system 110 and/or system 100 may be configured to render a larger shadow for an in-water object when the echo return associated with the in-water object has higher intensity, and render a smaller shadow for an in-water object when the echo return associated with the in-water object has lower intensity.

The 'false' shadows may be generated in code so the shape and feel of the representations can be adjusted to suit the 3D representation or the user's choice to strengthen or weaken the presence of the shadows in the 3D representation. For example, the shadows may be rendered in different shapes such as circles or regular polygons. Furthermore, sonar system 110 and/or system 100 may also be configured to apply sharpening or "feathering" to the edges of the shadows to make them look more aesthetically pleasing in the 3D representation.

Figure 24A:
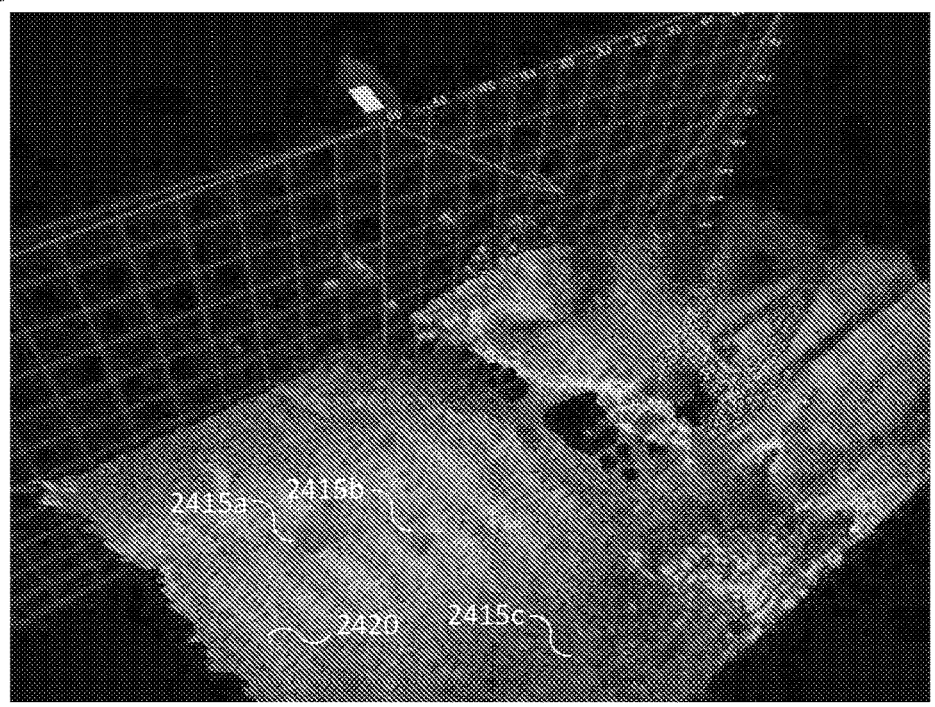
FIG. 24A illustrates a display view that shows rendering of object shadows with colors similar to bottom surface colors within a 3D representation in accordance with an embodiment of the disclosure.

However, it is noted when using echo return intensities to define the colors (or shades of colors) in the bottom surface, the rendered shadows may not stand out against the colors in the bottom surface, as illustrated in FIG. 24A. As shown in FIG. 24A, the shadows (e.g., shadows 2415a-2415c) rendered in grey colors do not stand out against the rendered bottom features 2420 that are rendered in various shades of dull brown colors.

Figure 24B:
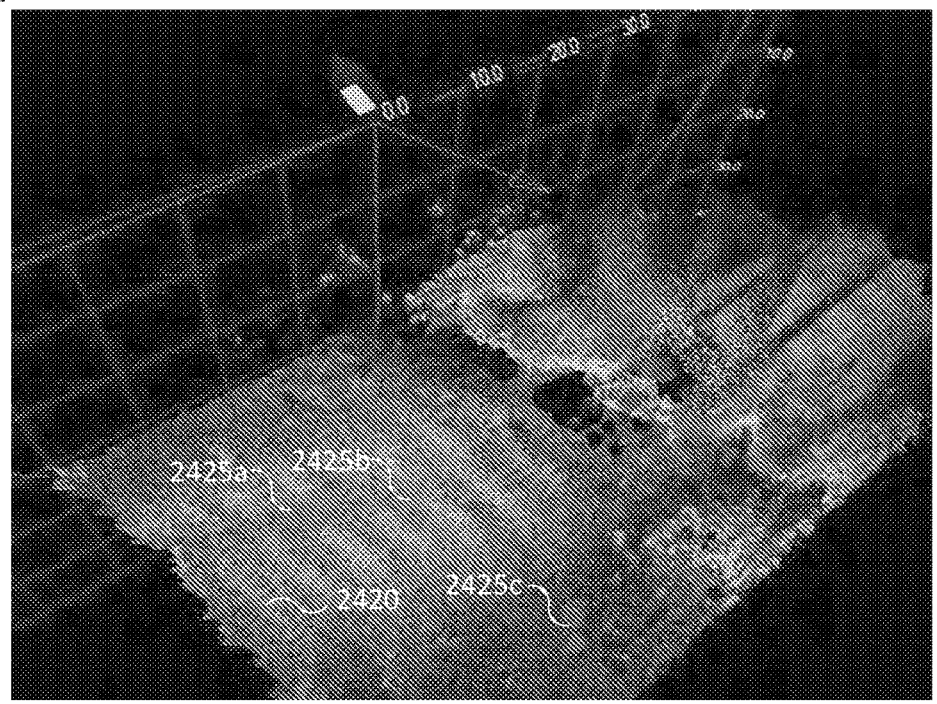
FIG. 24B illustrates a display view that shows rendering of object shadows in contrast colors within a 3D representation in accordance with an embodiment of the disclosure.

One approach to improve this is to render the shadows in a color (or color tone) that is in contrast with the colors rendered for the bottom features, as illustrated in FIG. 24B. As shown in FIG. 24B, the shadows (e.g., shadows 2425a-2425c) are rendered in a different color (e.g., pink or purple) that provides a much higher contrast to the bottom features 2420 that is rendered in various shades of dull brown colors. Another advantage of applying this contrast color schemes is that the applied 'false' shadows are more differentiated from the 'true' shadows that are generated from sonar signals being obscured by in-water objects (e.g., the dark shadows shown behind the bridge supports).

Another advantage of rendering 'false' shadows in the 3D representation is to provide an additional tool for selecting in-water targets. For example, sonar system 110 and/or system 100 may be configured to provide a tool via user interface 120 to enable a user to select an in-water object within the 3D representation by selecting (e.g., placing a finger on the shadow displayed on a touch screen or placing a cursor at the position of the shadow on the display and pressing a button, etc.) the shadow that corresponds to the in-water object. Once sonar system 110 receives a selection on the display of the 3D representation (e.g., via the user interface), sonar system 110 and/or system 100 may be configured to identify a shadow in the 3D representation that corresponds to the user's selection by first calculating a vector that passes through the 3D representation on a trajectory defined by the position of the virtual camera and the selected point on the display. The intersection of the vector and the bottom surface defines a point in 3D representation that can be identified and presented to the user.

Figure 25:
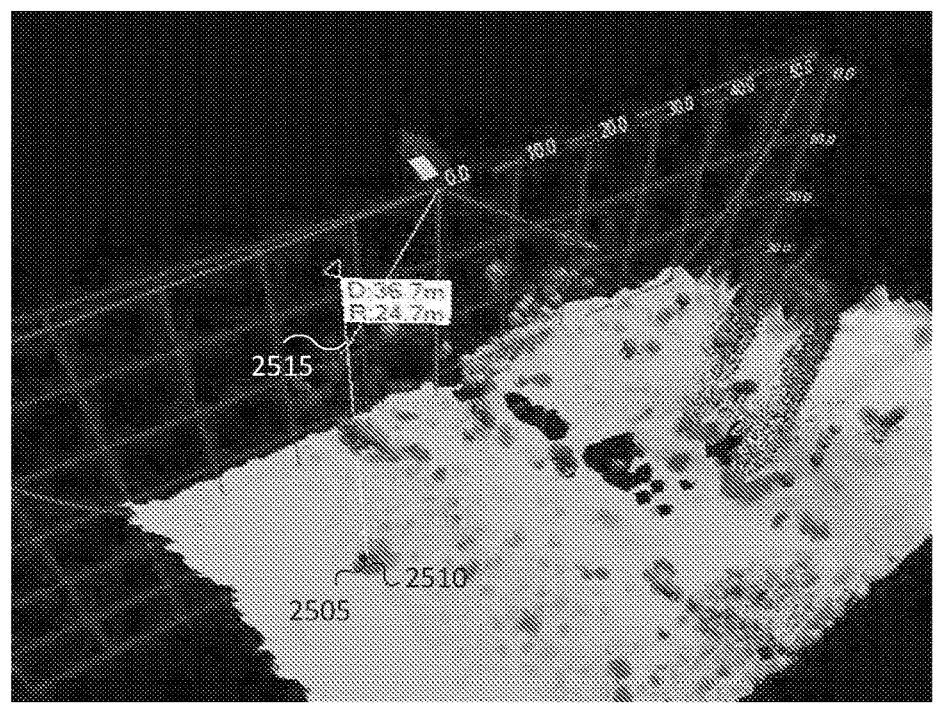
FIG. 25 illustrates a display view implementing a shadow-based 3D target selection system and/or method in accordance with an embodiment of the disclosure.

FIG. 25 illustrates a display view 2500 of a 3D representation implemented with this shadow selection function. Once the 3D representation is displayed to a user (for example, via user interface 120), sonar system 110 and/or system 100 allows the user to select a point on the display that corresponds to a shadow. In this example, the user has selected point 2505 on the display. Sonar system 110 and/or system 100 is configured to then determine a shadow (e.g., shadow 2510) based on the selected point 2505. Sonar system 110 and/or system 100 may be configured to identify an in-water object (e.g., in-water object 2515) that corresponds to shadow 2510. In some of these embodiments, sonar system 110 and/or system 100 may also be configured to automatically display relevant information related to in-water object 2515, such as depth and range distances.

Surface with Persistence

It is noted that the 3D representation may be rendered based on volume data that includes both recent (new) volume data and old (historic) volume data, based on the time when the volume data was gathered by the sonar system. Once new sonar data (new volume data) has been added to a 3D representation, the targets and structure within the 3D representation move away from the depth and range markers on grid 1105 (as sonar system 110 moves away from the targets and structure and grid 1105 is tied to the location of sonar system 110), due to the translation in 3D coordinates. As the distance between the historical data and the new data increases, the relationship between the object within the 3D representation and the range and depth marker is lost. It has been contemplated that introducing (replicating) some portion of the old data that decays as new data is added, and displaying the replicated data (also referred to as "ghost representation" or "ghost object") on a surface (e.g., on the 2D plane on which grid 1105 is rendered) in the 3D representation at the point where new data is added may enhance the viewing experience. The representation of the replicated old data this way advantageously maintains the relationship of old data with the range and depth markers for a length of time. The length of time during which the replicated old data is displayed may be dictated by either a specified decay rate in units of time or units of number of new data entries. The decay rate may be either a fixed value or user defined.

The ghost representation may either be a 3D representation of the object or a 2D projection of the object onto a 2D surface (e.g., on grid 1105) within the 3D representation.

Figure 26:
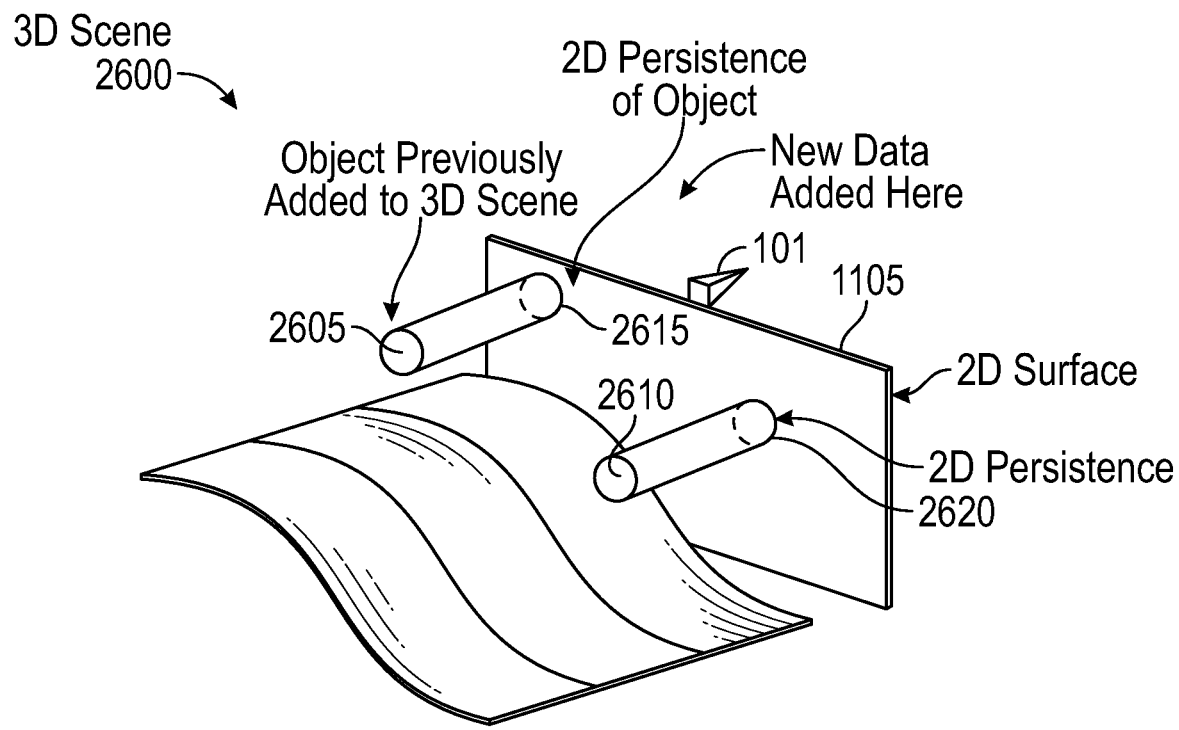
FIG. 26 illustrates a display view that shows rendering of ghost objects within a 3D representation in accordance with an embodiment of the disclosure.

FIG. 26 illustrates the persistent display of old volume data in display view 2600. As shown, objects 2605 and 2610 are rendered based on old (outdated) volume data. As mobile structure 101 continues to move and sweep new areas of the underwater environment, new data is being added to the 3D representation. At the same time, grid 1105 being tied to the location of mobile structure 101 would move farther away from objects 2605 and 2610, and the relationship between objects 2605 and 2610, and the markers displayed on grid 1101 to identify the objects' distances may be lost. As such, sonar system 110 and/or system 100 of some embodiments may be configured to render a ghost object (ghost objects 2615 and 2620) on grid 1105 based on objects 2605 and 2610. In some embodiments, ghost objects 2615 and 2620 are rendered as replication of objects 2605 and 2610. In other embodiments, ghost objects 2615 and 2620 are rendered as a 2D shadow of objects 2605 and 2610, as illustrated in FIG. 26. Ghost objects 2615 and 2620 provide indication of the relative positions of objects 2605 and 2610 with respect to mobile structure 101 when volume data related to objects 2605 and 2610 were newly added to the 3D representation. As mentioned above, sonar system 110 and/or system 100 may be configured to remove ghost objects 2615 and 2620 from the 3D representation at the predetermined decay rate.

The persistent (ghost) representations can be either the same color scheme as the corresponding object that fades as it decays, which can be achieved using techniques such as transparency. Alternatively, the color scheme of the ghost representations can be different in order to improve the contrast between real representations and ghost representations. In some embodiments, the ghost object can be rendered as an outline of the object (in two dimensions) that gradually fades or gradually shrinks in size.

Figure 27:
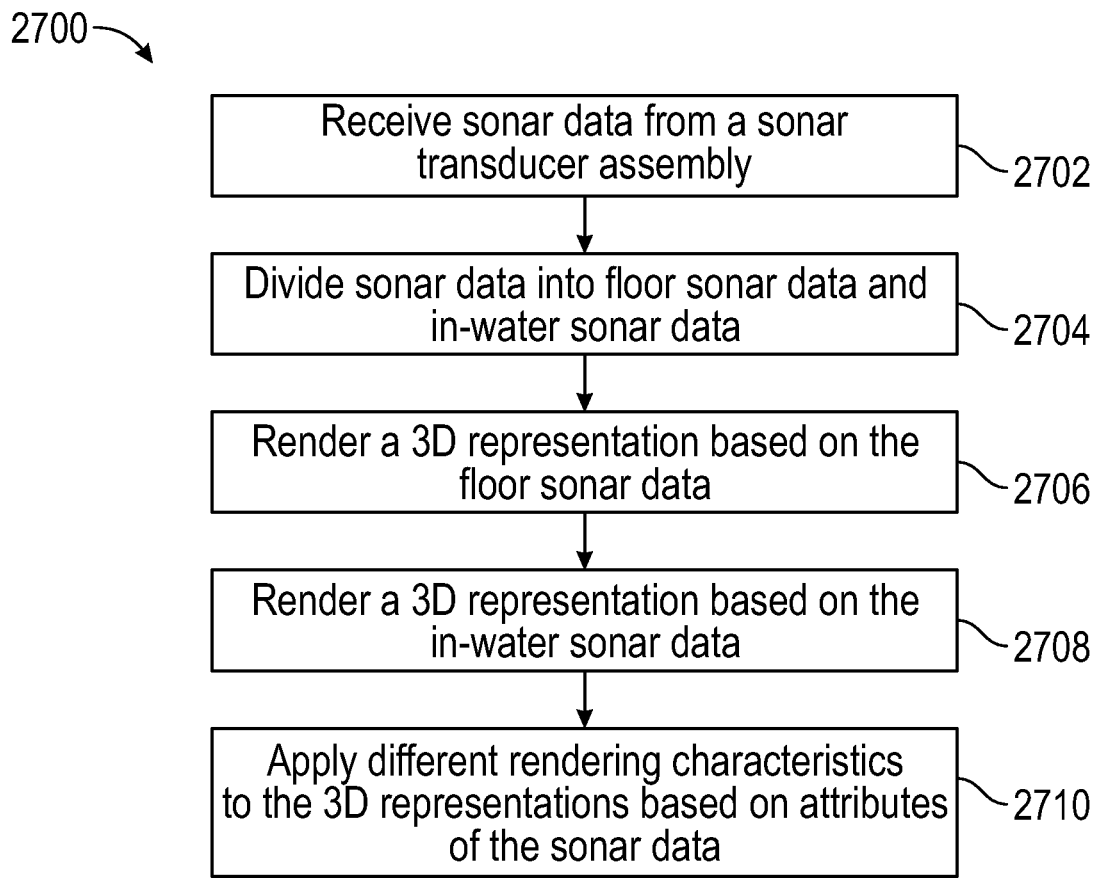
FIG. 27 illustrates a flow diagram of various operations to apply rendering characteristics to a 3D representation in accordance with an embodiment of the disclosure.

FIG. 27 illustrates a flow diagram of process 2700 to provide a 3D representation that visually distinguishes different features by their attributes for mobile structure 101 in accordance with embodiments of the disclosure. In some embodiments, the operations of FIG. 27 may be implemented as software instructions executed by one or more logic devices associated with corresponding electronic devices, sensors, and/or structures depicted in FIGS. 1A through 4. More generally, the operations of FIG. 27 may be implemented with any combination of software instructions and/or electronic hardware (e.g., inductors, capacitors, amplifiers, actuators, or other analog and/or digital components).

It should be appreciated that any step, sub-step, sub-process, or block of process 2700 may be performed in an order or arrangement different from the embodiments illustrated by FIG. 27. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 2700 is described with reference to systems described in reference to FIGS. 1A-4, process 2700 may be performed by other systems different from those systems and including a different selection of electronic devices, sensors, assemblies, mobile structures, and/or mobile structure attributes.

Process 2700 represents a method for providing a 3D representation that visually distinguishes different features by their attributes using systems 100 and or 100B in accordance with embodiments of the disclosure. At the initiation of process 2700, various system parameters may be populated by prior execution of a process similar to process 2700, for example, or may be initialized to zero and/or one or more values corresponding to typical, stored, and/or learned values derived from past operation of process 2700, as described herein.

In block 2702, a logic device receives sonar data from a sonar transducer assembly. For example, controller 130 of systems 100 or 100B may be configured to receive sonar data from sonar transducer assembly 112 of sonar system 110. In some embodiments the controller may be configured to also receive position data from GPS module 146 and orientation (attitude) data from orientation sensor 140. In this regard, sonar system 110 may be instructed to aim transducer assembly 112 to an underwater scene below mobile structure 101 to acquire substantially real time sonar data.

In block 2704, a logic device divides the received sonar data into two categories of sonar data—floor sonar data representing data that is related to the floor of the underwater environment and in-water sonar data that is related to other in-water objects in the underwater environment. For example, controller 130 may be configured to separate the received sonar data into the two categories of sonar data by analyzing the depth, position, and intensity information of the sonar data.

After dividing the sonar data into floor sonar data and in-water sonar data, in block 2706, a logic device renders a 3D representation based on the floor sonar data, position data, and orientation data. For example, controller 130 may be configured to render the 3D representation of the floor using various techniques according to embodiments of the disclosure described above. In some embodiments, controller 130 may be configured to render the 3D representation of the floor using the point cloud technique as described above reference to FIG. 18. In other embodiments, controller 130 may be configured to render the 3D representation of the floor using imposter techniques to generate the pseudo-3D-objects described above by reference to FIGS. 19A, 19B, 19C, 20A, 20B, 21A, and 21B.

In block 2708, a logic device renders a 3D representation based on the in-water sonar data, position data, and orientation data. For example, controller 130 may be configured to render the 3D representation of the in-water objects using various techniques according to embodiments of the disclosure described above. In some embodiments, controller 130 may be configured to render the 3D representation of the in-water objects using the point cloud technique as described above reference to FIG. 18. In other embodiments, controller 130 may be configured to render the 3D representation of the in-water objects using the imposter techniques to generate pseudo-3D-objects described above by reference to FIGS. 19A, 19B, 19C, 20A, 20B, 21A, and 21B.

In block 2710, a logic device applies different rendering characteristics to the 3D representations of the floor an in-water objects based on attributes of the sonar data, GPS data, and orientation data. Various techniques may be used for applying the different rendering characteristics. For example, to create a visually distinguishing appearance between the floor and in-water objects, controller 130 may be configured to render the floor and the in-water objects in different color schemes, as illustrated in FIG. 18. Since the sonar data has already been divided into floor sonar data and in-water sonar data, controller 130 may be configured to apply one color scheme (e.g., various shades of dull brown colors) to the floor sonar data and apply a different color scheme (e.g., a color scheme according to a color key 1315). As such, the representations of the in-water objects can be visually distinguished from representations of the floor.

In order to further distinguish different features among the in-water objects, controller 130 may be configured to apply size variations, transparency variations, or both, to the rendering of in-water objects according to their detected depth levels or echo return intensities, as illustrated in FIGS. 19B, 19C, 20*b*, and 21B.

To further enhance the ability to interpret the in-water objects in the 3D representation, controller 130 may be configured to add false shadows for the in-water objects in the 3D representation, as illustrated in FIG. 22B. To reduce cluttering of the scene, controller 130 may be configured to apply transparency variation and size variation to the shadow in a similar manner as they are applied to the representations of the in-water objects, as illustrated in FIG. 23.

To further enhance the appearance of the shadows by making them more stand out against the representation of the floor, controller 130 may be configured to apply a color scheme to the shadow that is in sharp contrast with the color scheme applied to the floor. As illustrated in FIG. 24B, controller 130 may be configured to apply a bright color (e.g., bright purple or pink) for the rendering of the shadows and apply a dull color (e.g., dull brown) to the rendering of the floor.

Furthermore, to retain a relationship between an outdated object in the 3D representation and the depth/range markers, controller 130 may be configured to introduce ghost objects in the 3D representation, as illustrated in FIG. 26. In this regard, controller 130 may be configured to insert a time stamp to sonar data as the sonar data is received from the sonar system 110. When new sonar data is received and processed, controller 130 may be configured to analyze the old sonar data and generate ghost object in the 3D representation based on the old sonar data. In some embodiments, controller 130 may be configured to apply fading to the ghost object based on the time stamp, and eventually determine to cease creating ghost object when the time stamp of the old sonar data indicates a time that exceeds a predetermined threshold.

Furthermore, different embodiments of controller 130 may be configured to render the in-water objects using different color schemes. For example, controller 130 may be configured to render the floor in various shades of dull brown colors according to the echo return intensity, as described above by reference to FIGS. 18, 21A, and 21B. In another example, controller 130 may be configured to render the floor based on the depth levels according to a color key, as described above by reference to FIGS. 20A, 20B, 22A, 22B, and 23.

Furthermore, different embodiments of controller 130 may be configured to render the floor using different color schemes. For example, controller 130 may be configured to render the floor in various shades of dull brown colors according to the echo return intensity, as described above by reference to FIGS. 18, 21A, and 21B. In another example, controller 130 may be configured to render the floor based on the depth levels according to a color key, as described above by reference to FIGS. 20A, 20B, 22A, 22B, and 23.

In block 1706, a logic device renders one or more indicator keys that are overlaid within the 3D representation. For example, controller 130 of systems 100 or 100B may be configured to render one or more of a grid (e.g., grid 1105 as shown in FIG. 11), one or more depth scales (e.g., depth scale 1120 as shown in FIG. 11, color key 1315 as shown in FIG. 13), a range scale (e.g., range scale 1125 as shown in FIG. 11), a coverage indicator (e.g., sonar coverage indicator 1415 as shown in FIG. 14), and a series of range circles (e.g., range circles 1520 of FIG. 15). In some embodiments, controller 130 may be configured to render these indicator keys on various 2D planes within the 3D representation. Furthermore, to improve visibility of the 3D representation, these indicator keys may be rendered in different colors, and preferably in different colors than the representations of the actual underwater scene. As mentioned above, each of the indicator key may be rotatable within the 3D representation. As such, when rendering each the indicators key, controller 130 may be configured to define a rotational axis about which the indicator key may rotate.

In block 1708, a logic device detects a change condition. The change condition may be different for each indicator key, and may be pre-defined. For example, the change condition for depth scale 1120, range scale 1125, and color key 1315 may be a change of the viewing perspective. Thus, controller 130 may be configured to detect whether a user has changed a viewing perspective of the display of the 3D representation. In some embodiments, controller 130 may be configured to detect such a change via receiving and monitoring user input via user interface 120. In another example, the change condition for sonar coverage indicator 1415 may be a change of orientation (attitude) of mobile structure 101. Thus, controller 130 may be configured to also detect whether the orientation/attitude of mobile structure 101 has been changed. IN some embodiments, controller 130 may be configured to detect such a change by receiving and monitoring orientation (attitude) data from orientation sensor 140.

In block 1710, in response to detecting a change condition, a logic device rotates one or more indicator keys about their corresponding rotational axis within the 3D representation. For example, in response to detecting a change of viewing perspective to a new viewing perspective, controller 130 may be configured to rotate depth scale 1120, range scale 1125, and color key 1315 about their corresponding rotational axes in a manner described above by reference to FIGS. 11, 12A, 12B, 13A, and 13B. In another example, in response to detecting a change of orientation (attitude) of mobile structure 101, controller 130 may be configured to rotate sonar coverage indicator 1415 about its rotational axis in a manner described above by reference to FIGS. 14A and 14B.

In yet another aspect of the present disclosure, various techniques are disclosed for producing high resolution rendering of a 3D surface representation of the bottom of an underwater environment. In some embodiments, the various techniques disclosed herein for rending the 3D surface representation of the bottom advantageously utilize relatively low processing resources. Additionally, the various techniques disclosed herein may be applied to a previously rendered 3D representation by seamlessly overlapping the previously rendered scene.

The various techniques disclosed herein may be implemented by any sonar system or mobile structure (e.g., sonar system 110, mobile structure 101) described above. In some embodiments, volume data (e.g., sonar data) of a scene (e.g., an underwater environment), location data, orientation (attitude) data may be captured by mobile structure 101. Mobile structure 101 may generate a 3D representation of the scene using various methods, such as methods described above. In some embodiments, a two dimensional (2D) grid may be rendered and overlaid within the 3D representation. The two dimensional grid may be rendered in various shapes, such as a rectangle, ellipse, or any other regular or irregular shape. The 2D grid has vertices (where grid lines intersect) and cells (distinct areas within the 2D grid defined by grid lines).

The 2D grid is initially rendered on a 2D plane that is parallel to the longitudinal axis 102 and the lateral axis 103, and perpendicular to the vertical axis 104. As such, each vertex on the 2D grid has a longitudinal coordinate and a lateral coordinate. After the 2D grid is initially rendered on a particular 2D plane, all of its vertices would also have the same vertical coordinates initially. The 2D grid will be used for rendering the high resolution 3D bottom surface of the 3D representation.

As such, the volume data related to the bottom features is separated from the remaining data, for example, using techniques described above. The volume data includes point data of points, where each point is derived from a distinct echo return. Thus, each point includes associated information, such as intensity, location data including a longitudinal coordinate, a lateral coordinate, and a vertical coordinate.

Each point from the volume data is mapped to a vertex on the 2D grid based on the point's longitudinal and lateral coordinates. In some embodiments, a point is mapped to the closest vertex. It is noted that multiple points may be mapped to a single vertex of the 2D grid. The vertical coordinates of mapped points are used to adjust the vertical coordinates of the vertices. A 3D surface representation is rendered based on the adjusted 2D grid.

To render the 3D surface, multiple 2D structures (e.g., triangles) are generated for the cells in the 2D grid. In some embodiments, the 2D structures are generated only for cells in the grid that have vertices with mapped points such that no 2D structure is generated for cells without any mapped points.

A surface may then be plotted based on the cells. In some embodiments, texture that stretches over the 2D structure may be applied.

In some embodiments, this 3D surface generation process may be repeated every time new sonar data is received. In some of these embodiments, only the 2D structures that have been changed or added are re-rendered to reduce processing load. In some embodiments, multiple grids can be generated based on volume data recorded in different periods of time to create a continuous track, for example, for bathymetry.

As discussed above, sonar data (e.g., from sonar system 110), and location data, (from GPS module 146) and optionally attitude data (e.g., from orientation sensor 140) may be obtained to generate a 3D representation of scene in a point cloud format (as described above). Echo returns associated with the bottom features are separated from those that correspond to targets in the water. A 2D grid in the XY plane (horizontal plane that is parallel to the longitudinal axis 102 and lateral axis 103) is defined with a fixed resolution (e.g., in meters) (the resolution defines the cell size). In some embodiments, the resolution of the 2D grid is defined by the currently selected range, which has a fixed extent in grid cells either side of the first ping center (e.g. the location of sonar system 110 or mobile structure 101).

New data for echo returns associated with the bottom contribute to the depths (Z coordinates for the grid vertices) and cells with defined depths have triangles generated to represent the surface of the bottom and structures attached to the bottom. Optionally, a texture may be applied over the grid based on the intensities and/or depths information collected from the volume data (note that this information has a higher resolution than the grid), thus providing a higher resolution image of the bottom structure. The grid may be converted to 3D objects such as triangles to generate a colored 3D surface that represents the bottom profile.

Figure 28:
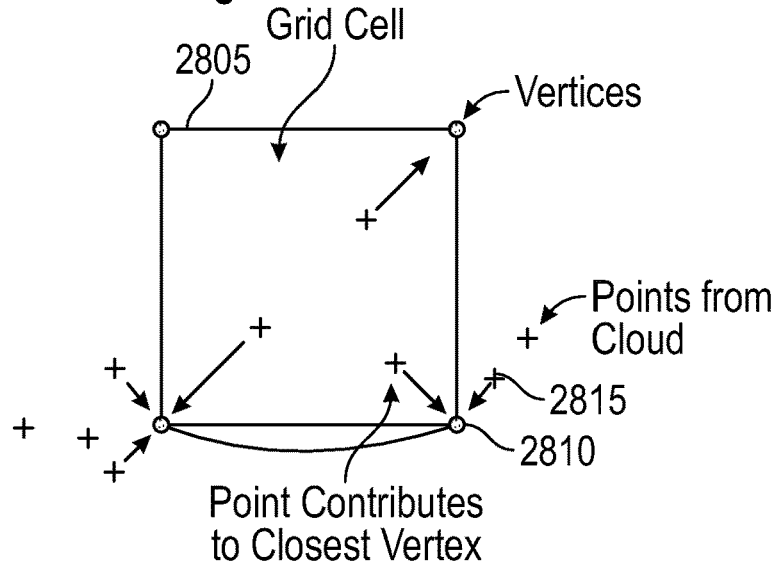
FIG. 28 illustrates mapping of points to vertices in a 2D grid in accordance with an embodiment of the disclosure.

In some embodiments, the mapping of points to vertices may be implemented based on the shortest distance. For example, conversion of point cloud coordinates to closest grid vertex or texture pixel may be a simple division of the X and Y coordinates by the cell size and rounding to the nearest integer. This provides indices of a 2D array that may be used to point to particular cells in the 2D grid. FIG. 28 illustrates a cell 2805 of an example 2D grid (with rectangular cells) having four vertices (e.g., vertex 2810) being viewed from vertically above. Points (e.g., point 2815) derived from volume data may be mapped to the closest vertices. In this example, point 2815 is mapped to vertex 2810 as it is the closest vertex from point 2815.

The grid forms a structure that stores all of the interim data (derived from the volume data or point data) in order to define a set of triangles. For example, these parameters may be stored for each of the vertices of the grid: Position in relative coordinates (relative to the first ping) (X,Y and Z), Normal (Default is 'UP' i.e. 0,0,−1), Color (A,R,G and B), Texture coordinates (U and V), Sum of depths of contributing points from the cloud, Sum of intensities of contributing points from the cloud, Sum of weights for contributing points from the cloud, and Flag to indicate that the vertex info has been recently updated.

In some embodiments, once the 2D grid is rendered, the X and Y coordinates of the vertices will be fixed (maintained the same throughout the process) for a specific cell size. The texture UV coordinates are also fixed for a particular value of N.

In some embodiments, information associated with points that are mapped to a particular vertex is used to derive the Z value of the vertex. For example, the Z value for a vertex may be defined by dividing the sum of depths of the mapped points by the sum of weights of the mapped points. Alternatively, the Z value for a vertex may be defined by dividing the sum of intensities of the mapped points by the sum of the weights of the mapped points. In some embodiments, the two calculations may be combined together to adjust the value Z. This allows the 2D grid to be dynamically updated so that new points (from new sonar data) may be used to update previously defined vertex data. The flag indicates that the triangles need to be updated. Once the triangles are updated the flag may be reset until new sonar data is received.

This technique described herein allows echo returns with higher intensities to be emphasized, which are less likely to be noise or erroneous targets. The contribution for each of the echo returns at the grid vertices can be weighted as a function of the intensity, such that higher intensities have a higher weighting value.

The color value of a vertex may be defined according to a selected color palette, and based either on the depth or intensity of the mapped points. The depth or intensity of the mapped points may be converted to an index in the color palette by, for example, a look-up table. The choice between depth and intensity may be defined by the selected display mode. Furthermore, the color value may be ignored if a texture is selected for the grid.

In some embodiments, triangles may be defined for a cell in the 2D grid that has at least three corners (three associated vertices) with contributing (mapped) points. If all four corners (vertices) of the cell have mapped points, then the direction of the diagonal within the cell may be defined based on the relative depths of the four corners (vertices) so that 'valleys' and 'hills' can be depicted correctly.

Figure 29A:
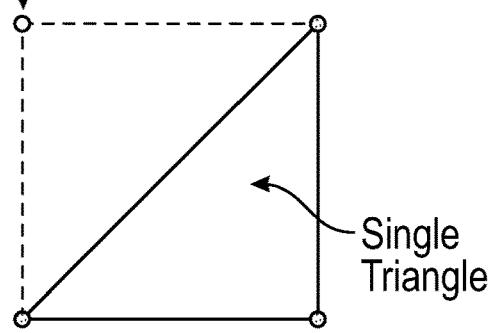
FIGS. 29A and 29B illustrate generation of triangles based on a 2D grid in accordance with an embodiment of the disclosure.
Figure 29B:
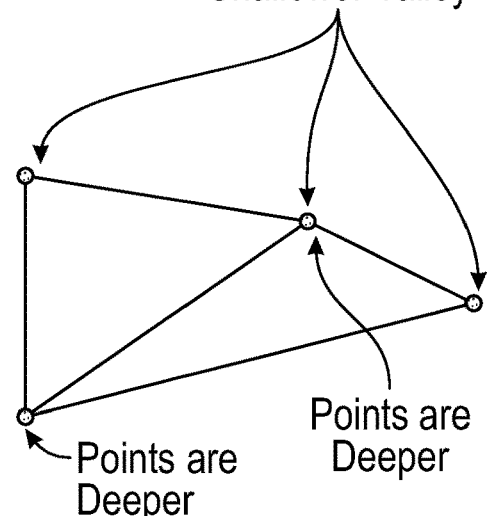

FIG. 29A illustrates generation of a triangle for a cell having only three vertices with mapped points. FIG. 29B illustrates generation of triangles for a cell having all four vertices with mapped points.

In some embodiments, the normal for the corners (vertices) may be calculated based on the triangle face and then averaged with any triangles that share the same grid vertices. This approach provides a smooth transition between adjacent triangles and supports a Gouraud type shading implementation.

To further improve the resolution of the bottom surface, a texture having a higher resolution than the grid may be used to map onto the grid. The data storage requirement for storing information related the texture is much less than that of the grid, so this approach allows for providing higher resolution within memory constraints.

For example, an increased resolution of M requires that the texture size to be $(M*N)^2$, and texture cell size equals to cell size divided by M.

In some embodiments, the points from a ping's point cloud are quantized in the same manner as the grid points, but using the texture cell size to obtain the indices for the particular pixel.

Contributions for a pixel with overlaying points may be set by selecting the highest intensity for intensity mode and shallowest depth for depth mode.

The UV values for the grid vertices may be used to map the texture onto the generated triangles to provide the effect of a higher resolution grid.

Figure 30:
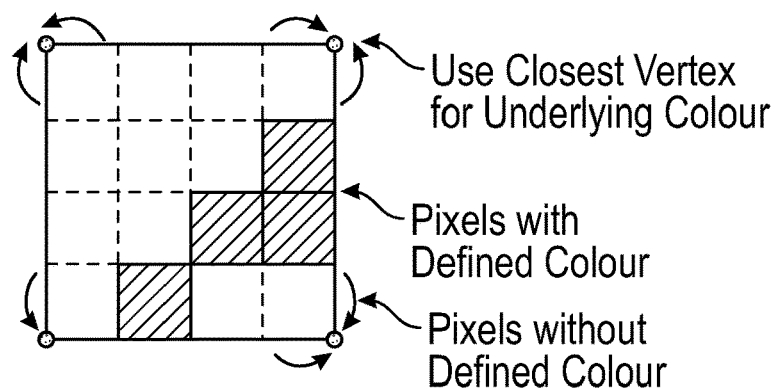
FIG. 30 illustrates generation of additional pixels within a 2D grid cell in accordance with an embodiment of the disclosure.

It is noted that pixels may be filled or added between pixels that already have values to further improve the surfacing affect. One approach to add the pixel is to use an underlying average value provided by the closest vertex in the grid for the added pixel. FIG. 30 illustrates adding pixel information within a cell defined by four vertices. As shown, new pixels may be added within the cell by using underlying average color values of the nearest vertices to generate the new pixels.

Figure 31:
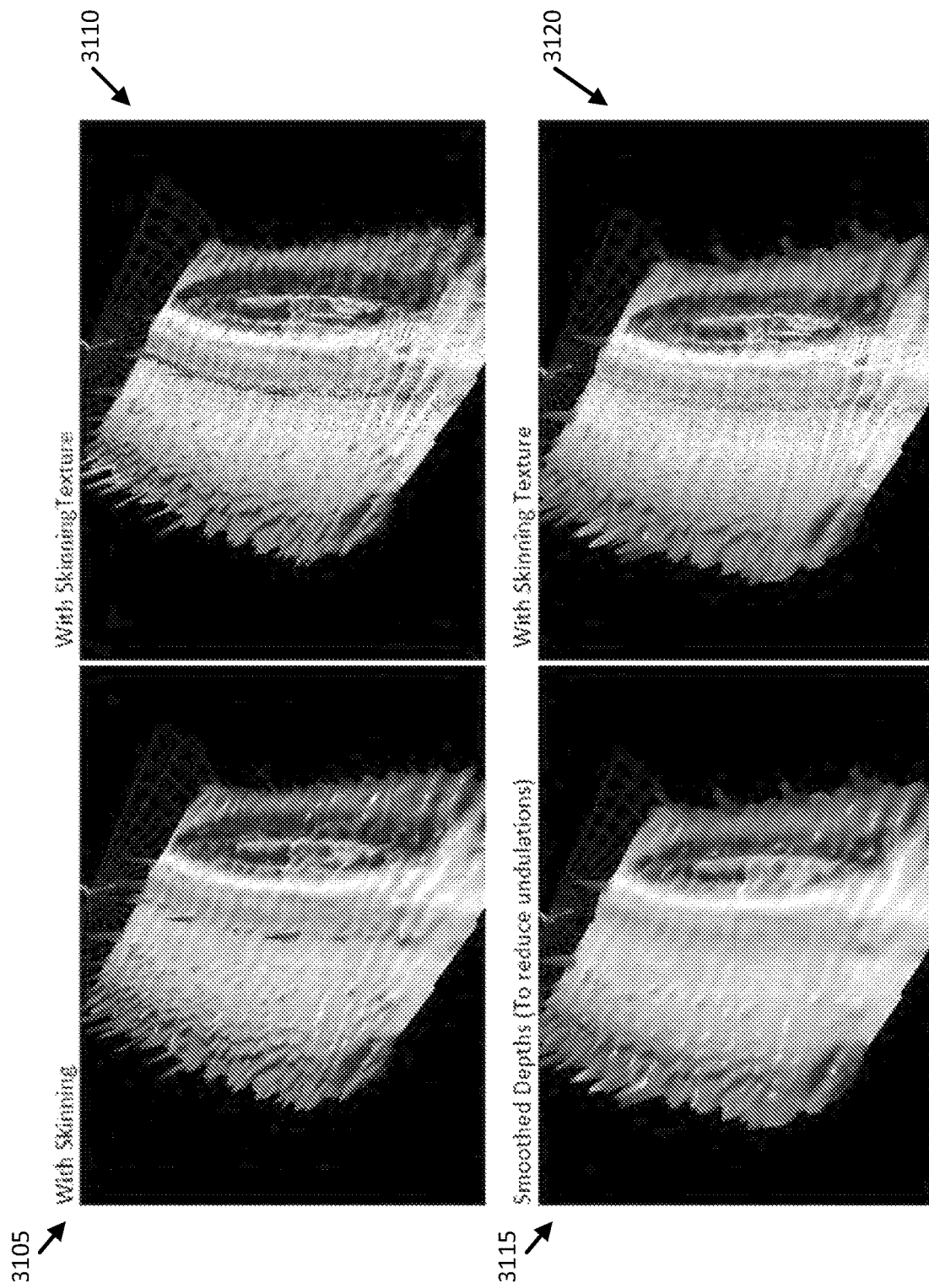
FIG. 31 illustrates 3D representation renderings with various surface enhancement effects in accordance with an embodiment of the disclosure.

FIG. 31 illustrates the results of applying different skin texture and filling between defined pixels on the same bottom features by way of display views 3105, 3110, 3115, and 3120. Specifically, display view 3105 shows rendered bottom features with "skinning" effect. Display view 3110 shows rendered bottom features with added skinning texture to the rendered bottom features shown in display view 3105. Display view 3115 shows rendered bottom features with smoothed depths to reduce undulations, and display view 3120 shows rendered bottom features with skinning texture added to the rendered bottom features from display view 3115.

Once the points that have been used to generate the bottom texture they can be discarded. The detail that the skin provides is good enough so that the points are no longer needed, which allows memory to be freed up.

In some embodiments, an extension may be provided to support a moving track. Ideally, if infinite memory and processing power is available, then an infinitely long grid would provide a solution that would generate triangles for any track and would also allow new pings to update old triangles which supports overlaying tracks. But with limited resources, a more efficient approach is needed.

It has been contemplated that the grid is not an efficient way to store information for producing a track, as many of the cells are not populated, and there is a fair amount of information stored for each cell (e.g. sum of depths, etc.). A sparse array method of storing the information, that is efficient at shift data around in memory, would support this requirement. An alternative approach would be to split the grid into smaller sub grids, as described in the following.

A small grid that is large enough to allow for any roll, pitch and yaw along with some limited translation due to the boat movement is generated, as the working grid. A set of trailing mini-grids that are sized to store a local section of the historical track is generated. Each of the grids also has a corresponding texture to store the high resolution detail.

Figure 32:
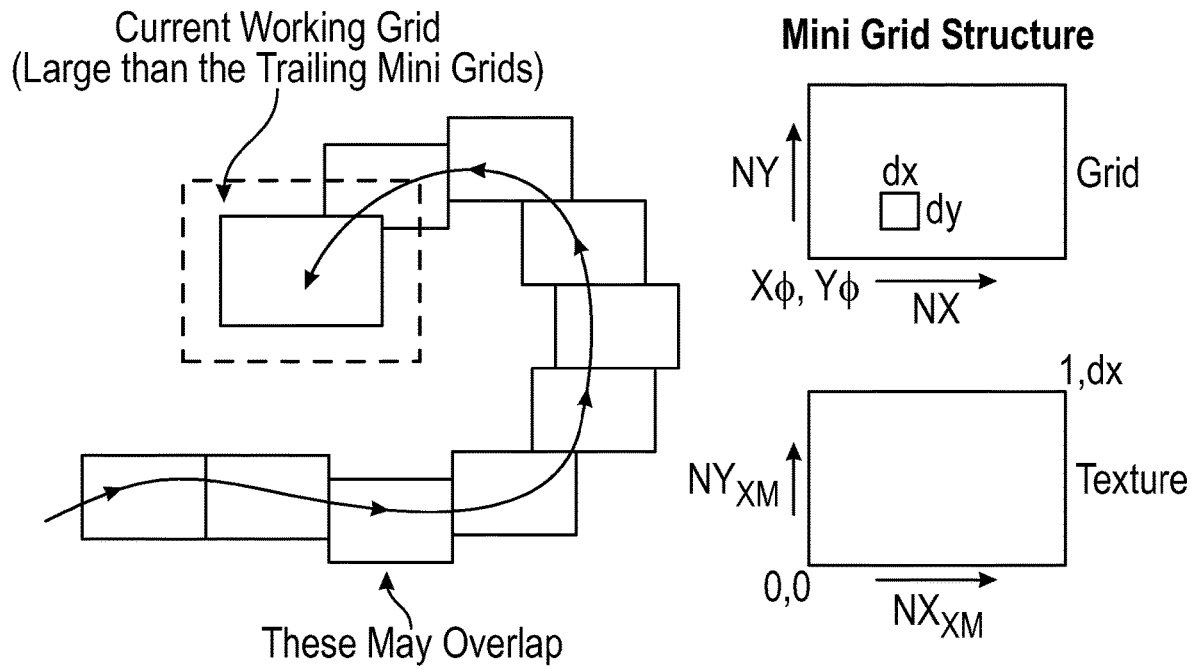
FIG. 32 illustrates various techniques of providing extended track of surface using working grids and mini-grids in accordance with an embodiment of the disclosure.

In some embodiments, some parameters associated with the mini-grids, such as the bottom left X and Y coordinate may be stored, and the stored information may be merged with the working grid if the track runs over the old track. In some of these embodiments, the old track information may take on a lower weighting than the new track data. FIG. 32 illustrates example working grids and mini-grids structure.

Alternatively, the memory requirement may still be reduced by storing only the information of the mini-grid that is required to generate the triangles and not information that would allow for the merging. The result of this alternative approach would be that the surface that is closest to the camera would obscure surfaces that are farther away.

Overlapping grids may be managed by generating only one set of triangles that share vertices from the different grids. The one set of triangles may have their normal averaged from the overlapping triangles to maintain a smooth transition between grids. In fact, slightly overlapping grids is beneficial in hiding the seams between the grids.

The grid resolution may be changed with selected range for two reasons 1) the amount of data for large ranges may be too big for the limited available resources 2) the sonar reduces its resolution with increasing range.

Preferably, the old data are left at its specified resolution and any new data would be used to generate the surface at the new resolution. This could cause issues with joining/merging new and old data. One approach of mitigating this issue is to convert all historical data to the same resolution as the most recent data, but this is not ideal as shallow water definition may be lost. An alternative approach is to conduct the change in resolution in a binary manner so that at least get half of the shared vertices may be matched between resolution changes. However, this alternative approach will still not give a perfect match and will exhibit seaming issues such as gaps in the surface. Another approach is to maintain the number of cells in the grid but change the cell's physical size, such that an intermediate line of cells will adapt, in a gradual manner, the two resolutions.

Figure 33:
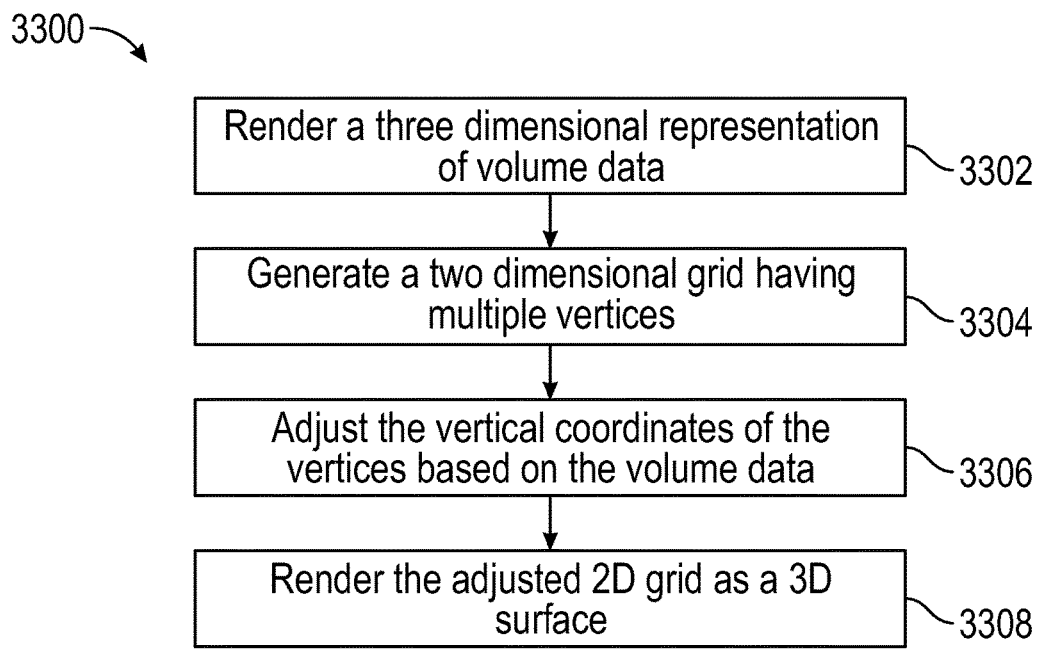
FIG. 33 illustrates a flow diagram of various operations to provide high resolution bottom surface rendering a 3D representation in accordance with an embodiment of the disclosure.

FIG. 33 illustrates a flow diagram of process 3300 to provide a high resolution 3D bottom surface representation for mobile structure 101 in accordance with embodiments of the disclosure. In some embodiments, the operations of FIG. 33 may be implemented as software instructions executed by one or more logic devices associated with corresponding electronic devices, sensors, and/or structures depicted in FIGS. 1A through 4. More generally, the operations of FIG. 33 may be implemented with any combination of software instructions and/or electronic hardware (e.g., inductors, capacitors, amplifiers, actuators, or other analog and/or digital components).

It should be appreciated that any step, sub-step, sub-process, or block of process 3300 may be performed in an order or arrangement different from the embodiments illustrated by FIG. 33. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 3300 is described with reference to systems described in reference to FIGS. 1A-4, process 3300 may be performed by other systems different from those systems and including a different selection of electronic devices, sensors, assemblies, mobile structures, and/or mobile structure attributes.

Process 3300 represents a method for providing a 3D representation that visually distinguishes different features by their attributes using systems 100 and or 100B in accordance with embodiments of the disclosure. At the initiation of process 3300, various system parameters may be populated by prior execution of a process similar to process 3300, for example, or may be initialized to zero and/or one or more values corresponding to typical, stored, and/or learned values derived from past operation of process 3300, as described herein.

In block 3302, a logic device receives sonar data from a sonar transducer assembly. For example, controller 130 of systems 100 or 100B may be configured to receive sonar data from sonar transducer assembly 112 of sonar system 110. In some embodiments the controller may be configured to also receive position data from GPS module 146 and orientation (attitude) data from orientation sensor 140. In this regard, sonar system 110 may be instructed to aim transducer assembly 112 to an underwater scene below mobile structure 101 to acquire substantially real time sonar data.

In block 2704, a logic device renders a 3D representation based on volume data, position data, and orientation data. For example, controller 130 may be configured to render the 3D representation using various techniques according to embodiments of the disclosure described above. In some embodiments, the volume data only includes data related to bottom features of an underwater environment. The bottom features data may be separated from the volume data related to other in-water objects using techniques described above. In some embodiments, controller 130 may be configured to render the 3D representation of the bottom features using the point cloud technique as described above reference to FIG. 18.

In block 2704, a logic device generates a 2D grid having multiple vertices within the 3D representation. In some embodiments, controller 130 may be configured to render the 2D grid on a 2D plane within the 3D representation.

In block 2706, a logic device adjusts the vertical coordinates of the vertices of the 2D grid based on the points derived from the volume data. For example, controller 130 may be configured to use the techniques described above to map points to the vertices as shown in FIG. 28 and adjusts the vertical coordinates of the vertices based on the mapped points.

In block 2708, a logic device renders the adjusted 2D grid as a 3D surface. For example, controller 130 may be configured to use the techniques described above to generate triangles for each cells of the 2D grid as shown in FIGS. 29A and 29B and insert additional pixels within each cell as shown in FIG. 30, and adding texture to the surface as shown in FIG. 31. In some embodiments, controller 130 may be configured to also provide an extended track based on the generated grids using various techniques described above by reference to FIG. 32.

Although the techniques presented herein are described primarily in the context of sonar systems and sonar data providing the volume data and performing various rendering techniques, it should be understood that other types of ranging sensor systems, including radar, LIDAR, stereoscopic image/video imaging systems, and/or other ranging sensor systems may be used to provide the volume data and such data may be processed using the techniques described herein to provide one or more of the various display views and/or to reduce system resource usage, as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to communicate with a user interface and receive volume data from a volume data source, wherein the logic device is configured to:
render a three dimensional (3D) representation of the volume data on a display of the user interface according to a view perspective;
render an indicator key on a first two dimensional (2D) plane overlaid in the 3D representation;
detect a change condition; and
rotate the indicator key about a rotational axis in response to the detected change condition.

2. The system of claim 1, wherein the rotational axis is aligned with one of the three axes of the 3D space.

3. The system of claim 1, wherein the logic device is further configured to render, within the 3D representation, a two dimensional grid on a second 2D plane having a first axis that corresponds to one of the three axes of the 3D space and a second axis that corresponds to another one of the three axes of the 3D representation.

4. The system of claim 3, wherein:
the indicator key comprises a range indicator column comprising a plurality of range indicators indicating distances from a location of the volume data source along the first axis of the second 2D plane;
the rotating the indicator key comprises rotating the indicator key about the first axis of the second 2D plane when the change condition comprises receiving a user input via the user interface indicating a change of the view perspective; and
wherein the logic device is further configured to render, within the 3D representation, a series of range circles on a third 2D plane that is perpendicular to the second 2D plane, wherein the series of range circles corresponds to a plurality of grid lines of the 2D grid.

5. The system of claim 3, wherein an edge of the indicator key adjoins an edge of the 2D grid.

6. The system of claim 3, wherein:
the indicator key comprises a plurality of depth indicator column indicating distances from a location of the volume data source along the second axis of the second 2D plane;
the rotating the indicator key comprises rotating the indicator key about the second axis of the second 2D plane when the change condition comprises receiving a user input via the user interface indicating a change of the view perspective; and
wherein the depth indicator column comprises a plurality of numeral indicators or a color key that displays different colors corresponding to different depth levels.

7. The system of claim 6, wherein the volume data comprises data associated with different objects within a scene, and wherein rending the 3D representation comprises rendering 3D representations of the different objects in different colors according to the color key and detected depth levels of the different objects.

8. The system of claim 1, wherein the indicator key comprises a beam shape indicator indicating a coverage boundary of the volume data source; and
wherein the 3D representation comprises representations that correspond to different objects within a scene, wherein the logic device is further configured to receive, via the user interface, a user selection of a representation that corresponds to an object within the scene; and
render, within the 3D space, a graphical element that indicates a distance of the object from a location of the volume data source along one of the three axes.

9. The system of claim 1, wherein:
the volume data source comprises a sensor assembly configured to generate sensor data corresponding to an environment of a mobile structure;
the volume data comprises the sensor data corresponding to the environment of the mobile structure; and
wherein:
the mobile structure comprises a watercraft, the sensor assembly comprises a sonar transducer assembly configured to be mounted to the watercraft and placed in a body of water, and the sensor data comprises sonar data generated by the sonar transducer assembly.

10. A method comprising:

receiving, from a volume data source, volume data representing a scene;

separating the volume data into floor volume data corresponding to a floor within the scene and in-water object volume data corresponding to objects located above the floor within the scene;

rendering a first set of 3D representations of the floor volume in a first manner; and rendering a second set of 3D representations of the in-water object volume data in a second manner different from the first manner.

11. The method of claim 10, wherein the first set of 3D representations and the second set of 3D representations are rendered using different color palettes; and wherein the second set of 3D representations are rendered according to a color key system that assigns different colors to different depth levels.

12. The method of claim 11, wherein the rendering the second set of 3D representation comprises:

deriving, for each object located above the floor, an intensity level indicating an intensity of the volume data that corresponds to the object; and rendering the different 3D representations within the second set differently according to the intensity levels derived for the corresponding objects.

13. The method of claim 12, wherein rendering the different 3D representations comprises rendering the different 3D representations in different sizes according to the intensity levels derived for the corresponding objects.

14. The method of claim 13, wherein rendering the different 3D representations in different sizes comprises rendering, for an object having a higher intensity level, a 3D representation that is larger than a 3D representation rendered for an object having a lower intensity level.

15. The method of claim 14, wherein rendering the different 3D representations comprises rendering the different 3D representations in different transparency levels according to the intensity levels derived for the corresponding objects.

16. The method of claim 10, wherein rendering the second set of 3D representations comprises rendering a two dimensional (2D) shape for each of the objects.

17. The method of claim 16, wherein the 2D shape comprises a circle.

18. The method of claim 12, further comprising:

rendering, for each 3D representation within the second set, a shadow representation disposed at a position on the first set of 3D representations that corresponds to a position of the 3D representation within the 3D space along one of the three axes; and wherein rendering the shadow representations comprises of 3D representations comprises:

deriving, for each object located above the floor, an intensity level indicating an intensity of the volume data that corresponds to the object; and rendering the different shadow representations in different transparency levels according to the intensity levels derived for the corresponding objects.

19. The method of claim 18, further comprising:

receiving, via a user interface, a user selection of a shadow representation within the 3D space; and identifying a 3D representation within the second set of 3D representations that corresponds to the selected shadow representation as a target object.

20. The method of claim 10, wherein rendering the second set of 3D representations comprises:

monitoring, for a 3D representation within the second set, a historical position of the 3D representation within the 3D space; and rendering a graphical representation of a trail for the 3D representation based on the historical position.

* * * * *

UNITED STATES PATENT AND TRADEMARK OFFICE
CERTIFICATE OF CORRECTION

PATENT NO. : 10,852,428 B2
APPLICATION NO. : 15/893465
DATED : December 1, 2020
INVENTOR(S) : Paul Stokes et al.

It is certified that error appears in the above-identified patent and that said Letters Patent is hereby corrected as shown below:

In the Specification

In the Cross-Reference to Related Applications:

In Column 1, Line 28, change "patent application Ser. No." to --Patent Application No.--.

In Column 1, Line 40, change "patent application Ser. No." to --Patent Application No.--.

In Column 1, Line 51, change "patent application Ser. No." to --Patent Application No.--.

In the Detailed Description:

In Column 18, Lines 32 and 33, change "patent application Ser. No." to --Patent Application No.--.

In Column 18, Line 42, change "patent application Ser. No." to --Patent Application No.--.

In Column 23, Line 15, change "426:" to --426.--.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*